US011126400B2

(12) United States Patent
Stasior et al.

(10) Patent No.: US 11,126,400 B2
(45) Date of Patent: Sep. 21, 2021

(54) ZERO LATENCY DIGITAL ASSISTANT

(71) Applicant: Apple Inc., Cupertino, CA (US)

(72) Inventors: William F. Stasior, Los Altos, CA (US); David A. Carson, San Francisco, CA (US); Rohit Dasari, San Francisco, CA (US); Yoon Kim, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/909,852

(22) Filed: Jun. 23, 2020

(65) Prior Publication Data

US 2020/0319850 A1 Oct. 8, 2020

Related U.S. Application Data

(63) Continuation of application No. 15/147,726, filed on May 5, 2016, now Pat. No. 10,747,498.

(Continued)

(51) Int. Cl.
*G06F 3/16* (2006.01)
*G06F 3/06* (2006.01)
(Continued)

(52) U.S. Cl.
CPC .............. *G06F 3/167* (2013.01); *G06F 3/038* (2013.01); *G06F 3/0481* (2013.01);
(Continued)

(58) Field of Classification Search
CPC ........ G06F 3/038; G06F 3/167; G06F 3/0604; G06F 3/0656; G06F 3/0673;
(Continued)

(56) References Cited

U.S. PATENT DOCUMENTS 7,280,970 B2 * 10/2007 Tamir .................... B32B 37/182 704/246
7,643,990 B1 1/2010 Bellegarda
(Continued)

FOREIGN PATENT DOCUMENTS

AU 2014100581 B4 9/2014
AU 2015203483 A1 7/2015
(Continued)

OTHER PUBLICATIONS

Notice of Allowance received for Korean Patent Application No. 10-2018-7005374, dated Oct. 22, 2020, 3 pages (1 page of English Translation and 2 pages of Official Copy).

(Continued)

*Primary Examiner* — Jennifer N To
*Assistant Examiner* — Ashley M Fortino
(74) *Attorney, Agent, or Firm* — Dentons US LLP

(57) ABSTRACT

An electronic device can implement a zero-latency digital assistant by capturing audio input from a microphone and using a first processor to write audio data representing the captured audio input to a memory buffer. In response to detecting a user input while capturing the audio input, the device can determine whether the user input meets a predetermined criteria. If the user input meets the criteria, the device can use a second processor to identify and execute a task based on at least a portion of the contents of the memory buffer.

57 Claims, 21 Drawing Sheets

Related U.S. Application Data

(60) Provisional application No. 62/215,608, filed on Sep. 8, 2015.

(51) Int. Cl.
*G06F 3/0481* (2013.01)
*G06F 3/038* (2013.01)
*G10L 15/32* (2013.01)
*G10L 15/22* (2006.01)
*G10L 15/28* (2013.01)
*G10L 15/08* (2006.01)

(52) U.S. Cl.
CPC .......... *G06F 3/0604* (2013.01); *G06F 3/0656* (2013.01); *G06F 3/0673* (2013.01); *G10L 15/22* (2013.01); *G10L 15/32* (2013.01); *G10L 15/285* (2013.01); *G10L 2015/088* (2013.01); *G10L 2015/223* (2013.01); *H04M 2201/40* (2013.01); *H04M 2250/74* (2013.01)

(58) Field of Classification Search
CPC ....... G06F 3/0481; G10L 15/22; G10L 15/32; G10L 15/85; G10L 2015/088; G10L 2015/223; H04M 2201/40; H04M 2250/74
See application file for complete search history.

(56) References Cited

U.S. PATENT DOCUMENTS

| | | | |
|---|---|---|---|
| 7,647,225 | B2 | 1/2010 | Bennett et al. |
| 7,649,454 | B2 | 1/2010 | Singh et al. |
| 7,649,877 | B2 | 1/2010 | Vieri et al. |
| 7,653,883 | B2 | 1/2010 | Hotelling et al. |
| 7,656,393 | B2 | 2/2010 | King et al. |
| 7,657,424 | B2 | 2/2010 | Bennett |
| 7,657,430 | B2 | 2/2010 | Ogawa |
| 7,657,828 | B2 | 2/2010 | Lucas et al. |
| 7,657,844 | B2 | 2/2010 | Gibson et al. |
| 7,657,849 | B2 | 2/2010 | Chaudhri et al. |
| 7,660,715 | B1 | 2/2010 | Thambiratnam |
| 7,663,607 | B2 | 2/2010 | Hotelling et al. |
| 7,664,558 | B2 | 2/2010 | Lindahl et al. |
| 7,664,638 | B2 | 2/2010 | Cooper et al. |
| 7,668,710 | B2 | 2/2010 | Doyle |
| 7,669,134 | B1 | 2/2010 | Christie et al. |
| 7,672,841 | B2 | 3/2010 | Bennett |
| 7,672,952 | B2 | 3/2010 | Isaacson et al. |
| 7,673,238 | B2 | 3/2010 | Girish et al. |
| 7,673,251 | B1 | 3/2010 | Wibisono |
| 7,673,340 | B1 | 3/2010 | Cohen et al. |
| 7,676,026 | B1 | 3/2010 | Baxter, Jr. |
| 7,676,365 | B2 | 3/2010 | Hwang et al. |
| 7,676,463 | B2 | 3/2010 | Thompson et al. |
| 7,679,534 | B2 | 3/2010 | Kay et al. |
| 7,680,649 | B2 | 3/2010 | Park |
| 7,681,126 | B2 | 3/2010 | Roose |
| 7,683,886 | B2 | 3/2010 | Willey |
| 7,683,893 | B2 | 3/2010 | Kim |
| 7,684,985 | B2 | 3/2010 | Dominach et al. |
| 7,684,990 | B2 | 3/2010 | Caskey et al. |
| 7,684,991 | B2 | 3/2010 | Stohr et al. |
| 7,689,245 | B2 | 3/2010 | Cox et al. |
| 7,689,408 | B2 | 3/2010 | Chen et al. |
| 7,689,409 | B2 | 3/2010 | Heinecke |
| 7,689,412 | B2 | 3/2010 | Wu et al. |
| 7,689,421 | B2 | 3/2010 | Li et al. |
| 7,689,916 | B1 | 3/2010 | Goel et al. |
| 7,693,715 | B2 | 4/2010 | Hwang et al. |
| 7,693,717 | B2 | 4/2010 | Kahn et al. |
| 7,693,719 | B2 | 4/2010 | Chu et al. |
| 7,693,720 | B2 | 4/2010 | Kennewick et al. |
| 7,698,131 | B2 | 4/2010 | Bennett |
| 7,698,136 | B1 | 4/2010 | Nguyen et al. |
| 7,702,500 | B2 | 4/2010 | Blaedow |
| 7,702,508 | B2 | 4/2010 | Bennett |
| 7,703,091 | B1 | 4/2010 | Martin et al. |
| 7,706,510 | B2 | 4/2010 | Ng |
| 7,707,026 | B2 | 4/2010 | Liu |
| 7,707,027 | B2 | 4/2010 | Balchandran et al. |
| 7,707,032 | B2 | 4/2010 | Wang et al. |
| 7,707,221 | B1 | 4/2010 | Dunning et al. |
| 7,707,226 | B1 | 4/2010 | Tonse |
| 7,707,267 | B2 | 4/2010 | Lisitsa et al. |
| 7,710,262 | B2 | 5/2010 | Ruha |
| 7,711,129 | B2 | 5/2010 | Lindahl et al. |
| 7,711,550 | B1 | 5/2010 | Feinberg et al. |
| 7,711,565 | B1 | 5/2010 | Gazdzinski |
| 7,711,672 | B2 | 5/2010 | Au |
| 7,712,053 | B2 | 5/2010 | Bradford et al. |
| 7,716,056 | B2 | 5/2010 | Weng et al. |
| 7,716,077 | B1 | 5/2010 | Mikurak |
| 7,716,216 | B1 | 5/2010 | Harik et al. |
| 7,720,674 | B2 | 5/2010 | Kaiser et al. |
| 7,720,683 | B1 | 5/2010 | Vermeulen et al. |
| 7,721,226 | B2 | 5/2010 | Barabe et al. |
| 7,721,301 | B2 | 5/2010 | Wong et al. |
| 7,724,242 | B2 | 5/2010 | Hillis et al. |
| 7,724,696 | B1 | 5/2010 | Parekh |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,725,419 | B2 | 5/2010 | Lee et al. |
| 7,725,838 | B2 | 5/2010 | Williams |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,735,012 | B2 | 6/2010 | Naik |
| 7,739,588 | B2 | 6/2010 | Reynar et al. |
| 7,742,953 | B2 | 6/2010 | King et al. |
| 7,743,188 | B2 | 6/2010 | Haitani et al. |
| 7,747,616 | B2 | 6/2010 | Yamada et al. |
| 7,752,152 | B2 | 7/2010 | Paek et al. |
| 7,756,707 | B2 | 7/2010 | Garner et al. |
| 7,756,708 | B2 | 7/2010 | Cohen et al. |
| 7,756,868 | B2 | 7/2010 | Lee |
| 7,756,871 | B2 | 7/2010 | Yacoub et al. |
| 7,757,173 | B2 | 7/2010 | Beaman |
| 7,757,176 | B2 | 7/2010 | Vakil et al. |
| 7,757,182 | B2 | 7/2010 | Elliott et al. |
| 7,761,296 | B1 | 7/2010 | Bakis et al. |
| 7,763,842 | B2 | 7/2010 | Hsu et al. |
| 7,770,104 | B2 | 8/2010 | Scopes |
| 7,774,202 | B2 | 8/2010 | Spengler et al. |
| 7,774,204 | B2 | 8/2010 | Mozer et al. |
| 7,774,388 | B1 | 8/2010 | Runchey |
| 7,774,753 | B1 | 8/2010 | Reilly et al. |
| 7,777,717 | B2 | 8/2010 | Fux et al. |
| 7,778,432 | B2 | 8/2010 | Larsen |
| 7,778,595 | B2 | 8/2010 | White et al. |
| 7,778,632 | B2 | 8/2010 | Kurlander et al. |
| 7,778,830 | B2 | 8/2010 | Davis et al. |
| 7,779,069 | B2 | 8/2010 | Frid-Nielsen et al. |
| 7,779,353 | B2 | 8/2010 | Grigoriu et al. |
| 7,779,356 | B2 | 8/2010 | Griesmer |
| 7,779,357 | B2 | 8/2010 | Naik |
| 7,783,283 | B2 | 8/2010 | Kuusinen et al. |
| 7,783,486 | B2 | 8/2010 | Rosser et al. |
| 7,788,590 | B2 | 8/2010 | Taboada et al. |
| 7,788,663 | B2 | 8/2010 | Illowsky et al. |
| 7,796,980 | B1 | 9/2010 | McKinney et al. |
| 7,797,265 | B2 | 9/2010 | Brinker et al. |
| 7,797,269 | B2 | 9/2010 | Rieman et al. |
| 7,797,331 | B2 | 9/2010 | Theimer et al. |
| 7,797,338 | B2 | 9/2010 | Feng et al. |
| 7,797,629 | B2 | 9/2010 | Fux et al. |
| 7,801,721 | B2 | 9/2010 | Rosart et al. |
| 7,801,728 | B2 | 9/2010 | Ben-David et al. |
| 7,801,729 | B2 | 9/2010 | Mozer |
| 7,805,299 | B2 | 9/2010 | Coifman |
| 7,809,550 | B1 | 10/2010 | Barrows |
| 7,809,565 | B2 | 10/2010 | Coifman |

(56) References Cited

U.S. PATENT DOCUMENTS 7,809,569 B2 10/2010 Attwater et al.
7,809,570 B2 10/2010 Kennewick et al.
7,809,610 B2 10/2010 Cao
7,809,744 B2 10/2010 Nevidomski et al.
7,813,729 B2 10/2010 Lee et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik et al.
7,840,348 B2 11/2010 Kim et al.
7,840,400 B2 11/2010 Levi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,861,164 B2 12/2010 Qin
7,865,817 B2 1/2011 Ryan et al.
7,869,998 B1 1/2011 Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,523 B2 1/2011 Potter et al.
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,329 B2 2/2011 Wu et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,364 B2 3/2011 Yacoub
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,933,399 B2 4/2011 Knott et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 White et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,176 B2 7/2011 Latzina et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,001,125 B1 8/2011 Magdalin et al.
8,005,664 B2 8/2011 Hanumanthappa
8,005,679 B2 8/2011 Jordan et al.
8,006,180 B2 8/2011 Tunning et al.
8,010,367 B2 8/2011 Muschett et al.
8,010,614 B1 8/2011 Musat et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,032,409 B1 10/2011 Mikurak
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,231 B2 10/2011 Hirota et al.
8,046,363 B2 10/2011 Cha et al.
8,046,374 B1 10/2011 Bromwich et al.
8,050,500 B1 11/2011 Batty et al.
8,050,919 B2 11/2011 Das
8,054,180 B1 11/2011 Scofield et al.
8,055,296 B1 11/2011 Persson et al.
8,055,502 B2 11/2011 Clark et al.
8,055,708 B2 11/2011 Chitsaz et al.
8,056,070 B2 11/2011 Goller et al.

(56) References Cited

U.S. PATENT DOCUMENTS 8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,078,978 B2 12/2011 Perry et al.
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,103,947 B2 1/2012 Lunt et al.
8,107,401 B2 1/2012 John et al.
8,112,275 B2 2/2012 Kennewick et al.
8,112,280 B2 2/2012 Lu
8,117,026 B2 2/2012 Lee et al.
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,171,137 B1 5/2012 Parks et al.
8,175,872 B2 5/2012 Kristjansson et al.
8,175,876 B2 5/2012 Bou-ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,460 B2 6/2012 Degani et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,555 B1 7/2012 Mianji
8,219,608 B2 7/2012 alSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,545 B2 8/2012 Paek et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,117 B1 9/2012 Xu et al.
8,260,247 B2 9/2012 Lazaridis et al.
8,260,617 B2 9/2012 Dhanakshirur et al.
8,260,619 B1 9/2012 Bansal et al.
8,270,933 B2 9/2012 Riemer et al.
8,271,287 B1 9/2012 Kermani
8,275,621 B2 9/2012 Alewine et al.
8,275,736 B2 9/2012 Guo et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.

(56) References Cited

U.S. PATENT DOCUMENTS 8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,453,058 B1 5/2013 Coccaro et al.
8,457,959 B2 6/2013 Kaiser
8,458,115 B2 6/2013 Cai et al.
8,458,278 B2 6/2013 Christie et al.
8,463,592 B2 6/2013 Lu et al.
8,464,150 B2 6/2013 Davidson et al.
8,473,289 B2 6/2013 Jitkoff et al.
8,477,323 B2 7/2013 Low et al.
8,478,816 B2 7/2013 Parks et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,526 B1 8/2013 Lloyd et al.
8,521,531 B1 8/2013 Kim
8,527,276 B1 9/2013 Senior et al.
8,533,266 B2 9/2013 Koulomzin et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,560,366 B2 10/2013 Mikurak
8,571,528 B1 10/2013 Channakeshava
8,571,851 B1 10/2013 Tickner et al.
8,577,683 B2 11/2013 Dewitt
8,583,416 B2 11/2013 Huang et al.
8,583,511 B2 11/2013 Hendrickson
8,583,638 B2 11/2013 Donelli
8,589,156 B2 11/2013 Burke et al.
8,589,161 B2 11/2013 Kennewick et al.
8,589,374 B2 11/2013 Chaudhri
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,615,221 B1 12/2013 Cosenza et al.
8,620,659 B2 12/2013 Di Cristo et al.
8,620,662 B2 12/2013 Bellegarda
8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,712,778 B1 4/2014 Thenthiruperai
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,177 B1 7/2014 Heigold et al.
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara et al.
8,799,000 B2 8/2014 Guzzoni et al.
8,805,690 B1 8/2014 Lebeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,831,947 B2 9/2014 Wasserblat et al.
8,831,949 B1 9/2014 Smith et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,409 B1 10/2014 Mengibar et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.

(56) References Cited

U.S. PATENT DOCUMENTS 8,943,423 B2 1/2015 Merrill et al.
8,964,947 B1 2/2015 Noolu et al.
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,002,714 B2 4/2015 Kim et al.
9,009,046 B1 4/2015 Stewart
9,015,036 B2 4/2015 Karov Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-jefri et al.
9,043,208 B2 5/2015 Koch et al.
9,043,211 B2 * 5/2015 Haiut .................... G10L 15/20
704/275
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,094,636 B1 7/2015 Sanders et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,208,153 B1 12/2015 Zaveri et al.
9,213,754 B1 12/2015 Zhan et al.
9,218,122 B2 12/2015 Thoma et al.
9,218,809 B2 12/2015 Bellegarda
9,218,819 B1 12/2015 Stekkelpa et al.
9,223,537 B2 12/2015 Brown et al.
9,236,047 B2 1/2016 Rasmussen
9,241,073 B1 1/2016 Rensburg et al.
9,251,713 B1 2/2016 Giovanniello et al.
9,255,812 B2 2/2016 Maeoka et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,280,535 B2 3/2016 Varma et al.
9,282,211 B2 3/2016 Osawa
9,286,910 B1 3/2016 Li et al.
9,292,487 B1 3/2016 Weber
9,292,489 B1 3/2016 Sak et al.
9,292,492 B2 3/2016 Sarikaya et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,349,368 B1 5/2016 Lebeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,147 B2 7/2016 Jitkoff et al.
9,406,224 B1 * 8/2016 Sanders ........... H04N 21/42204
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 8/2016 Clark et al.
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,454,599 B2 9/2016 Golden et al.
9,454,957 B1 9/2016 Mathias et al.
9,465,798 B2 10/2016 Lin
9,465,833 B2 10/2016 Aravamudan et al.
9,465,864 B2 10/2016 Hu et al.
9,466,027 B2 10/2016 Byrne et al.
9,466,294 B1 10/2016 Tunstall-pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,516,014 B2 12/2016 Zafiroglu et al.
9,519,453 B2 12/2016 Perkuhn et al.
9,524,355 B2 12/2016 Forbes et al.
9,531,862 B1 12/2016 Vadodaria
9,535,906 B2 1/2017 Lee et al.
9,536,527 B1 1/2017 Carlson
9,547,647 B2 1/2017 Badaskar
9,548,050 B2 1/2017 Gruber et al.
9,548,979 B1 1/2017 Johnson et al.

(56) References Cited

U.S. PATENT DOCUMENTS 9,569,549 B1 2/2017 Jenkins et al.
9,575,964 B2 2/2017 Yadgar et al.
9,578,173 B2 2/2017 Sanghavi et al.
9,607,612 B2 3/2017 Deleeuw
9,619,200 B2 4/2017 Chakladar et al.
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,691,378 B1 6/2017 Meyers et al.
9,697,822 B1 7/2017 Naik et al.
9,697,827 B1 7/2017 Lilly et al.
9,698,999 B2 7/2017 Mutagi
9,720,907 B2 8/2017 Bangalore et al.
9,721,566 B2 8/2017 Newendorp et al.
9,721,570 B1 8/2017 Beal et al.
9,723,130 B2 8/2017 Rand
9,734,817 B1 8/2017 Putrycz
9,734,839 B1 8/2017 Adams
9,741,343 B1 * 8/2017 Miles ...................... G10L 15/01
9,747,083 B1 8/2017 Roman et al.
9,747,093 B2 8/2017 Latino et al.
9,755,605 B1 9/2017 Li et al.
9,760,566 B2 9/2017 Heck et al.
9,767,710 B2 9/2017 Lee et al.
9,786,271 B1 10/2017 Combs et al.
9,792,907 B2 10/2017 Bocklet et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,830,044 B2 11/2017 Brown et al.
9,830,449 B1 11/2017 Wagner
9,842,584 B1 12/2017 Hart et al.
9,846,685 B2 12/2017 Li
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,916,839 B1 3/2018 Scalise et al.
9,922,642 B2 3/2018 Pitschel et al.
9,934,777 B1 4/2018 Joseph et al.
9,934,785 B1 4/2018 Hulaud
9,946,862 B2 4/2018 Yun et al.
9,948,728 B2 4/2018 Linn et al.
9,959,129 B2 5/2018 Kannan et al.
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,129 B2 6/2018 Yang et al.
9,990,176 B1 6/2018 Gray
9,998,552 B1 6/2018 Ledet
10,001,817 B2 6/2018 Zambetti et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,049,161 B2 8/2018 Kaneko
10,049,663 B2 8/2018 Orr et al.
10,049,668 B2 8/2018 Huang et al.
10,055,681 B2 8/2018 Brown et al.
10,074,360 B2 9/2018 Kim
10,074,371 B1 9/2018 Wang et al.
10,083,213 B1 9/2018 Podgorny et al.
10,083,690 B2 9/2018 Giuli et al.
10,088,972 B2 10/2018 Brown et al.
10,089,072 B2 10/2018 Piersol et al.
10,096,319 B1 10/2018 Jin et al.
10,101,887 B2 10/2018 Bernstein et al.
10,102,359 B2 10/2018 Cheyer
10,127,901 B2 11/2018 Zhao et al.
10,127,908 B1 11/2018 Deller et al.
10,134,425 B1 11/2018 Johnson, Jr.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,199,051 B2 2/2019 Binder et al.
10,200,824 B2 2/2019 Gross et al.
10,216,351 B2 2/2019 Yang
10,216,832 B2 2/2019 Bangalore et al.
10,223,066 B2 3/2019 Martel et al.
10,225,711 B2 3/2019 Parks et al.
10,229,356 B1 3/2019 Liu et al.
10,237,711 B2 3/2019 Linn et al.
10,248,308 B2 4/2019 Karunamuni et al.
10,255,922 B1 4/2019 Sharifi et al.
10,269,345 B2 4/2019 Castillo Sanchez et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,513 B1 6/2019 D'souza et al.
10,332,518 B2 6/2019 Garg et al.
10,346,753 B2 7/2019 Soon-Shiong et al.
10,353,975 B2 7/2019 Oh et al.
10,354,677 B2 7/2019 Mohamed et al.
10,356,243 B2 7/2019 Sanghavi et al.
10,366,692 B1 7/2019 Adams et al.
10,372,814 B2 8/2019 Gliozzo et al.
10,389,876 B2 8/2019 Engelke et al.
10,402,066 B2 9/2019 Kawana
10,403,283 B1 9/2019 Schramm et al.
10,409,454 B2 9/2019 Kagan et al.
10,410,637 B2 9/2019 Paulik et al.
10,417,037 B2 9/2019 Gruber et al.
10,417,554 B2 9/2019 Scheffler
10,446,142 B2 10/2019 Lim et al.
10,469,665 B1 11/2019 Bell et al.
10,474,961 B2 11/2019 Brigham et al.
10,496,705 B1 12/2019 Irani et al.
10,497,365 B2 12/2019 Gruber et al.
10,504,518 B1 12/2019 Irani et al.
10,521,946 B1 12/2019 Roche et al.
10,528,386 B2 1/2020 Yu
10,568,032 B2 2/2020 Freeman et al.
10,630,795 B2 4/2020 Aoki et al.
10,659,851 B2 5/2020 Lister et al.
10,757,499 B1 8/2020 Vautrin et al.
10,811,013 B1 10/2020 Secker-Walker et al.
2002/0169608 A1 11/2002 Tamir et al.
2004/0030556 A1 2/2004 Bennett

(56) References Cited

U.S. PATENT DOCUMENTS

| | | | |
|---|---|---|---|
| 2009/0234655 | A1 | 9/2009 | Kwon |
| 2010/0004918 | A1 | 1/2010 | Lee et al. |
| 2010/0004930 | A1 | 1/2010 | Strope et al. |
| 2010/0004931 | A1 | 1/2010 | Ma et al. |
| 2010/0005081 | A1 | 1/2010 | Bennett |
| 2010/0007569 | A1 | 1/2010 | Sim et al. |
| 2010/0010803 | A1 | 1/2010 | Ishikawa et al. |
| 2010/0010814 | A1 | 1/2010 | Patel |
| 2010/0010948 | A1 | 1/2010 | Ito et al. |
| 2010/0013760 | A1 | 1/2010 | Hirai et al. |
| 2010/0013796 | A1 | 1/2010 | Abileah et al. |
| 2010/0017212 | A1 | 1/2010 | Attwater et al. |
| 2010/0017382 | A1 | 1/2010 | Katragadda et al. |
| 2010/0017741 | A1 | 1/2010 | Karp et al. |
| 2010/0019834 | A1 | 1/2010 | Zerbe et al. |
| 2010/0020035 | A1 | 1/2010 | Ryu et al. |
| 2010/0023318 | A1 | 1/2010 | Lemoine |
| 2010/0023320 | A1 | 1/2010 | Di Cristo et al. |
| 2010/0023331 | A1 | 1/2010 | Duta et al. |
| 2010/0026526 | A1 | 2/2010 | Yokota |
| 2010/0030549 | A1 | 2/2010 | Lee et al. |
| 2010/0030562 | A1 | 2/2010 | Yoshizawa et al. |
| 2010/0030928 | A1 | 2/2010 | Conroy et al. |
| 2010/0031143 | A1 | 2/2010 | Rao et al. |
| 2010/0031150 | A1 | 2/2010 | Andrew |
| 2010/0036653 | A1 | 2/2010 | Kim et al. |
| 2010/0036655 | A1 | 2/2010 | Cecil et al. |
| 2010/0036660 | A1 | 2/2010 | Bennett |
| 2010/0036829 | A1 | 2/2010 | Leyba |
| 2010/0036928 | A1 | 2/2010 | Granito et al. |
| 2010/0037183 | A1 | 2/2010 | Miyashita et al. |
| 2010/0037187 | A1 | 2/2010 | Kondziela |
| 2010/0039495 | A1 | 2/2010 | Rahman et al. |
| 2010/0042400 | A1 | 2/2010 | Block et al. |
| 2010/0042576 | A1 | 2/2010 | Roettger et al. |
| 2010/0046842 | A1 | 2/2010 | Conwell |
| 2010/0049498 | A1 | 2/2010 | Cao et al. |
| 2010/0049514 | A1 | 2/2010 | Kennewick et al. |
| 2010/0050064 | A1 | 2/2010 | Liu et al. |
| 2010/0050074 | A1 | 2/2010 | Nachmani et al. |
| 2010/0054512 | A1 | 3/2010 | Solum |
| 2010/0054601 | A1 | 3/2010 | Anbalagan et al. |
| 2010/0057435 | A1 | 3/2010 | Kent et al. |
| 2010/0057443 | A1 | 3/2010 | Di Cristo et al. |
| 2010/0057457 | A1 | 3/2010 | Ogata et al. |
| 2010/0057461 | A1 | 3/2010 | Neubacher et al. |
| 2010/0057643 | A1 | 3/2010 | Yang |
| 2010/0058200 | A1 | 3/2010 | Jablokov et al. |
| 2010/0060646 | A1 | 3/2010 | Unsal et al. |
| 2010/0063804 | A1 | 3/2010 | Sato et al. |
| 2010/0063825 | A1 | 3/2010 | Williams et al. |
| 2010/0063961 | A1 | 3/2010 | Guiheneuf et al. |
| 2010/0064113 | A1 | 3/2010 | Lindahl et al. |
| 2010/0064218 | A1 | 3/2010 | Bull et al. |
| 2010/0064226 | A1 | 3/2010 | Stefaniak et al. |
| 2010/0066546 | A1 | 3/2010 | Aaron |
| 2010/0066684 | A1 | 3/2010 | Shahraray et al. |
| 2010/0067723 | A1 | 3/2010 | Bergmann et al. |
| 2010/0067867 | A1 | 3/2010 | Lin et al. |
| 2010/0070281 | A1 | 3/2010 | Conkie et al. |
| 2010/0070517 | A1 | 3/2010 | Ghosh et al. |
| 2010/0070521 | A1 | 3/2010 | Clinchant et al. |
| 2010/0070899 | A1 | 3/2010 | Hunt et al. |
| 2010/0071003 | A1 | 3/2010 | Bychkov et al. |
| 2010/0073201 | A1 | 3/2010 | Holcomb et al. |
| 2010/0076760 | A1 | 3/2010 | Kraenzel et al. |
| 2010/0076968 | A1 | 3/2010 | Boyns et al. |
| 2010/0076993 | A1 | 3/2010 | Klawitter et al. |
| 2010/0077350 | A1 | 3/2010 | Lim et al. |
| 2010/0077469 | A1 | 3/2010 | Furman et al. |
| 2010/0079501 | A1 | 4/2010 | Ikeda et al. |
| 2010/0079508 | A1 | 4/2010 | Hodge et al. |
| 2010/0080398 | A1 | 4/2010 | Waldmann |
| 2010/0080470 | A1 | 4/2010 | Deluca et al. |
| 2010/0081456 | A1 | 4/2010 | Singh et al. |
| 2010/0081487 | A1 | 4/2010 | Chen et al. |
| 2010/0082239 | A1 | 4/2010 | Hardy et al. |
| 2010/0082286 | A1 | 4/2010 | Leung |
| 2010/0082327 | A1 | 4/2010 | Rogers et al. |
| 2010/0082328 | A1 | 4/2010 | Rogers et al. |
| 2010/0082329 | A1 | 4/2010 | Silverman et al. |
| 2010/0082333 | A1 | 4/2010 | Al-Shammari |
| 2010/0082343 | A1 | 4/2010 | Levit et al. |
| 2010/0082345 | A1 | 4/2010 | Wang et al. |
| 2010/0082346 | A1 | 4/2010 | Rogers et al. |
| 2010/0082347 | A1 | 4/2010 | Rogers et al. |
| 2010/0082348 | A1 | 4/2010 | Silverman et al. |
| 2010/0082349 | A1 | 4/2010 | Bellegarda et al. |
| 2010/0082376 | A1 | 4/2010 | Levitt |
| 2010/0082567 | A1 | 4/2010 | Rosenblatt et al. |
| 2010/0082653 | A1 | 4/2010 | Nair |
| 2010/0082970 | A1 | 4/2010 | Lindahl et al. |
| 2010/0086152 | A1 | 4/2010 | Rank et al. |
| 2010/0086153 | A1 | 4/2010 | Hagen et al. |
| 2010/0086156 | A1 | 4/2010 | Rank et al. |
| 2010/0088020 | A1 | 4/2010 | Sano et al. |
| 2010/0088093 | A1 | 4/2010 | Lee et al. |
| 2010/0088100 | A1 | 4/2010 | Lindahl |
| 2010/0094632 | A1 | 4/2010 | Davis et al. |
| 2010/0098231 | A1 | 4/2010 | Wohlert et al. |
| 2010/0099354 | A1 | 4/2010 | Johnson |
| 2010/0100080 | A1 | 4/2010 | Huculak et al. |
| 2010/0100212 | A1 | 4/2010 | Lindahl et al. |
| 2010/0100371 | A1 | 4/2010 | Yuezhong et al. |
| 2010/0100384 | A1 | 4/2010 | Ju et al. |
| 2010/0100385 | A1 | 4/2010 | Davis et al. |
| 2010/0100515 | A1 | 4/2010 | Bangalore et al. |
| 2010/0100816 | A1 | 4/2010 | Mccloskey et al. |
| 2010/0103776 | A1 | 4/2010 | Chan |
| 2010/0106486 | A1 | 4/2010 | Hua et al. |
| 2010/0106498 | A1 | 4/2010 | Morrison et al. |
| 2010/0106500 | A1 | 4/2010 | McKee et al. |
| 2010/0106503 | A1 | 4/2010 | Farrell et al. |
| 2010/0106975 | A1 | 4/2010 | Vandervort |
| 2010/0114856 | A1 | 5/2010 | Kuboyama |
| 2010/0114887 | A1 | 5/2010 | Conway et al. |
| 2010/0121637 | A1 | 5/2010 | Roy et al. |
| 2010/0122306 | A1 | 5/2010 | Pratt et al. |
| 2010/0125456 | A1 | 5/2010 | Weng et al. |
| 2010/0125458 | A1 | 5/2010 | Franco et al. |
| 2010/0125460 | A1 | 5/2010 | Mellott et al. |
| 2010/0125811 | A1 | 5/2010 | Moore et al. |
| 2010/0127854 | A1 | 5/2010 | Helvick et al. |
| 2010/0128701 | A1 | 5/2010 | Nagaraja |
| 2010/0131265 | A1 | 5/2010 | Liu et al. |
| 2010/0131269 | A1 | 5/2010 | Park et al. |
| 2010/0131273 | A1 | 5/2010 | Aley-Raz et al. |
| 2010/0131498 | A1 | 5/2010 | Linthicum et al. |
| 2010/0131899 | A1 | 5/2010 | Hubert |
| 2010/0138215 | A1 | 6/2010 | Williams |
| 2010/0138224 | A1 | 6/2010 | Bedingfield, Sr. |
| 2010/0138416 | A1 | 6/2010 | Bellotti |
| 2010/0138680 | A1 | 6/2010 | Brisebois et al. |
| 2010/0138759 | A1 | 6/2010 | Roy |
| 2010/0138798 | A1 | 6/2010 | Wilson et al. |
| 2010/0142740 | A1 | 6/2010 | Roerup |
| 2010/0145694 | A1 | 6/2010 | Ju et al. |
| 2010/0145700 | A1 | 6/2010 | Kennewick et al. |
| 2010/0145707 | A1 | 6/2010 | Ljolje et al. |
| 2010/0146442 | A1 | 6/2010 | Nagasaka et al. |
| 2010/0150321 | A1 | 6/2010 | Harris et al. |
| 2010/0153114 | A1 | 6/2010 | Shih et al. |
| 2010/0153115 | A1 | 6/2010 | Klee et al. |
| 2010/0153448 | A1 | 6/2010 | Harpur et al. |
| 2010/0153576 | A1 | 6/2010 | Wohlert et al. |
| 2010/0153968 | A1 | 6/2010 | Engel |
| 2010/0158207 | A1 | 6/2010 | Dhawan et al. |
| 2010/0161311 | A1 | 6/2010 | Massuh |
| 2010/0161313 | A1 | 6/2010 | Karttunen |
| 2010/0161337 | A1 | 6/2010 | Pulz et al. |
| 2010/0161554 | A1 | 6/2010 | Datuashvili et al. |
| 2010/0164897 | A1 | 7/2010 | Morin et al. |
| 2010/0169075 | A1 | 7/2010 | Raffa et al. |
| 2010/0169093 | A1 | 7/2010 | Washio |

(56) References Cited

U.S. PATENT DOCUMENTS

2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185434 A1 7/2010 Burvall et al.
2010/0185448 A1 7/2010 Meisel
2010/0185949 A1 7/2010 Jaeger
2010/0191466 A1 7/2010 Deluca et al.
2010/0191520 A1 7/2010 Gruhn et al.
2010/0192221 A1 7/2010 Waggoner
2010/0195865 A1 8/2010 Luff
2010/0197359 A1 8/2010 Harris
2010/0198821 A1 8/2010 Loritz et al.
2010/0199180 A1 8/2010 Brichter et al.
2010/0199215 A1 8/2010 Seymour et al.
2010/0199340 A1 8/2010 Jonas et al.
2010/0204986 A1 8/2010 Kennewick et al.
2010/0211199 A1 8/2010 Naik et al.
2010/0211379 A1 8/2010 Gorman et al.
2010/0211644 A1 8/2010 Lavoie et al.
2010/0215195 A1 8/2010 Harma et al.
2010/0216509 A1 8/2010 Riemer et al.
2010/0217581 A1 8/2010 Hong
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225599 A1 9/2010 Danielsson et al.
2010/0225809 A1 9/2010 Connors et al.
2010/0227642 A1 9/2010 Kim et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0235793 A1 9/2010 Ording et al.
2010/0241418 A1 9/2010 Maeda et al.
2010/0246784 A1 9/2010 Frazier et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0257490 A1 10/2010 Lyon et al.
2010/0262599 A1 10/2010 Nitz
2010/0263015 A1 10/2010 Pandey et al.
2010/0268537 A1 10/2010 Al-Telmissani
2010/0268539 A1 10/2010 Xu et al.
2010/0269040 A1 10/2010 Lee
2010/0274482 A1 10/2010 Feng
2010/0274753 A1 10/2010 Liberty et al.
2010/0277579 A1 11/2010 Cho et al.
2010/0278320 A1 11/2010 Arsenault et al.
2010/0278391 A1 11/2010 Hsu et al.
2010/0278453 A1 11/2010 King
2010/0280983 A1 11/2010 Cho et al.
2010/0281034 A1 11/2010 Petrou et al.
2010/0286984 A1 11/2010 Wandinger et al.
2010/0286985 A1 11/2010 Kennewick et al.
2010/0287241 A1 11/2010 Swanburg et al.
2010/0287514 A1 11/2010 Cragun et al.
2010/0290632 A1 11/2010 Lin
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0299444 A1 11/2010 Nilo et al.
2010/0302056 A1 12/2010 Dutton et al.
2010/0303254 A1 12/2010 Yoshizawa et al.
2010/0304342 A1 12/2010 Zilber
2010/0304705 A1 12/2010 Hursey et al.
2010/0305807 A1 12/2010 Basir et al.
2010/0305947 A1 12/2010 Schwarz et al.
2010/0311395 A1 12/2010 Zheng et al.
2010/0312547 A1 12/2010 Van Os et al.
2010/0312566 A1 12/2010 Odinak et al.
2010/0318293 A1 12/2010 Brush et al.
2010/0318357 A1 12/2010 Istvan et al.
2010/0318366 A1 12/2010 Sullivan et al.
2010/0318570 A1 12/2010 Narasinghanallur et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332003 A1 12/2010 Yaguez
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0006876 A1 1/2011 Moberg et al.
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0016421 A1 1/2011 Krupka et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0028083 A1 2/2011 Soitis
2011/0029616 A1 2/2011 Wang et al.
2011/0029637 A1 2/2011 Morse
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0039584 A1 2/2011 Merrett
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047246 A1 2/2011 Frissora et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.

(56) References Cited

U.S. PATENT DOCUMENTS

| | | | |
|---|---|---|---|
| 2011/0054647 | A1 | 3/2011 | Chipchase |
| 2011/0054894 | A1 | 3/2011 | Phillips et al. |
| 2011/0054901 | A1 | 3/2011 | Qin et al. |
| 2011/0055244 | A1 | 3/2011 | Donelli |
| 2011/0055256 | A1 | 3/2011 | Phillips et al. |
| 2011/0060584 | A1 | 3/2011 | Ferrucci et al. |
| 2011/0060587 | A1 | 3/2011 | Phillips et al. |
| 2011/0060589 | A1 | 3/2011 | Weinberg et al. |
| 2011/0060807 | A1 | 3/2011 | Martin et al. |
| 2011/0060812 | A1 | 3/2011 | Middleton |
| 2011/0064378 | A1 | 3/2011 | Gharaat et al. |
| 2011/0064387 | A1 | 3/2011 | Mendeloff et al. |
| 2011/0065456 | A1 | 3/2011 | Brennan et al. |
| 2011/0066366 | A1 | 3/2011 | Ellanti et al. |
| 2011/0066436 | A1 | 3/2011 | Bezar |
| 2011/0066468 | A1 | 3/2011 | Huang et al. |
| 2011/0066602 | A1 | 3/2011 | Studer et al. |
| 2011/0066634 | A1 | 3/2011 | Phillips et al. |
| 2011/0072033 | A1 | 3/2011 | White et al. |
| 2011/0072114 | A1 | 3/2011 | Hoffert et al. |
| 2011/0072492 | A1 | 3/2011 | Mohler et al. |
| 2011/0075818 | A1 | 3/2011 | Vance et al. |
| 2011/0076994 | A1 | 3/2011 | Kim et al. |
| 2011/0077943 | A1 | 3/2011 | Miki et al. |
| 2011/0080260 | A1 | 4/2011 | Wang et al. |
| 2011/0081889 | A1 | 4/2011 | Gao et al. |
| 2011/0082688 | A1 | 4/2011 | Kim et al. |
| 2011/0083079 | A1 | 4/2011 | Farrell et al. |
| 2011/0087491 | A1 | 4/2011 | Wittenstein et al. |
| 2011/0087685 | A1 | 4/2011 | Lin et al. |
| 2011/0090078 | A1 | 4/2011 | Kim et al. |
| 2011/0092187 | A1 | 4/2011 | Miller |
| 2011/0093261 | A1 | 4/2011 | Angott |
| 2011/0093265 | A1 | 4/2011 | Stent et al. |
| 2011/0093271 | A1 | 4/2011 | Bernard et al. |
| 2011/0093272 | A1 | 4/2011 | Isobe et al. |
| 2011/0099000 | A1 | 4/2011 | Rai et al. |
| 2011/0099157 | A1 | 4/2011 | LeBeau et al. |
| 2011/0102161 | A1 | 5/2011 | Heubel et al. |
| 2011/0103682 | A1 | 5/2011 | Chidlovskii et al. |
| 2011/0105097 | A1 | 5/2011 | Tadayon et al. |
| 2011/0106534 | A1 | 5/2011 | Lebeau et al. |
| 2011/0106536 | A1 | 5/2011 | Klappert |
| 2011/0106736 | A1 | 5/2011 | Aharonson et al. |
| 2011/0106878 | A1 | 5/2011 | Cho et al. |
| 2011/0106892 | A1 | 5/2011 | Nelson et al. |
| 2011/0110502 | A1 | 5/2011 | Daye et al. |
| 2011/0111724 | A1 | 5/2011 | Baptiste |
| 2011/0112825 | A1 | 5/2011 | Bellegarda |
| 2011/0112827 | A1 | 5/2011 | Kennewick et al. |
| 2011/0112837 | A1 | 5/2011 | Kurki-Suonio et al. |
| 2011/0112838 | A1 | 5/2011 | Adibi |
| 2011/0112921 | A1 | 5/2011 | Kennewick et al. |
| 2011/0116480 | A1 | 5/2011 | Li et al. |
| 2011/0116610 | A1 | 5/2011 | Shaw et al. |
| 2011/0119049 | A1 | 5/2011 | Ylonen |
| 2011/0119051 | A1 | 5/2011 | Li et al. |
| 2011/0119623 | A1 | 5/2011 | Kim |
| 2011/0119713 | A1 | 5/2011 | Chang et al. |
| 2011/0119715 | A1 | 5/2011 | Chang et al. |
| 2011/0123004 | A1 | 5/2011 | Chang et al. |
| 2011/0125498 | A1 | 5/2011 | Pickering et al. |
| 2011/0125540 | A1 | 5/2011 | Jang et al. |
| 2011/0125701 | A1 | 5/2011 | Nair et al. |
| 2011/0130958 | A1 | 6/2011 | Stahl et al. |
| 2011/0131036 | A1 | 6/2011 | DiCristo et al. |
| 2011/0131038 | A1 | 6/2011 | Oyaizu et al. |
| 2011/0131045 | A1 | 6/2011 | Cristo et al. |
| 2011/0137636 | A1 | 6/2011 | Srihari et al. |
| 2011/0137664 | A1 | 6/2011 | Kho et al. |
| 2011/0141141 | A1 | 6/2011 | Kankainen |
| 2011/0143718 | A1 | 6/2011 | Engelhart, Sr. |
| 2011/0143726 | A1 | 6/2011 | de Silva |
| 2011/0143811 | A1 | 6/2011 | Rodriguez |
| 2011/0144857 | A1 | 6/2011 | Wingrove et al. |
| 2011/0144901 | A1 | 6/2011 | Wang |
| 2011/0144973 | A1 | 6/2011 | Bocchieri et al. |
| 2011/0144999 | A1 | 6/2011 | Jang et al. |
| 2011/0145718 | A1 | 6/2011 | Ketola et al. |
| 2011/0151415 | A1 | 6/2011 | Darling et al. |
| 2011/0151830 | A1 | 6/2011 | Blanda et al. |
| 2011/0153209 | A1 | 6/2011 | Geelen |
| 2011/0153322 | A1 | 6/2011 | Kwak et al. |
| 2011/0153324 | A1 | 6/2011 | Ballinger et al. |
| 2011/0153325 | A1 | 6/2011 | Ballinger et al. |
| 2011/0153329 | A1 | 6/2011 | Moorer |
| 2011/0153330 | A1 | 6/2011 | Yazdani et al. |
| 2011/0153373 | A1 | 6/2011 | Dantzig et al. |
| 2011/0154193 | A1 | 6/2011 | Creutz et al. |
| 2011/0157029 | A1 | 6/2011 | Tseng |
| 2011/0161072 | A1 | 6/2011 | Terao et al. |
| 2011/0161076 | A1 | 6/2011 | Davis et al. |
| 2011/0161079 | A1 | 6/2011 | Gruhn et al. |
| 2011/0161309 | A1 | 6/2011 | Lung et al. |
| 2011/0161852 | A1 | 6/2011 | Vainio et al. |
| 2011/0166851 | A1 | 7/2011 | LeBeau et al. |
| 2011/0166855 | A1 | 7/2011 | Vermeulen et al. |
| 2011/0166862 | A1 | 7/2011 | Eshed et al. |
| 2011/0167350 | A1 | 7/2011 | Hoellwarth |
| 2011/0173003 | A1 | 7/2011 | Levanon et al. |
| 2011/0173537 | A1 | 7/2011 | Hemphill |
| 2011/0175810 | A1 | 7/2011 | Markovic et al. |
| 2011/0178804 | A1 | 7/2011 | Inoue et al. |
| 2011/0179002 | A1 | 7/2011 | Dumitru et al. |
| 2011/0179372 | A1 | 7/2011 | Moore et al. |
| 2011/0183627 | A1 | 7/2011 | Ueda et al. |
| 2011/0183650 | A1 | 7/2011 | Mckee et al. |
| 2011/0184721 | A1 | 7/2011 | Subramanian et al. |
| 2011/0184730 | A1 | 7/2011 | LeBeau et al. |
| 2011/0184736 | A1 | 7/2011 | Slotznick |
| 2011/0184737 | A1 | 7/2011 | Nakano et al. |
| 2011/0184768 | A1 | 7/2011 | Norton et al. |
| 2011/0184789 | A1 | 7/2011 | Kirsch |
| 2011/0185288 | A1 | 7/2011 | Gupta et al. |
| 2011/0191108 | A1 | 8/2011 | Friedlander |
| 2011/0191271 | A1 | 8/2011 | Baker et al. |
| 2011/0191344 | A1 | 8/2011 | Jin et al. |
| 2011/0195758 | A1 | 8/2011 | Damale et al. |
| 2011/0196670 | A1 | 8/2011 | Dang et al. |
| 2011/0197128 | A1 | 8/2011 | Assadollahi et al. |
| 2011/0199312 | A1 | 8/2011 | Okuta |
| 2011/0201385 | A1 | 8/2011 | Higginbotham et al. |
| 2011/0201387 | A1 | 8/2011 | Paek et al. |
| 2011/0202526 | A1 | 8/2011 | Lee et al. |
| 2011/0202594 | A1 | 8/2011 | Ricci |
| 2011/0202874 | A1 | 8/2011 | Ramer et al. |
| 2011/0205149 | A1 | 8/2011 | Tom et al. |
| 2011/0208511 | A1 | 8/2011 | Sikstrom et al. |
| 2011/0208524 | A1 | 8/2011 | Haughay |
| 2011/0209088 | A1 | 8/2011 | Hinckley et al. |
| 2011/0212717 | A1 | 9/2011 | Rhoads et al. |
| 2011/0216093 | A1* | 9/2011 | Griffin ................ H04M 1/0279 345/659 |
| 2011/0218806 | A1 | 9/2011 | Alewine et al. |
| 2011/0218855 | A1 | 9/2011 | Cao et al. |
| 2011/0219018 | A1 | 9/2011 | Bailey et al. |
| 2011/0223893 | A1 | 9/2011 | Lau et al. |
| 2011/0224972 | A1 | 9/2011 | Millett et al. |
| 2011/0228913 | A1 | 9/2011 | Cochinwala et al. |
| 2011/0231182 | A1 | 9/2011 | Weider et al. |
| 2011/0231184 | A1 | 9/2011 | Kerr |
| 2011/0231188 | A1 | 9/2011 | Kennewick et al. |
| 2011/0231189 | A1 | 9/2011 | Anastasiadis et al. |
| 2011/0231218 | A1 | 9/2011 | Tovar |
| 2011/0231432 | A1 | 9/2011 | Sata et al. |
| 2011/0231474 | A1 | 9/2011 | Locker et al. |
| 2011/0238191 | A1 | 9/2011 | Kristjansson et al. |
| 2011/0238407 | A1 | 9/2011 | Kent |
| 2011/0238408 | A1 | 9/2011 | Larcheveque et al. |
| 2011/0238676 | A1 | 9/2011 | Liu et al. |
| 2011/0239111 | A1 | 9/2011 | Grover |
| 2011/0242007 | A1 | 10/2011 | Gray et al. |
| 2011/0244888 | A1 | 10/2011 | Ohki |
| 2011/0246471 | A1 | 10/2011 | Rakib et al. |

(56) References Cited

U.S. PATENT DOCUMENTS

| | | | |
|---|---|---|---|
| 2011/0249144 | A1 | 10/2011 | Chang |
| 2011/0250570 | A1 | 10/2011 | Mack et al. |
| 2011/0252108 | A1 | 10/2011 | Morris et al. |
| 2011/0257966 | A1 | 10/2011 | Rychlik |
| 2011/0258188 | A1 | 10/2011 | Abdalmageed et al. |
| 2011/0260829 | A1 | 10/2011 | Lee |
| 2011/0260861 | A1 | 10/2011 | Singh et al. |
| 2011/0264530 | A1 | 10/2011 | Santangelo et al. |
| 2011/0264643 | A1 | 10/2011 | Cao |
| 2011/0264999 | A1 | 10/2011 | Bells et al. |
| 2011/0270604 | A1 | 11/2011 | Qi et al. |
| 2011/0274303 | A1 | 11/2011 | Filson et al. |
| 2011/0276595 | A1 | 11/2011 | Kirkland et al. |
| 2011/0276598 | A1 | 11/2011 | Kozempel |
| 2011/0276944 | A1 | 11/2011 | Bergman et al. |
| 2011/0279368 | A1 | 11/2011 | Klein et al. |
| 2011/0280143 | A1 | 11/2011 | Li et al. |
| 2011/0282663 | A1 | 11/2011 | Talwar et al. |
| 2011/0282888 | A1 | 11/2011 | Koperski et al. |
| 2011/0282903 | A1 | 11/2011 | Zhang |
| 2011/0282906 | A1 | 11/2011 | Wong |
| 2011/0283189 | A1 | 11/2011 | McCarty |
| 2011/0283190 | A1 | 11/2011 | Poltorak |
| 2011/0288852 | A1 | 11/2011 | Dymetman et al. |
| 2011/0288855 | A1 | 11/2011 | Roy |
| 2011/0288861 | A1 | 11/2011 | Kurzweil et al. |
| 2011/0288863 | A1 | 11/2011 | Rasmussen |
| 2011/0288866 | A1 | 11/2011 | Rasmussen |
| 2011/0288917 | A1 | 11/2011 | Wanek et al. |
| 2011/0289530 | A1 | 11/2011 | Dureau et al. |
| 2011/0298585 | A1 | 12/2011 | Barry |
| 2011/0301943 | A1 | 12/2011 | Patch |
| 2011/0302162 | A1 | 12/2011 | Xiao et al. |
| 2011/0302645 | A1 | 12/2011 | Headley |
| 2011/0306426 | A1 | 12/2011 | Novak et al. |
| 2011/0307241 | A1 | 12/2011 | Waibel et al. |
| 2011/0307254 | A1 | 12/2011 | Hunt et al. |
| 2011/0307491 | A1 | 12/2011 | Fisk et al. |
| 2011/0307810 | A1 | 12/2011 | Hilerio et al. |
| 2011/0313775 | A1 | 12/2011 | Laligand et al. |
| 2011/0313803 | A1 | 12/2011 | Friend et al. |
| 2011/0314003 | A1 | 12/2011 | Ju et al. |
| 2011/0314032 | A1 | 12/2011 | Bennett et al. |
| 2011/0314404 | A1 | 12/2011 | Kotler et al. |
| 2011/0314539 | A1 | 12/2011 | Horton |
| 2011/0320187 | A1 | 12/2011 | Motik et al. |
| 2012/0002820 | A1 | 1/2012 | Leichter |
| 2012/0005602 | A1 | 1/2012 | Anttila et al. |
| 2012/0008754 | A1 | 1/2012 | Mukherjee et al. |
| 2012/0010886 | A1 | 1/2012 | Razavilar |
| 2012/0011138 | A1 | 1/2012 | Dunning et al. |
| 2012/0013609 | A1 | 1/2012 | Reponen et al. |
| 2012/0015629 | A1 | 1/2012 | Olsen et al. |
| 2012/0016658 | A1 | 1/2012 | Wu et al. |
| 2012/0016678 | A1 | 1/2012 | Gruber et al. |
| 2012/0019400 | A1 | 1/2012 | Patel et al. |
| 2012/0020490 | A1 | 1/2012 | Leichter |
| 2012/0020503 | A1 | 1/2012 | Endo et al. |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022872 | A1 | 1/2012 | Gruber et al. |
| 2012/0022874 | A1 | 1/2012 | Lloyd et al. |
| 2012/0022876 | A1 | 1/2012 | LeBeau et al. |
| 2012/0022967 | A1 | 1/2012 | Bachman et al. |
| 2012/0023088 | A1 | 1/2012 | Cheng et al. |
| 2012/0023095 | A1 | 1/2012 | Wadycki et al. |
| 2012/0023462 | A1 | 1/2012 | Rosing et al. |
| 2012/0026395 | A1 | 2/2012 | Jin et al. |
| 2012/0029661 | A1 | 2/2012 | Jones et al. |
| 2012/0029910 | A1 | 2/2012 | Medlock et al. |
| 2012/0034904 | A1 | 2/2012 | LeBeau et al. |
| 2012/0035907 | A1 | 2/2012 | Lebeau et al. |
| 2012/0035908 | A1 | 2/2012 | Lebeau et al. |
| 2012/0035924 | A1 | 2/2012 | Jitkoff et al. |
| 2012/0035925 | A1 | 2/2012 | Friend et al. |
| 2012/0035926 | A1 | 2/2012 | Ambler |
| 2012/0035931 | A1 | 2/2012 | LeBeau et al. |
| 2012/0035932 | A1 | 2/2012 | Jitkoff et al. |
| 2012/0035935 | A1 | 2/2012 | Park et al. |
| 2012/0036556 | A1 | 2/2012 | LeBeau et al. |
| 2012/0039539 | A1 | 2/2012 | Boiman et al. |
| 2012/0039578 | A1 | 2/2012 | Issa et al. |
| 2012/0041752 | A1 | 2/2012 | Wang et al. |
| 2012/0041756 | A1 | 2/2012 | Hanazawa et al. |
| 2012/0041759 | A1 | 2/2012 | Barker et al. |
| 2012/0042014 | A1 | 2/2012 | Desai et al. |
| 2012/0042343 | A1 | 2/2012 | Laligand et al. |
| 2012/0052945 | A1 | 3/2012 | Miyamoto et al. |
| 2012/0053815 | A1 | 3/2012 | Montanari et al. |
| 2012/0053829 | A1 | 3/2012 | Agarwal et al. |
| 2012/0053945 | A1 | 3/2012 | Gupta et al. |
| 2012/0056815 | A1 | 3/2012 | Mehra |
| 2012/0059655 | A1 | 3/2012 | Cartales |
| 2012/0059813 | A1 | 3/2012 | Sejnoha et al. |
| 2012/0060052 | A1 | 3/2012 | White et al. |
| 2012/0062473 | A1 | 3/2012 | Xiao et al. |
| 2012/0064975 | A1 | 3/2012 | Gault et al. |
| 2012/0065972 | A1 | 3/2012 | Strifler et al. |
| 2012/0066212 | A1 | 3/2012 | Jennings |
| 2012/0066581 | A1 | 3/2012 | Spalink |
| 2012/0075054 | A1 | 3/2012 | Ge et al. |
| 2012/0075184 | A1 | 3/2012 | Madhvanath |
| 2012/0077479 | A1 | 3/2012 | Sabotta et al. |
| 2012/0078611 | A1 | 3/2012 | Soltani et al. |
| 2012/0078624 | A1 | 3/2012 | Yook et al. |
| 2012/0078627 | A1 | 3/2012 | Wagner |
| 2012/0078635 | A1 | 3/2012 | Rothkopf et al. |
| 2012/0078747 | A1 | 3/2012 | Chakrabarti et al. |
| 2012/0082317 | A1 | 4/2012 | Pance et al. |
| 2012/0083286 | A1 | 4/2012 | Kim et al. |
| 2012/0084086 | A1 | 4/2012 | Gilbert et al. |
| 2012/0084087 | A1 | 4/2012 | Yang et al. |
| 2012/0084089 | A1 | 4/2012 | Lloyd et al. |
| 2012/0084634 | A1 | 4/2012 | Wong et al. |
| 2012/0088219 | A1 | 4/2012 | Briscoe et al. |
| 2012/0089331 | A1 | 4/2012 | Schmidt et al. |
| 2012/0089659 | A1 | 4/2012 | Halevi et al. |
| 2012/0094645 | A1 | 4/2012 | Jeffrey |
| 2012/0101823 | A1 | 4/2012 | Weng et al. |
| 2012/0105257 | A1 | 5/2012 | Murillo et al. |
| 2012/0108166 | A1 | 5/2012 | Hymel |
| 2012/0108221 | A1 | 5/2012 | Thomas et al. |
| 2012/0109632 | A1 | 5/2012 | Sugiura et al. |
| 2012/0109753 | A1 | 5/2012 | Kennewick et al. |
| 2012/0109997 | A1 | 5/2012 | Sparks et al. |
| 2012/0110456 | A1 | 5/2012 | Larco et al. |
| 2012/0114108 | A1 | 5/2012 | Katis et al. |
| 2012/0116770 | A1 | 5/2012 | Chen et al. |
| 2012/0117499 | A1 | 5/2012 | Mori et al. |
| 2012/0117590 | A1 | 5/2012 | Agnihotri et al. |
| 2012/0124126 | A1 | 5/2012 | Alcazar et al. |
| 2012/0124177 | A1 | 5/2012 | Sparks |
| 2012/0124178 | A1 | 5/2012 | Sparks |
| 2012/0128322 | A1 | 5/2012 | Shaffer et al. |
| 2012/0130709 | A1 | 5/2012 | Bocchieri et al. |
| 2012/0130995 | A1 | 5/2012 | Risvik et al. |
| 2012/0135714 | A1 | 5/2012 | King, II |
| 2012/0136529 | A1 | 5/2012 | Curtis et al. |
| 2012/0136572 | A1 | 5/2012 | Norton |
| 2012/0136649 | A1 | 5/2012 | Freising et al. |
| 2012/0136855 | A1 | 5/2012 | Ni et al. |
| 2012/0136985 | A1 | 5/2012 | Popescu et al. |
| 2012/0137367 | A1 | 5/2012 | Dupont et al. |
| 2012/0149342 | A1 | 6/2012 | Cohen et al. |
| 2012/0149394 | A1 | 6/2012 | Singh et al. |
| 2012/0150532 | A1 | 6/2012 | Mirowski et al. |
| 2012/0150544 | A1 | 6/2012 | McLoughlin et al. |
| 2012/0150580 | A1 | 6/2012 | Norton |
| 2012/0158293 | A1 | 6/2012 | Burnham |
| 2012/0158399 | A1 | 6/2012 | Tremblay et al. |

(56) References Cited

U.S. PATENT DOCUMENTS

2012/0158422 A1 6/2012 Burnham et al.
2012/0159380 A1 6/2012 Kocienda et al.
2012/0163710 A1 6/2012 Skaff et al.
2012/0166177 A1 6/2012 Beld et al.
2012/0166196 A1 6/2012 Ju et al.
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0176255 A1 7/2012 Choi et al.
2012/0179457 A1 7/2012 Newman et al.
2012/0179467 A1 7/2012 Williams et al.
2012/0179471 A1 7/2012 Newman et al.
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0203767 A1 8/2012 Williams et al.
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1* 8/2012 Jiang ....................... H04W 4/60
715/772
2012/0210378 A1 8/2012 Mccoy et al.
2012/0214141 A1 8/2012 Raya et al.
2012/0214517 A1 8/2012 Singh et al.
2012/0215640 A1 8/2012 Ramer et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl et al.
2012/0233207 A1 9/2012 Mohajer
2012/0233266 A1 9/2012 Hassan et al.
2012/0233280 A1 9/2012 Ebara
2012/0239403 A1 9/2012 Cano et al.
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0262296 A1 10/2012 Bezar
2012/0265482 A1 10/2012 Grokop et al.
2012/0265528 A1 10/2012 Gruber et al.
2012/0265535 A1 10/2012 Bryant-Rich et al.
2012/0265787 A1 10/2012 Hsu et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0278744 A1 11/2012 Kozitsyn et al.
2012/0278812 A1 11/2012 Wang
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0290657 A1 11/2012 Parks et al.
2012/0290680 A1 11/2012 Hwang
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297341 A1 11/2012 Glazer et al.
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0304239 A1 11/2012 Shahraray et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316774 A1 12/2012 Yariv et al.
2012/0316862 A1 12/2012 Sultan et al.
2012/0316875 A1 12/2012 Nyquist et al.
2012/0316878 A1 12/2012 Singleton et al.
2012/0316955 A1 12/2012 Panguluri et al.
2012/0317194 A1 12/2012 Tian
2012/0317498 A1 12/2012 Logan et al.
2012/0321112 A1 12/2012 Schubert et al.
2012/0323560 A1 12/2012 Perez Cortes et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0018659 A1 1/2013 Chi
2013/0018863 A1 1/2013 Regan et al.
2013/0024277 A1 1/2013 Tuchman et al.
2013/0024576 A1 1/2013 Dishneau et al.
2013/0027875 A1 1/2013 Zhu et al.
2013/0028404 A1 1/2013 Omalley et al.
2013/0030787 A1 1/2013 Cancedda et al.
2013/0030789 A1 1/2013 Dalce
2013/0030804 A1 1/2013 Zavaliagko et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.

(56) References Cited

U.S. PATENT DOCUMENTS

2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0047178 A1 2/2013 Moon et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0055099 A1 2/2013 Yao et al.
2013/0055147 A1 2/2013 Vasudev et al.
2013/0060571 A1 3/2013 Soemo et al.
2013/0061139 A1 3/2013 Mahkovec et al.
2013/0063611 A1 3/2013 Papakipos et al.
2013/0066832 A1 3/2013 Sheehan et al.
2013/0067307 A1 3/2013 Tian et al.
2013/0067312 A1 3/2013 Rose
2013/0067421 A1 3/2013 Osman et al.
2013/0069769 A1 3/2013 Pennington et al.
2013/0073286 A1 3/2013 Bastea-Forte et al.
2013/0073293 A1 3/2013 Jang et al.
2013/0073346 A1 3/2013 Chun et al.
2013/0073580 A1 3/2013 Mehanna et al.
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0082967 A1 4/2013 Hillis et al.
2013/0085755 A1 4/2013 Bringert et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 Lebeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Zeljkovic et al.
2013/0100017 A1 4/2013 Papakipos et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0107053 A1 5/2013 Ozaki
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0167242 A1 6/2013 Paliwal
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0173513 A1 7/2013 Chu et al.
2013/0174034 A1 7/2013 Brown et al.
2013/0176147 A1 7/2013 Anderson et al.
2013/0176244 A1 7/2013 Yamamoto et al.
2013/0176592 A1 7/2013 Sasaki
2013/0179168 A1 7/2013 Bae et al.
2013/0179172 A1 7/2013 Nakamura et al.
2013/0179440 A1 7/2013 Gordon
2013/0183942 A1 7/2013 Novick et al.
2013/0183944 A1 7/2013 Mozer et al.
2013/0185059 A1 7/2013 Riccardi et al.
2013/0185066 A1 7/2013 Tzirkel-hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0191408 A1 7/2013 Volkert
2013/0197911 A1 8/2013 Wei et al.
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0218553 A1 8/2013 Fujii et al.
2013/0218560 A1 8/2013 Hsiao et al.
2013/0218574 A1 8/2013 Falcon et al.
2013/0218899 A1 8/2013 Raghavan et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238326 A1 9/2013 Kim et al.
2013/0238647 A1 9/2013 Thompson
2013/0238729 A1 9/2013 Holzman et al.
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0262168 A1 10/2013 Makanawala et al.
2013/0268263 A1 10/2013 Park et al.
2013/0268956 A1 10/2013 Recco
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.

(56) References Cited

U.S. PATENT DOCUMENTS

2013/0275625 A1 10/2013 Taivalsaari et al.
2013/0275875 A1 10/2013 Gruber et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325480 A1 12/2013 Lee et al.
2013/0325481 A1 12/2013 Van Os et al.
2013/0325484 A1 12/2013 Chakladar et al.
2013/0325967 A1 12/2013 Parks et al.
2013/0325970 A1 12/2013 Roberts et al.
2013/0325979 A1 12/2013 Mansfield et al.
2013/0328809 A1 12/2013 Smith
2013/0329023 A1 12/2013 Suplee, III et al.
2013/0331127 A1 12/2013 Sabatelli et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332172 A1 12/2013 Prakash et al.
2013/0332400 A1 12/2013 González
2013/0332538 A1 12/2013 Clark et al.
2013/0339256 A1 12/2013 Shroff
2013/0339454 A1 12/2013 Walker et al.
2013/0339991 A1 12/2013 Ricci
2013/0342672 A1 12/2013 Gray et al.
2013/0343584 A1 12/2013 Bennett et al.
2013/0343721 A1 12/2013 Abecassis
2013/0346065 A1 12/2013 Davidson et al.
2013/0346068 A1 12/2013 Solem et al.
2013/0346347 A1 12/2013 Patterson et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0006012 A1 1/2014 Zhou et al.
2014/0006025 A1 1/2014 Krishnan et al.
2014/0006027 A1 1/2014 Kim et al.
2014/0006030 A1 1/2014 Fleizach et al.
2014/0006153 A1 1/2014 Thangam et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006955 A1 1/2014 Greenzeiger et al.
2014/0008163 A1 1/2014 Mikonaho et al.
2014/0012574 A1 1/2014 Pasupalak et al.
2014/0012580 A1 1/2014 Ganong et al.
2014/0012586 A1 1/2014 Rubin et al.
2014/0012587 A1 1/2014 Park
2014/0019116 A1 1/2014 Lundberg et al.
2014/0019133 A1 1/2014 Bao et al.
2014/0019460 A1 1/2014 Sambrani et al.
2014/0028029 A1 1/2014 Jochman
2014/0028477 A1 1/2014 Michalske
2014/0028735 A1 1/2014 Williams et al.
2014/0032453 A1 1/2014 Eustice et al.
2014/0033071 A1 1/2014 Gruber et al.
2014/0035823 A1 2/2014 Khoe et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040274 A1 2/2014 Aravamudan et al.
2014/0040748 A1 2/2014 Lemay et al.
2014/0040754 A1 2/2014 Donelli
2014/0040801 A1 2/2014 Patel et al.
2014/0040918 A1 2/2014 Li et al.
2014/0040961 A1 2/2014 Green et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1 2/2014 Chakra et al.
2014/0053082 A1 2/2014 Park et al.
2014/0053101 A1 2/2014 Buehler et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury
2014/0068751 A1 3/2014 Last et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074483 A1 3/2014 Van Os
2014/0074589 A1 3/2014 Nielsen et al.
2014/0074815 A1 3/2014 Plimton
2014/0075453 A1 3/2014 Bellessort et al.
2014/0078065 A1 3/2014 Akkok et al.
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar et al.
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082715 A1 3/2014 Grajek et al.
2014/0086458 A1 3/2014 Rogers et al.
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0095171 A1 4/2014 Lynch et al.
2014/0095172 A1 4/2014 Cabaco et al.
2014/0095173 A1 4/2014 Lynch et al.
2014/0095601 A1 4/2014 Abuelsaad et al.
2014/0095965 A1 4/2014 Li

(56) References Cited

U.S. PATENT DOCUMENTS

| | | | |
|---|---|---|---|
| 2014/0096209 | A1 | 4/2014 | Saraf et al. |
| 2014/0098247 | A1 | 4/2014 | Rao et al. |
| 2014/0100847 | A1 | 4/2014 | Ishii et al. |
| 2014/0101127 | A1 | 4/2014 | Simhon et al. |
| 2014/0104175 | A1 | 4/2014 | Ouyang et al. |
| 2014/0108017 | A1 | 4/2014 | Mason et al. |
| 2014/0108391 | A1 | 4/2014 | Volkert |
| 2014/0112556 | A1 | 4/2014 | Kalinli-akbacak |
| 2014/0114554 | A1 | 4/2014 | Lagassey |
| 2014/0115062 | A1 | 4/2014 | Liu et al. |
| 2014/0115114 | A1 | 4/2014 | Garmark et al. |
| 2014/0118155 | A1 | 5/2014 | Bowers et al. |
| 2014/0118624 | A1 | 5/2014 | Jang et al. |
| 2014/0122059 | A1 | 5/2014 | Patel et al. |
| 2014/0122085 | A1 | 5/2014 | Piety et al. |
| 2014/0122086 | A1 | 5/2014 | Kapur et al. |
| 2014/0122136 | A1 | 5/2014 | Jayanthi |
| 2014/0122153 | A1 | 5/2014 | Truitt |
| 2014/0129226 | A1 | 5/2014 | Lee et al. |
| 2014/0132935 | A1 | 5/2014 | Kim et al. |
| 2014/0134983 | A1 | 5/2014 | Jung et al. |
| 2014/0135036 | A1 | 5/2014 | Bonanni et al. |
| 2014/0136013 | A1 | 5/2014 | Wolverton et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0136987 | A1 | 5/2014 | Rodriguez |
| 2014/0142922 | A1 | 5/2014 | Liang et al. |
| 2014/0142923 | A1 | 5/2014 | Jones et al. |
| 2014/0142935 | A1 | 5/2014 | Lindahl et al. |
| 2014/0142953 | A1 | 5/2014 | Kim et al. |
| 2014/0143550 | A1 | 5/2014 | Ganong, III et al. |
| 2014/0143721 | A1 | 5/2014 | Suzuki et al. |
| 2014/0146200 | A1 | 5/2014 | Scott et al. |
| 2014/0149118 | A1 | 5/2014 | Lee et al. |
| 2014/0152577 | A1 | 6/2014 | Yuen et al. |
| 2014/0153709 | A1 | 6/2014 | Byrd et al. |
| 2014/0155031 | A1 | 6/2014 | Lee et al. |
| 2014/0156262 | A1 | 6/2014 | Yuen et al. |
| 2014/0156279 | A1 | 6/2014 | Okamoto et al. |
| 2014/0157319 | A1 | 6/2014 | Kimura et al. |
| 2014/0157422 | A1 | 6/2014 | Livshits et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163962 | A1 | 6/2014 | Castelli et al. |
| 2014/0163976 | A1 | 6/2014 | Park et al. |
| 2014/0163977 | A1 | 6/2014 | Hoffmeister et al. |
| 2014/0163981 | A1 | 6/2014 | Cook et al. |
| 2014/0163995 | A1 | 6/2014 | Burns et al. |
| 2014/0164305 | A1 | 6/2014 | Lynch et al. |
| 2014/0164312 | A1 | 6/2014 | Lynch et al. |
| 2014/0164476 | A1 | 6/2014 | Thomson |
| 2014/0164508 | A1 | 6/2014 | Lynch et al. |
| 2014/0164532 | A1 | 6/2014 | Lynch et al. |
| 2014/0164533 | A1 | 6/2014 | Lynch et al. |
| 2014/0164953 | A1 | 6/2014 | Lynch et al. |
| 2014/0169795 | A1 | 6/2014 | Clough |
| 2014/0171064 | A1 | 6/2014 | Das |
| 2014/0172878 | A1 | 6/2014 | Clark et al. |
| 2014/0173460 | A1 | 6/2014 | Kim |
| 2014/0176814 | A1 | 6/2014 | Ahn |
| 2014/0179295 | A1 | 6/2014 | Luebbers et al. |
| 2014/0180499 | A1 | 6/2014 | Cooper et al. |
| 2014/0180689 | A1 | 6/2014 | Kim et al. |
| 2014/0180697 | A1 | 6/2014 | Torok et al. |
| 2014/0181865 | A1 | 6/2014 | Koganei |
| 2014/0188460 | A1 | 7/2014 | Ouyang et al. |
| 2014/0188477 | A1 | 7/2014 | Zhang |
| 2014/0188478 | A1 | 7/2014 | Zhang |
| 2014/0188485 | A1 | 7/2014 | Kim et al. |
| 2014/0188835 | A1 | 7/2014 | Zhang et al. |
| 2014/0195226 | A1 | 7/2014 | Yun et al. |
| 2014/0195230 | A1 | 7/2014 | Han et al. |
| 2014/0195233 | A1 | 7/2014 | Bapat et al. |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207447 | A1 | 7/2014 | Jiang et al. |
| 2014/0207466 | A1 | 7/2014 | Smadi |
| 2014/0207468 | A1 | 7/2014 | Bartnik |
| 2014/0207582 | A1 | 7/2014 | Flinn et al. |
| 2014/0211944 | A1 | 7/2014 | Hayward et al. |
| 2014/0214429 | A1 | 7/2014 | Pantel |
| 2014/0214537 | A1 | 7/2014 | Yoo et al. |
| 2014/0215513 | A1 | 7/2014 | Ramer et al. |
| 2014/0218372 | A1 | 8/2014 | Missig et al. |
| 2014/0222435 | A1 | 8/2014 | Li et al. |
| 2014/0222436 | A1 | 8/2014 | Binder et al. |
| 2014/0222678 | A1 | 8/2014 | Sheets et al. |
| 2014/0222967 | A1 | 8/2014 | Harrang et al. |
| 2014/0223377 | A1 | 8/2014 | Shaw et al. |
| 2014/0223481 | A1 | 8/2014 | Fundament |
| 2014/0226503 | A1 | 8/2014 | Cooper et al. |
| 2014/0229158 | A1 | 8/2014 | Zweig et al. |
| 2014/0229184 | A1 | 8/2014 | Shires |
| 2014/0230055 | A1 | 8/2014 | Boehl |
| 2014/0232570 | A1 | 8/2014 | Skinder et al. |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0237366 | A1 | 8/2014 | Poulos et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244266 | A1 | 8/2014 | Brown et al. |
| 2014/0244268 | A1 | 8/2014 | Abdelsamie et al. |
| 2014/0244270 | A1 | 8/2014 | Han et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249812 | A1 | 9/2014 | Bou-Ghazale et al. |
| 2014/0249816 | A1 | 9/2014 | Pickering et al. |
| 2014/0249817 | A1 | 9/2014 | Hart et al. |
| 2014/0249820 | A1 | 9/2014 | Hsu et al. |
| 2014/0249821 | A1 | 9/2014 | Kennewick et al. |
| 2014/0250046 | A1 | 9/2014 | Winn et al. |
| 2014/0257809 | A1 | 9/2014 | Goel et al. |
| 2014/0257815 | A1 | 9/2014 | Zhao et al. |
| 2014/0257902 | A1 | 9/2014 | Moore et al. |
| 2014/0258324 | A1 | 9/2014 | Mauro et al. |
| 2014/0258357 | A1 | 9/2014 | Singh et al. |
| 2014/0258857 | A1 | 9/2014 | Dykstra-Erickson et al. |
| 2014/0258905 | A1 | 9/2014 | Lee et al. |
| 2014/0267022 | A1 | 9/2014 | Kim |
| 2014/0267599 | A1 | 9/2014 | Drouin et al. |
| 2014/0267933 | A1 | 9/2014 | Young |
| 2014/0272821 | A1 | 9/2014 | Pitschel et al. |
| 2014/0273979 | A1 | 9/2014 | Van Os et al. |
| 2014/0274005 | A1 | 9/2014 | Luna et al. |
| 2014/0274203 | A1 | 9/2014 | Ganong et al. |
| 2014/0274211 | A1 | 9/2014 | Sejnoha et al. |
| 2014/0278051 | A1 | 9/2014 | Mcgavran et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278426 | A1 | 9/2014 | Jost et al. |

(56) References Cited

U.S. PATENT DOCUMENTS

| | | | |
|---|---|---|---|
| 2014/0278429 | A1 | 9/2014 | Ganong, III |
| 2014/0278435 | A1 | 9/2014 | Ganong et al. |
| 2014/0278436 | A1 | 9/2014 | Khanna et al. |
| 2014/0278438 | A1 | 9/2014 | Hart et al. |
| 2014/0278443 | A1 | 9/2014 | Gunn et al. |
| 2014/0278444 | A1 | 9/2014 | Larson et al. |
| 2014/0278513 | A1 | 9/2014 | Prakash et al. |
| 2014/0279622 | A1 | 9/2014 | Lamoureux et al. |
| 2014/0279739 | A1 | 9/2014 | Elkington et al. |
| 2014/0279787 | A1 | 9/2014 | Cheng et al. |
| 2014/0280072 | A1 | 9/2014 | Coleman |
| 2014/0280107 | A1 | 9/2014 | Heymans et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0281944 | A1 | 9/2014 | Winer |
| 2014/0281983 | A1 | 9/2014 | Xian et al. |
| 2014/0281997 | A1 | 9/2014 | Fleizach et al. |
| 2014/0282003 | A1 | 9/2014 | Gruber et al. |
| 2014/0282007 | A1 | 9/2014 | Fleizach |
| 2014/0282045 | A1 | 9/2014 | Ayanam et al. |
| 2014/0282178 | A1 | 9/2014 | Borzello et al. |
| 2014/0282201 | A1 | 9/2014 | Pasquero et al. |
| 2014/0282203 | A1 | 9/2014 | Pasquero et al. |
| 2014/0282559 | A1 | 9/2014 | Verduzco et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |
| 2014/0297288 | A1 | 10/2014 | Yu et al. |
| 2014/0298395 | A1 | 10/2014 | Yang et al. |
| 2014/0304086 | A1 | 10/2014 | Dasdan et al. |
| 2014/0304605 | A1 | 10/2014 | Ohmura et al. |
| 2014/0309990 | A1 | 10/2014 | Gandrabur et al. |
| 2014/0309996 | A1 | 10/2014 | Zhang |
| 2014/0310001 | A1 | 10/2014 | Kalns et al. |
| 2014/0310002 | A1 | 10/2014 | Nitz et al. |
| 2014/0310348 | A1 | 10/2014 | Keskitalo et al. |
| 2014/0310365 | A1 | 10/2014 | Sample et al. |
| 2014/0310595 | A1 | 10/2014 | Acharya et al. |
| 2014/0313007 | A1 | 10/2014 | Harding |
| 2014/0315492 | A1 | 10/2014 | Woods |
| 2014/0316585 | A1 | 10/2014 | Boesveld et al. |
| 2014/0317030 | A1 | 10/2014 | Shen et al. |
| 2014/0317502 | A1 | 10/2014 | Brown et al. |
| 2014/0324429 | A1 | 10/2014 | Weilhammer et al. |
| 2014/0324884 | A1 | 10/2014 | Lindahl et al. |
| 2014/0330569 | A1 | 11/2014 | Kolavennu et al. |
| 2014/0330951 | A1 | 11/2014 | Sukoff et al. |
| 2014/0335823 | A1 | 11/2014 | Heredia et al. |
| 2014/0337037 | A1 | 11/2014 | Chi |
| 2014/0337048 | A1 | 11/2014 | Brown et al. |
| 2014/0337266 | A1 | 11/2014 | Wolverton et al. |
| 2014/0337370 | A1 | 11/2014 | Aravamudan et al. |
| 2014/0337371 | A1 | 11/2014 | Li |
| 2014/0337438 | A1 | 11/2014 | Govande et al. |
| 2014/0337621 | A1 | 11/2014 | Nakhimov |
| 2014/0337751 | A1 | 11/2014 | Lim et al. |
| 2014/0337814 | A1 | 11/2014 | Kalns et al. |
| 2014/0342762 | A1 | 11/2014 | Hajdu et al. |
| 2014/0343834 | A1 | 11/2014 | Demerchant et al. |
| 2014/0343943 | A1 | 11/2014 | Al-telmissani |
| 2014/0343946 | A1 | 11/2014 | Torok et al. |
| 2014/0344205 | A1 | 11/2014 | Luna et al. |
| 2014/0344627 | A1 | 11/2014 | Schaub et al. |
| 2014/0344687 | A1 | 11/2014 | Durham et al. |
| 2014/0347181 | A1 | 11/2014 | Luna et al. |
| 2014/0350847 | A1 | 11/2014 | Ichinokawa |
| 2014/0350924 | A1 | 11/2014 | Zurek et al. |
| 2014/0350933 | A1 | 11/2014 | Bak et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358523 | A1 | 12/2014 | Sheth et al. |
| 2014/0358549 | A1 | 12/2014 | O'connor et al. |
| 2014/0359637 | A1 | 12/2014 | Yan |
| 2014/0359709 | A1 | 12/2014 | Nassar et al. |
| 2014/0361973 | A1 | 12/2014 | Raux et al. |
| 2014/0363074 | A1 | 12/2014 | Dolfing et al. |
| 2014/0364149 | A1 | 12/2014 | Marti et al. |
| 2014/0365209 | A1 | 12/2014 | Evermann |
| 2014/0365214 | A1 | 12/2014 | Bayley |
| 2014/0365216 | A1 | 12/2014 | Gruber et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365505 | A1 | 12/2014 | Clark et al. |
| 2014/0365880 | A1 | 12/2014 | Bellegarda |
| 2014/0365885 | A1 | 12/2014 | Carson et al. |
| 2014/0365895 | A1 | 12/2014 | Paulson et al. |
| 2014/0365922 | A1 | 12/2014 | Yang |
| 2014/0365945 | A1 | 12/2014 | Karunamuni et al. |
| 2014/0370817 | A1 | 12/2014 | Luna |
| 2014/0370841 | A1 | 12/2014 | Roberts et al. |
| 2014/0372112 | A1 | 12/2014 | Xue et al. |
| 2014/0372356 | A1 | 12/2014 | Bilal et al. |
| 2014/0372468 | A1 | 12/2014 | Collins et al. |
| 2014/0372931 | A1 | 12/2014 | Zhai et al. |
| 2014/0379334 | A1 | 12/2014 | Fry |
| 2014/0379341 | A1 | 12/2014 | Seo et al. |
| 2014/0379798 | A1 | 12/2014 | Bunner et al. |
| 2014/0380285 | A1 | 12/2014 | Gabel et al. |
| 2015/0003797 | A1 | 1/2015 | Schmidt |
| 2015/0004958 | A1 | 1/2015 | Wang et al. |
| 2015/0006148 | A1 | 1/2015 | Goldszmit et al. |
| 2015/0006157 | A1 | 1/2015 | Silva et al. |
| 2015/0006167 | A1 | 1/2015 | Kato et al. |
| 2015/0006176 | A1 | 1/2015 | Pogue et al. |
| 2015/0006178 | A1 | 1/2015 | Peng et al. |
| 2015/0006184 | A1 | 1/2015 | Marti et al. |
| 2015/0006199 | A1 | 1/2015 | Snider et al. |
| 2015/0012271 | A1 | 1/2015 | Peng et al. |
| 2015/0019219 | A1 | 1/2015 | Tzirkel-Hancock et al. |
| 2015/0019221 | A1 | 1/2015 | Lee et al. |
| 2015/0019944 | A1 | 1/2015 | Kalgi |
| 2015/0019974 | A1 | 1/2015 | Doi et al. |
| 2015/0025405 | A1 | 1/2015 | Vairavan et al. |
| 2015/0026620 | A1 | 1/2015 | Kwon et al. |
| 2015/0027178 | A1 | 1/2015 | Scalisi |
| 2015/0031416 | A1 | 1/2015 | Labowicz et al. |
| 2015/0032443 | A1 | 1/2015 | Karov et al. |
| 2015/0033219 | A1 | 1/2015 | Breiner et al. |
| 2015/0033275 | A1 | 1/2015 | Natani et al. |
| 2015/0034855 | A1 | 2/2015 | Shen |
| 2015/0038161 | A1 | 2/2015 | Jakobson et al. |
| 2015/0039292 | A1 | 2/2015 | Suleman et al. |
| 2015/0039295 | A1 | 2/2015 | Soschen |
| 2015/0039299 | A1 | 2/2015 | Weinstein et al. |
| 2015/0039305 | A1 | 2/2015 | Huang |
| 2015/0039606 | A1 | 2/2015 | Salaka et al. |
| 2015/0040012 | A1 | 2/2015 | Faaborg et al. |
| 2015/0045003 | A1 | 2/2015 | Vora et al. |
| 2015/0045007 | A1 | 2/2015 | Cash |
| 2015/0045068 | A1 | 2/2015 | Soifer et al. |
| 2015/0046434 | A1 | 2/2015 | Lim et al. |
| 2015/0046537 | A1 | 2/2015 | Rakib |
| 2015/0046828 | A1 | 2/2015 | Desai et al. |
| 2015/0050633 | A1 | 2/2015 | Christmas et al. |
| 2015/0050923 | A1 | 2/2015 | Tu et al. |
| 2015/0051754 | A1 | 2/2015 | Kwon et al. |
| 2015/0053779 | A1 | 2/2015 | Adamek et al. |
| 2015/0053781 | A1 | 2/2015 | Nelson et al. |
| 2015/0055879 | A1 | 2/2015 | Yang |
| 2015/0058013 | A1 | 2/2015 | Pakhomov et al. |
| 2015/0058018 | A1 | 2/2015 | Georges et al. |
| 2015/0058720 | A1 | 2/2015 | Smadja et al. |
| 2015/0058785 | A1 | 2/2015 | Ookawara |
| 2015/0065149 | A1 | 3/2015 | Russell et al. |
| 2015/0065200 | A1 | 3/2015 | Namgung et al. |
| 2015/0066494 | A1 | 3/2015 | Salvador et al. |

(56) References Cited

U.S. PATENT DOCUMENTS

2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067822 A1 3/2015 Randall
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0106737 A1 4/2015 Montoy-Wilson et al.
2015/0113407 A1 4/2015 Hoffert et al.
2015/0113435 A1 4/2015 Phillips
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.
2015/0127348 A1 5/2015 Follis
2015/0127350 A1 5/2015 Agiomyrgiannakis
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160855 A1 6/2015 Bi
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.
2015/0172262 A1 6/2015 Ortiz, Jr. et al.
2015/0172463 A1 6/2015 Quast et al.
2015/0178388 A1 6/2015 Winnemoeller et al.
2015/0178785 A1 6/2015 Salonen
2015/0179176 A1 6/2015 Ryu et al.
2015/0181285 A1 6/2015 Zhang et al.
2015/0185964 A1 7/2015 Stout
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221304 A1 8/2015 Stewart
2015/0221307 A1 8/2015 Shah et al.
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228281 A1 8/2015 Raniere
2015/0228283 A1 8/2015 Ehsani et al.
2015/0228292 A1 8/2015 Goldstein et al.
2015/0230095 A1 8/2015 Smith et al.
2015/0234636 A1 8/2015 Barnes, Jr.
2015/0234800 A1 8/2015 Patrick et al.
2015/0237301 A1 8/2015 Shi et al.
2015/0242091 A1 8/2015 Lu et al.
2015/0242385 A1 8/2015 Bao et al.
2015/0243278 A1 8/2015 Kibre et al.
2015/0243279 A1 8/2015 Morse et al.
2015/0243283 A1 8/2015 Halash et al.
2015/0244665 A1 8/2015 Choi et al.
2015/0245154 A1 8/2015 Dadu et al.
2015/0248651 A1 9/2015 Akutagawa et al.
2015/0248886 A1 9/2015 Sarikaya et al.
2015/0253146 A1 9/2015 Annapureddy et al.
2015/0253885 A1 9/2015 Kagan et al.
2015/0254057 A1 9/2015 Klein et al.
2015/0254058 A1 9/2015 Klein et al.
2015/0254333 A1 9/2015 Fife et al.

(56) References Cited

U.S. PATENT DOCUMENTS

| | | | |
|---|---|---|---|
| 2015/0255071 | A1 | 9/2015 | Chiba |
| 2015/0256873 | A1 | 9/2015 | Klein et al. |
| 2015/0261298 | A1 | 9/2015 | Li |
| 2015/0261496 | A1 | 9/2015 | Faaborg et al. |
| 2015/0261850 | A1 | 9/2015 | Mittal |
| 2015/0269139 | A1 | 9/2015 | McAteer et al. |
| 2015/0269617 | A1 | 9/2015 | Mikurak |
| 2015/0269677 | A1 | 9/2015 | Milne |
| 2015/0269943 | A1 | 9/2015 | VanBlon et al. |
| 2015/0277574 | A1 | 10/2015 | Jain et al. |
| 2015/0278348 | A1 | 10/2015 | Paruchuri et al. |
| 2015/0278370 | A1 | 10/2015 | Stratvert et al. |
| 2015/0278737 | A1 | 10/2015 | Chen Huebscher et al. |
| 2015/0279358 | A1 | 10/2015 | Kingsbury et al. |
| 2015/0279360 | A1 | 10/2015 | Mengibar et al. |
| 2015/0279366 | A1 | 10/2015 | Krestnikov et al. |
| 2015/0281380 | A1 | 10/2015 | Wang et al. |
| 2015/0281401 | A1 | 10/2015 | Le et al. |
| 2015/0286627 | A1 | 10/2015 | Chang et al. |
| 2015/0286716 | A1 | 10/2015 | Snibbe et al. |
| 2015/0286937 | A1 | 10/2015 | Hildebrand |
| 2015/0287401 | A1 | 10/2015 | Lee et al. |
| 2015/0287409 | A1 | 10/2015 | Jang |
| 2015/0287411 | A1 | 10/2015 | Kojima et al. |
| 2015/0288629 | A1 | 10/2015 | Choi et al. |
| 2015/0294086 | A1 | 10/2015 | Kare et al. |
| 2015/0294377 | A1 | 10/2015 | Chow |
| 2015/0294516 | A1 | 10/2015 | Chiang |
| 2015/0295915 | A1 | 10/2015 | Xiu |
| 2015/0301796 | A1 | 10/2015 | Visser et al. |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0302870 | A1 | 10/2015 | Burke et al. |
| 2015/0309997 | A1 | 10/2015 | Lee et al. |
| 2015/0310114 | A1 | 10/2015 | Ryger et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0310888 | A1 | 10/2015 | Chen |
| 2015/0312182 | A1 | 10/2015 | Langholz |
| 2015/0312409 | A1 | 10/2015 | Czarnecki et al. |
| 2015/0314454 | A1 | 11/2015 | Breazeal et al. |
| 2015/0317069 | A1 | 11/2015 | Clements et al. |
| 2015/0317310 | A1 | 11/2015 | Eiche et al. |
| 2015/0319411 | A1 | 11/2015 | Kasmir et al. |
| 2015/0324041 | A1 | 11/2015 | Varley et al. |
| 2015/0324334 | A1 | 11/2015 | Lee et al. |
| 2015/0331664 | A1 | 11/2015 | Osawa et al. |
| 2015/0331711 | A1 | 11/2015 | Huang et al. |
| 2015/0332667 | A1 | 11/2015 | Mason |
| 2015/0334346 | A1 | 11/2015 | Cheatham, III et al. |
| 2015/0339049 | A1 | 11/2015 | Kasemset et al. |
| 2015/0339391 | A1 | 11/2015 | Kang et al. |
| 2015/0340033 | A1 | 11/2015 | Di Fabbrizio et al. |
| 2015/0340040 | A1 | 11/2015 | Mun et al. |
| 2015/0340042 | A1 | 11/2015 | Sejnoha et al. |
| 2015/0341717 | A1 | 11/2015 | Song et al. |
| 2015/0346845 | A1 | 12/2015 | Di Censo et al. |
| 2015/0347086 | A1 | 12/2015 | Liedholm et al. |
| 2015/0347381 | A1 | 12/2015 | Bellegarda |
| 2015/0347382 | A1 | 12/2015 | Dolfing et al. |
| 2015/0347383 | A1 | 12/2015 | Willmore et al. |
| 2015/0347385 | A1 | 12/2015 | Flor et al. |
| 2015/0347393 | A1 | 12/2015 | Futrell et al. |
| 2015/0347552 | A1 | 12/2015 | Habouzit et al. |
| 2015/0347733 | A1 | 12/2015 | Tsou et al. |
| 2015/0347985 | A1 | 12/2015 | Gross et al. |
| 2015/0348533 | A1 | 12/2015 | Saddler et al. |
| 2015/0348547 | A1 | 12/2015 | Paulik et al. |
| 2015/0348548 | A1 | 12/2015 | Piernot et al. |
| 2015/0348549 | A1 | 12/2015 | Giuli et al. |
| 2015/0348551 | A1 | 12/2015 | Gruber et al. |
| 2015/0348554 | A1 | 12/2015 | Orr et al. |
| 2015/0348555 | A1 | 12/2015 | Sugita |
| 2015/0348565 | A1 | 12/2015 | Rhoten et al. |
| 2015/0349934 | A1 | 12/2015 | Pollack et al. |
| 2015/0350031 | A1 | 12/2015 | Burks et al. |
| 2015/0350342 | A1 | 12/2015 | Thorpe et al. |
| 2015/0350594 | A1 | 12/2015 | Mate et al. |
| 2015/0352999 | A1 | 12/2015 | Bando et al. |
| 2015/0355879 | A1 | 12/2015 | Beckhardt et al. |
| 2015/0356410 | A1 | 12/2015 | Faith et al. |
| 2015/0363587 | A1 | 12/2015 | Ahn et al. |
| 2015/0364128 | A1 | 12/2015 | Zhao et al. |
| 2015/0364140 | A1 | 12/2015 | Thörn |
| 2015/0370531 | A1 | 12/2015 | Faaborg |
| 2015/0370780 | A1 | 12/2015 | Wang et al. |
| 2015/0370787 | A1 | 12/2015 | Akbacak et al. |
| 2015/0370884 | A1 | 12/2015 | Hurley et al. |
| 2015/0371215 | A1 | 12/2015 | Zhou et al. |
| 2015/0371529 | A1 | 12/2015 | Dolecki |
| 2015/0371639 | A1 | 12/2015 | Foerster et al. |
| 2015/0371663 | A1 | 12/2015 | Gustafson et al. |
| 2015/0371665 | A1 | 12/2015 | Naik et al. |
| 2015/0373183 | A1 | 12/2015 | Woolsey et al. |
| 2015/0379118 | A1 | 12/2015 | Wickenkamp et al. |
| 2015/0379414 | A1 | 12/2015 | Yeh et al. |
| 2015/0379993 | A1 | 12/2015 | Subhojit et al. |
| 2015/0381923 | A1 | 12/2015 | Wickenkamp et al. |
| 2015/0382047 | A1 | 12/2015 | Van Os et al. |
| 2015/0382079 | A1 | 12/2015 | Lister et al. |
| 2015/0382147 | A1 | 12/2015 | Clark et al. |
| 2016/0004690 | A1 | 1/2016 | Bangalore et al. |
| 2016/0005320 | A1 | 1/2016 | deCharms et al. |
| 2016/0012038 | A1 | 1/2016 | Edwards et al. |
| 2016/0014476 | A1 | 1/2016 | Caliendo, Jr. et al. |
| 2016/0018872 | A1 | 1/2016 | Tu et al. |
| 2016/0018900 | A1 | 1/2016 | Tu et al. |
| 2016/0018959 | A1 | 1/2016 | Yamashita et al. |
| 2016/0019886 | A1 | 1/2016 | Hong |
| 2016/0021414 | A1 | 1/2016 | Padi et al. |
| 2016/0026258 | A1 | 1/2016 | Ou et al. |
| 2016/0027431 | A1 | 1/2016 | Kurzweil et al. |
| 2016/0028666 | A1 | 1/2016 | Li |
| 2016/0029316 | A1 | 1/2016 | Mohan et al. |
| 2016/0034042 | A1 | 2/2016 | Joo |
| 2016/0034811 | A1 | 2/2016 | Paulik et al. |
| 2016/0036953 | A1 | 2/2016 | Lee et al. |
| 2016/0041809 | A1 | 2/2016 | Clayton et al. |
| 2016/0042735 | A1 | 2/2016 | Vibbert et al. |
| 2016/0042748 | A1 | 2/2016 | Jain et al. |
| 2016/0043905 | A1 | 2/2016 | Fiedler |
| 2016/0048666 | A1 | 2/2016 | Dey et al. |
| 2016/0050254 | A1 | 2/2016 | Rao et al. |
| 2016/0055422 | A1 | 2/2016 | Li |
| 2016/0062605 | A1 | 3/2016 | Agarwal et al. |
| 2016/0063094 | A1 | 3/2016 | Udupa et al. |
| 2016/0063998 | A1 | 3/2016 | Krishnamoorthy et al. |
| 2016/0070581 | A1 | 3/2016 | Soon-Shiong |
| 2016/0071516 | A1 | 3/2016 | Lee et al. |
| 2016/0071517 | A1 | 3/2016 | Beaver et al. |
| 2016/0071521 | A1 | 3/2016 | Haughay |
| 2016/0072940 | A1 | 3/2016 | Cronin |
| 2016/0077794 | A1 | 3/2016 | Kim et al. |
| 2016/0078860 | A1 | 3/2016 | Paulik et al. |
| 2016/0080165 | A1 | 3/2016 | Ehsani et al. |
| 2016/0080475 | A1 | 3/2016 | Singh et al. |
| 2016/0085295 | A1 | 3/2016 | Shimy et al. |
| 2016/0085827 | A1 | 3/2016 | Chadha et al. |
| 2016/0086116 | A1 | 3/2016 | Rao et al. |
| 2016/0086599 | A1 | 3/2016 | Kurata et al. |
| 2016/0088335 | A1 | 3/2016 | Zucchetta |
| 2016/0091967 | A1 | 3/2016 | Prokofieva et al. |
| 2016/0092434 | A1 | 3/2016 | Bellegarda |
| 2016/0092447 | A1 | 3/2016 | Pathurudeen et al. |
| 2016/0092766 | A1 | 3/2016 | Sainath et al. |
| 2016/0093291 | A1 | 3/2016 | Kim |
| 2016/0093298 | A1 | 3/2016 | Naik et al. |
| 2016/0093301 | A1 | 3/2016 | Bellegarda et al. |
| 2016/0093304 | A1 | 3/2016 | Kim et al. |
| 2016/0094700 | A1 | 3/2016 | Lee et al. |
| 2016/0094889 | A1 | 3/2016 | Venkataraman et al. |
| 2016/0094979 | A1 | 3/2016 | Naik et al. |

(56) References Cited

U.S. PATENT DOCUMENTS

2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0111091 A1 4/2016 Bakish
2016/0112746 A1 4/2016 Zhang et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0150020 A1 5/2016 Farmer et al.
2016/0154624 A1 6/2016 Son et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1 6/2016 Kannan et al.
2016/0196110 A1 7/2016 Yehoshua et al.
2016/0198319 A1 7/2016 Huang et al.
2016/0203002 A1 7/2016 Kannan et al.
2016/0210551 A1 7/2016 Lee et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0227107 A1 8/2016 Beaumont
2016/0232500 A1 8/2016 Wang et al.
2016/0239645 A1 8/2016 Heo et al.
2016/0240187 A1 8/2016 Fleizach et al.
2016/0240189 A1 8/2016 Lee et al.
2016/0240192 A1 8/2016 Raghuvir
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labský et al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0266871 A1 9/2016 Schmid et al.
2016/0267904 A1 9/2016 Biadsy et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293157 A1 10/2016 Chen et al.
2016/0293168 A1 10/2016 Chen
2016/0294755 A1 10/2016 Prabhu
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0307566 A1 10/2016 Bellegarda
2016/0308799 A1 10/2016 Schubert et al.
2016/0313906 A1 10/2016 Kilchenko et al.
2016/0314788 A1 10/2016 Jitkoff et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-Sipilä et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0328147 A1 11/2016 Zhang et al.
2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335532 A1 11/2016 Sanghavi et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0350650 A1 12/2016 Leeman-Munk et al.
2016/0351190 A1 12/2016 Piernot et al.
2016/0352567 A1 12/2016 Robbins et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0372119 A1 12/2016 Sak et al.
2016/0378747 A1 12/2016 Orr et al.
2016/0379091 A1 12/2016 Lin et al.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0003931 A1 1/2017 Dvortsov et al.
2017/0004824 A1 1/2017 Yoo et al.
2017/0005818 A1 1/2017 Gould
2017/0011091 A1 1/2017 Chehreghani

(56) References Cited

U.S. PATENT DOCUMENTS

| | | | |
|---|---|---|---|
| 2017/0011303 | A1 | 1/2017 | Annapureddy et al. |
| 2017/0011742 | A1 | 1/2017 | Jing et al. |
| 2017/0013124 | A1 | 1/2017 | Havelka et al. |
| 2017/0013331 | A1 | 1/2017 | Watanabe et al. |
| 2017/0018271 | A1 | 1/2017 | Khan et al. |
| 2017/0019987 | A1 | 1/2017 | Dragone et al. |
| 2017/0023963 | A1 | 1/2017 | Davis et al. |
| 2017/0025124 | A1 | 1/2017 | Mixter et al. |
| 2017/0026318 | A1 | 1/2017 | Daniel et al. |
| 2017/0026509 | A1 | 1/2017 | Rand |
| 2017/0031576 | A1 | 2/2017 | Saoji et al. |
| 2017/0032783 | A1 | 2/2017 | Lord et al. |
| 2017/0032787 | A1 | 2/2017 | Dayal |
| 2017/0032791 | A1 | 2/2017 | Elson et al. |
| 2017/0039283 | A1 | 2/2017 | Bennett et al. |
| 2017/0039475 | A1 | 2/2017 | Cheyer et al. |
| 2017/0040002 | A1 | 2/2017 | Basson et al. |
| 2017/0047063 | A1 | 2/2017 | Ohmura et al. |
| 2017/0053652 | A1 | 2/2017 | Choi et al. |
| 2017/0055895 | A1 | 3/2017 | Jardins et al. |
| 2017/0060853 | A1 | 3/2017 | Lee et al. |
| 2017/0061423 | A1 | 3/2017 | Bryant et al. |
| 2017/0068423 | A1 | 3/2017 | Napolitano et al. |
| 2017/0068513 | A1 | 3/2017 | Stasior et al. |
| 2017/0068550 | A1 | 3/2017 | Zeitlin |
| 2017/0068670 | A1 | 3/2017 | Orr et al. |
| 2017/0069308 | A1 | 3/2017 | Aleksic et al. |
| 2017/0075653 | A1 | 3/2017 | Dawidowsky et al. |
| 2017/0076720 | A1 | 3/2017 | Gopalan et al. |
| 2017/0076721 | A1 | 3/2017 | Bargetzi et al. |
| 2017/0078490 | A1 | 3/2017 | Kaminsky et al. |
| 2017/0083179 | A1 | 3/2017 | Gruber et al. |
| 2017/0083285 | A1 | 3/2017 | Meyers et al. |
| 2017/0083504 | A1 | 3/2017 | Huang |
| 2017/0084277 | A1 | 3/2017 | Sharifi |
| 2017/0085547 | A1 | 3/2017 | De Aguiar et al. |
| 2017/0090569 | A1 | 3/2017 | Levesque |
| 2017/0091168 | A1 | 3/2017 | Bellegarda et al. |
| 2017/0091169 | A1 | 3/2017 | Bellegarda et al. |
| 2017/0091612 | A1 | 3/2017 | Gruber et al. |
| 2017/0092259 | A1 | 3/2017 | Jeon |
| 2017/0092270 | A1 | 3/2017 | Newendorp et al. |
| 2017/0092278 | A1 | 3/2017 | Evermann et al. |
| 2017/0093356 | A1 | 3/2017 | Cudak et al. |
| 2017/0102837 | A1 | 4/2017 | Toumpelis |
| 2017/0102915 | A1 | 4/2017 | Kuscher et al. |
| 2017/0103749 | A1 | 4/2017 | Zhao et al. |
| 2017/0105190 | A1 | 4/2017 | Logan et al. |
| 2017/0110117 | A1 | 4/2017 | Chakladar et al. |
| 2017/0116177 | A1 | 4/2017 | Walia |
| 2017/0116982 | A1 | 4/2017 | Gelfenbeyn et al. |
| 2017/0116989 | A1 | 4/2017 | Yadgar et al. |
| 2017/0124190 | A1 | 5/2017 | Wang et al. |
| 2017/0125016 | A1 | 5/2017 | Wang |
| 2017/0127124 | A9 | 5/2017 | Wilson et al. |
| 2017/0131778 | A1 | 5/2017 | Iyer |
| 2017/0132019 | A1 | 5/2017 | Karashchuk et al. |
| 2017/0132199 | A1 | 5/2017 | Vescovi et al. |
| 2017/0133007 | A1 | 5/2017 | Drewes |
| 2017/0140041 | A1 | 5/2017 | Dotan-Cohen et al. |
| 2017/0140644 | A1 | 5/2017 | Hwang et al. |
| 2017/0140760 | A1 | 5/2017 | Sachdev |
| 2017/0147841 | A1 | 5/2017 | Stagg et al. |
| 2017/0148044 | A1 | 5/2017 | Fukuda et al. |
| 2017/0154033 | A1 | 6/2017 | Lee |
| 2017/0154055 | A1 | 6/2017 | Dimson et al. |
| 2017/0155940 | A1 | 6/2017 | Jin et al. |
| 2017/0161018 | A1 | 6/2017 | Lemay et al. |
| 2017/0161268 | A1 | 6/2017 | Badaskar |
| 2017/0161293 | A1 | 6/2017 | Ionescu et al. |
| 2017/0161393 | A1 | 6/2017 | Oh et al. |
| 2017/0162191 | A1 | 6/2017 | Grost et al. |
| 2017/0162203 | A1 | 6/2017 | Huang et al. |
| 2017/0169818 | A1 | 6/2017 | Vanblon et al. |
| 2017/0169819 | A1 | 6/2017 | Mese et al. |
| 2017/0177547 | A1 | 6/2017 | Ciereszko et al. |
| 2017/0178619 | A1 | 6/2017 | Naik et al. |
| 2017/0178620 | A1 | 6/2017 | Fleizach et al. |
| 2017/0178626 | A1 | 6/2017 | Gruber et al. |
| 2017/0180499 | A1 | 6/2017 | Gelfenbeyn et al. |
| 2017/0185375 | A1 | 6/2017 | Martel et al. |
| 2017/0185581 | A1 | 6/2017 | Bojja et al. |
| 2017/0186429 | A1 | 6/2017 | Giuli et al. |
| 2017/0187711 | A1 | 6/2017 | Joo et al. |
| 2017/0193083 | A1 | 7/2017 | Bhatt et al. |
| 2017/0195493 | A1 | 7/2017 | Sudarsan et al. |
| 2017/0195636 | A1 | 7/2017 | Child et al. |
| 2017/0199870 | A1 | 7/2017 | Zheng et al. |
| 2017/0199874 | A1 | 7/2017 | Patel et al. |
| 2017/0200066 | A1 | 7/2017 | Wang et al. |
| 2017/0201609 | A1 | 7/2017 | Salmenkaita et al. |
| 2017/0201613 | A1 | 7/2017 | Engelke et al. |
| 2017/0206899 | A1 | 7/2017 | Bryant et al. |
| 2017/0215052 | A1 | 7/2017 | Koum et al. |
| 2017/0221486 | A1 | 8/2017 | Kurata et al. |
| 2017/0223189 | A1 | 8/2017 | Meredith et al. |
| 2017/0227935 | A1 | 8/2017 | Su et al. |
| 2017/0228367 | A1 | 8/2017 | Pasupalak et al. |
| 2017/0228382 | A1 | 8/2017 | Haviv et al. |
| 2017/0230429 | A1 | 8/2017 | Garmark et al. |
| 2017/0230497 | A1 | 8/2017 | Kim et al. |
| 2017/0230709 | A1 | 8/2017 | Van Os et al. |
| 2017/0235361 | A1 | 8/2017 | Rigazio et al. |
| 2017/0235618 | A1 | 8/2017 | Lin et al. |
| 2017/0235721 | A1 | 8/2017 | Almosallam et al. |
| 2017/0236512 | A1 | 8/2017 | Williams et al. |
| 2017/0236514 | A1 | 8/2017 | Nelson |
| 2017/0238039 | A1 | 8/2017 | Sabattini |
| 2017/0242653 | A1 | 8/2017 | Lang et al. |
| 2017/0242657 | A1 | 8/2017 | Jarvis et al. |
| 2017/0243468 | A1 | 8/2017 | Dotan-Cohen et al. |
| 2017/0243576 | A1 | 8/2017 | Millington et al. |
| 2017/0243586 | A1 | 8/2017 | Civelli et al. |
| 2017/0256256 | A1 | 9/2017 | Wang et al. |
| 2017/0263247 | A1 | 9/2017 | Kang et al. |
| 2017/0263248 | A1 | 9/2017 | Gruber et al. |
| 2017/0263249 | A1 | 9/2017 | Akbacak et al. |
| 2017/0264451 | A1 | 9/2017 | Yu et al. |
| 2017/0264711 | A1 | 9/2017 | Natarajan et al. |
| 2017/0270912 | A1 | 9/2017 | Levit et al. |
| 2017/0278514 | A1 | 9/2017 | Mathias et al. |
| 2017/0285915 | A1 | 10/2017 | Napolitano et al. |
| 2017/0286397 | A1 | 10/2017 | Gonzalez |
| 2017/0287472 | A1 | 10/2017 | Ogawa et al. |
| 2017/0289305 | A1 | 10/2017 | Liensberger et al. |
| 2017/0295446 | A1 | 10/2017 | Shivappa |
| 2017/0308609 | A1 | 10/2017 | Berkhin et al. |
| 2017/0311005 | A1 | 10/2017 | Lin |
| 2017/0316775 | A1 | 11/2017 | Le et al. |
| 2017/0316782 | A1 | 11/2017 | Haughay |
| 2017/0319123 | A1 | 11/2017 | Voss et al. |
| 2017/0323637 | A1 | 11/2017 | Naik |
| 2017/0329466 | A1 | 11/2017 | Krenkler et al. |
| 2017/0329490 | A1 | 11/2017 | Esinovskaya et al. |
| 2017/0329572 | A1 | 11/2017 | Shah et al. |
| 2017/0329630 | A1 | 11/2017 | Jann et al. |
| 2017/0330567 | A1 | 11/2017 | Van Wissen et al. |
| 2017/0337035 | A1 | 11/2017 | Choudhary et al. |
| 2017/0337478 | A1 | 11/2017 | Sarikaya et al. |
| 2017/0345411 | A1 | 11/2017 | Raitio et al. |
| 2017/0345420 | A1 | 11/2017 | Barnett, Jr. |
| 2017/0345429 | A1 | 11/2017 | Hardee et al. |
| 2017/0346949 | A1 | 11/2017 | Sanghavi et al. |
| 2017/0351487 | A1 | 12/2017 | Avilés-Casco et al. |
| 2017/0352346 | A1 | 12/2017 | Paulik et al. |
| 2017/0352350 | A1 | 12/2017 | Booker et al. |
| 2017/0357478 | A1 | 12/2017 | Piersol et al. |
| 2017/0357632 | A1 | 12/2017 | Pagallo et al. |
| 2017/0357633 | A1 | 12/2017 | Wang et al. |
| 2017/0357637 | A1 | 12/2017 | Nell et al. |
| 2017/0357640 | A1 | 12/2017 | Bellegarda et al. |
| 2017/0357716 | A1 | 12/2017 | Bellegarda et al. |
| 2017/0358300 | A1 | 12/2017 | Laurens et al. |
| 2017/0358301 | A1 | 12/2017 | Raitio et al. |

(56) References Cited

U.S. PATENT DOCUMENTS

| | | | |
|---|---|---|---|
| 2017/0358302 | A1 | 12/2017 | Orr et al. |
| 2017/0358303 | A1 | 12/2017 | Walker, II et al. |
| 2017/0358304 | A1 | 12/2017 | Castillo et al. |
| 2017/0358305 | A1 | 12/2017 | Kudurshian et al. |
| 2017/0358317 | A1 | 12/2017 | James |
| 2017/0365251 | A1 | 12/2017 | Park et al. |
| 2017/0371509 | A1 | 12/2017 | Jung et al. |
| 2017/0371885 | A1 | 12/2017 | Aggarwal et al. |
| 2017/0374093 | A1 | 12/2017 | Dhar et al. |
| 2017/0374176 | A1 | 12/2017 | Agrawal et al. |
| 2018/0005112 | A1 | 1/2018 | Iso-Sipila et al. |
| 2018/0007060 | A1 | 1/2018 | Leblang et al. |
| 2018/0007096 | A1 | 1/2018 | Levin et al. |
| 2018/0007538 | A1 | 1/2018 | Naik et al. |
| 2018/0012596 | A1 | 1/2018 | Piernot et al. |
| 2018/0018248 | A1 | 1/2018 | Bhargava et al. |
| 2018/0024985 | A1 | 1/2018 | Asano |
| 2018/0033431 | A1 | 2/2018 | Newendorp et al. |
| 2018/0033436 | A1 | 2/2018 | Zhou |
| 2018/0047201 | A1 | 2/2018 | Filev et al. |
| 2018/0047406 | A1 | 2/2018 | Park |
| 2018/0052909 | A1 | 2/2018 | Sharifi et al. |
| 2018/0054505 | A1 | 2/2018 | Hart et al. |
| 2018/0060032 | A1 | 3/2018 | Boesen |
| 2018/0060301 | A1 | 3/2018 | Li et al. |
| 2018/0060312 | A1 | 3/2018 | Won |
| 2018/0061400 | A1 | 3/2018 | Carbune et al. |
| 2018/0061401 | A1 | 3/2018 | Sarikaya et al. |
| 2018/0062691 | A1 | 3/2018 | Barnett, Jr. |
| 2018/0063308 | A1 | 3/2018 | Crystal et al. |
| 2018/0063324 | A1 | 3/2018 | Van Meter, II |
| 2018/0063624 | A1 | 3/2018 | Boesen |
| 2018/0067904 | A1 | 3/2018 | Li |
| 2018/0067914 | A1 | 3/2018 | Chen et al. |
| 2018/0067918 | A1 | 3/2018 | Bellegarda et al. |
| 2018/0069743 | A1 | 3/2018 | Bakken et al. |
| 2018/0075847 | A1 | 3/2018 | Lee et al. |
| 2018/0088969 | A1 | 3/2018 | Vanblon et al. |
| 2018/0089166 | A1 | 3/2018 | Meyer et al. |
| 2018/0089588 | A1 | 3/2018 | Ravi et al. |
| 2018/0090143 | A1 | 3/2018 | Saddler et al. |
| 2018/0091847 | A1 | 3/2018 | Wu et al. |
| 2018/0096683 | A1 | 4/2018 | James et al. |
| 2018/0096690 | A1 | 4/2018 | Mixter et al. |
| 2018/0102914 | A1 | 4/2018 | Kawachi et al. |
| 2018/0107917 | A1 | 4/2018 | Hewavitharana et al. |
| 2018/0107945 | A1 | 4/2018 | Gao et al. |
| 2018/0108346 | A1 | 4/2018 | Paulik et al. |
| 2018/0113673 | A1 | 4/2018 | Sheynblat |
| 2018/0121432 | A1 | 5/2018 | Parson et al. |
| 2018/0122376 | A1 | 5/2018 | Kojima |
| 2018/0122378 | A1 | 5/2018 | Mixter et al. |
| 2018/0129967 | A1 | 5/2018 | Herreshoff |
| 2018/0130470 | A1 | 5/2018 | Lemay et al. |
| 2018/0130471 | A1 | 5/2018 | Trufinescu et al. |
| 2018/0137856 | A1 | 5/2018 | Gilbert |
| 2018/0137857 | A1 | 5/2018 | Zhou et al. |
| 2018/0137865 | A1 | 5/2018 | Ling |
| 2018/0143967 | A1 | 5/2018 | Anbazhagan et al. |
| 2018/0144615 | A1 | 5/2018 | Kinney et al. |
| 2018/0144746 | A1 | 5/2018 | Mishra et al. |
| 2018/0144748 | A1 | 5/2018 | Leong |
| 2018/0146089 | A1 | 5/2018 | Rauenbuehler et al. |
| 2018/0150744 | A1 | 5/2018 | Orr et al. |
| 2018/0157372 | A1 | 6/2018 | Kurabayashi |
| 2018/0157992 | A1 | 6/2018 | Susskind et al. |
| 2018/0158548 | A1 | 6/2018 | Taheri et al. |
| 2018/0166076 | A1 | 6/2018 | Higuchi et al. |
| 2018/0167884 | A1 | 6/2018 | Dawid et al. |
| 2018/0173403 | A1 | 6/2018 | Carbune et al. |
| 2018/0173542 | A1 | 6/2018 | Chan et al. |
| 2018/0174406 | A1 | 6/2018 | Arashi et al. |
| 2018/0174576 | A1 | 6/2018 | Soltau et al. |
| 2018/0174597 | A1 | 6/2018 | Lee et al. |
| 2018/0182376 | A1 | 6/2018 | Gysel et al. |
| 2018/0188840 | A1 | 7/2018 | Tamura et al. |
| 2018/0190273 | A1 | 7/2018 | Karimli et al. |
| 2018/0190279 | A1 | 7/2018 | Anderson et al. |
| 2018/0191670 | A1 | 7/2018 | Suyama |
| 2018/0196683 | A1 | 7/2018 | Radebaugh et al. |
| 2018/0210874 | A1 | 7/2018 | Fuxman et al. |
| 2018/0213448 | A1 | 7/2018 | Segal et al. |
| 2018/0218735 | A1 | 8/2018 | Hunt et al. |
| 2018/0225274 | A1 | 8/2018 | Tommy et al. |
| 2018/0232203 | A1 | 8/2018 | Gelfenbeyn et al. |
| 2018/0233140 | A1 | 8/2018 | Koishida et al. |
| 2018/0247065 | A1 | 8/2018 | Rhee et al. |
| 2018/0253209 | A1 | 9/2018 | Jaygarl et al. |
| 2018/0253652 | A1 | 9/2018 | Palzer et al. |
| 2018/0260680 | A1 | 9/2018 | Finkelstein et al. |
| 2018/0268106 | A1 | 9/2018 | Velaga |
| 2018/0270343 | A1 | 9/2018 | Rout et al. |
| 2018/0275839 | A1 | 9/2018 | Kocienda et al. |
| 2018/0276197 | A1 | 9/2018 | Nell et al. |
| 2018/0277113 | A1 | 9/2018 | Hartung et al. |
| 2018/0278740 | A1 | 9/2018 | Choi et al. |
| 2018/0285056 | A1 | 10/2018 | Cutler et al. |
| 2018/0293984 | A1 | 10/2018 | Lindahl |
| 2018/0293988 | A1 | 10/2018 | Huang et al. |
| 2018/0308477 | A1 | 10/2018 | Nagasaka |
| 2018/0308480 | A1 | 10/2018 | Jang et al. |
| 2018/0308485 | A1 | 10/2018 | Kudurshian et al. |
| 2018/0308486 | A1 | 10/2018 | Saddler et al. |
| 2018/0314552 | A1 | 11/2018 | Kim et al. |
| 2018/0315416 | A1 | 11/2018 | Berthelsen et al. |
| 2018/0322112 | A1 | 11/2018 | Bellegarda et al. |
| 2018/0322881 | A1 | 11/2018 | Min et al. |
| 2018/0329677 | A1 | 11/2018 | Gruber et al. |
| 2018/0329957 | A1 | 11/2018 | Frazzingaro et al. |
| 2018/0329982 | A1 | 11/2018 | Patel et al. |
| 2018/0329998 | A1 | 11/2018 | Thomson et al. |
| 2018/0330714 | A1 | 11/2018 | Paulik et al. |
| 2018/0330721 | A1 | 11/2018 | Thomson et al. |
| 2018/0330722 | A1 | 11/2018 | Newendorp et al. |
| 2018/0330723 | A1 | 11/2018 | Acero et al. |
| 2018/0330729 | A1 | 11/2018 | Golipour et al. |
| 2018/0330730 | A1 | 11/2018 | Garg et al. |
| 2018/0330731 | A1 | 11/2018 | Zeitlin et al. |
| 2018/0330733 | A1 | 11/2018 | Orr et al. |
| 2018/0330737 | A1 | 11/2018 | Paulik et al. |
| 2018/0332118 | A1 | 11/2018 | Phipps et al. |
| 2018/0336184 | A1 | 11/2018 | Bellegarda et al. |
| 2018/0336197 | A1 | 11/2018 | Skilling et al. |
| 2018/0336275 | A1 | 11/2018 | Graham et al. |
| 2018/0336439 | A1 | 11/2018 | Kliger et al. |
| 2018/0336449 | A1 | 11/2018 | Adan et al. |
| 2018/0336892 | A1 | 11/2018 | Kim et al. |
| 2018/0336894 | A1 | 11/2018 | Graham et al. |
| 2018/0336904 | A1 | 11/2018 | Piercy et al. |
| 2018/0336905 | A1 | 11/2018 | Kim et al. |
| 2018/0336920 | A1 | 11/2018 | Bastian et al. |
| 2018/0341643 | A1 | 11/2018 | Alders et al. |
| 2018/0343557 | A1 | 11/2018 | Naik et al. |
| 2018/0349084 | A1 | 12/2018 | Nagasaka et al. |
| 2018/0349346 | A1 | 12/2018 | Hatori et al. |
| 2018/0349349 | A1 | 12/2018 | Bellegarda et al. |
| 2018/0349447 | A1 | 12/2018 | Maccartney et al. |
| 2018/0349472 | A1 | 12/2018 | Kohlschuetter et al. |
| 2018/0350345 | A1 | 12/2018 | Naik |
| 2018/0350353 | A1 | 12/2018 | Gruber et al. |
| 2018/0357073 | A1 | 12/2018 | Johnson et al. |
| 2018/0357308 | A1 | 12/2018 | Cheyer |
| 2018/0358015 | A1 | 12/2018 | Cash et al. |
| 2018/0358019 | A1 | 12/2018 | Mont-Reynaud |
| 2018/0365653 | A1 | 12/2018 | Cleaver et al. |
| 2018/0366105 | A1 | 12/2018 | Kim |
| 2018/0373487 | A1 | 12/2018 | Gruber et al. |
| 2018/0374484 | A1 | 12/2018 | Huang et al. |
| 2019/0012141 | A1 | 1/2019 | Piersol et al. |
| 2019/0012449 | A1 | 1/2019 | Cheyer |
| 2019/0013018 | A1 | 1/2019 | Rekstad |
| 2019/0013025 | A1 | 1/2019 | Alcorn et al. |
| 2019/0014450 | A1 | 1/2019 | Gruber et al. |
| 2019/0019077 | A1 | 1/2019 | Griffin et al. |

(56) References Cited

U.S. PATENT DOCUMENTS

2019/0027152 A1 1/2019 Huang et al.
2019/0034040 A1 1/2019 Shah et al.
2019/0034826 A1 1/2019 Ahmad et al.
2019/0035405 A1 1/2019 Haughay
2019/0042059 A1 2/2019 Baer
2019/0042627 A1 2/2019 Osotio et al.
2019/0043507 A1 2/2019 Huang et al.
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0080685 A1 3/2019 Johnson, Jr.
2019/0080698 A1 3/2019 Miller
2019/0087412 A1 3/2019 Seyed Ibrahim et al.
2019/0087455 A1 3/2019 He et al.
2019/0095050 A1 3/2019 Gruber et al.
2019/0095171 A1 3/2019 Carson et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129615 A1 5/2019 Sundar et al.
2019/0132694 A1 5/2019 Hanes et al.
2019/0139541 A1 5/2019 Andersen et al.
2019/0141494 A1 5/2019 Gross et al.
2019/0147880 A1 5/2019 Booker et al.
2019/0149972 A1 5/2019 Parks et al.
2019/0156830 A1 5/2019 Devaraj et al.
2019/0158994 A1 5/2019 Gross et al.
2019/0164546 A1 5/2019 Piernot et al.
2019/0172467 A1 6/2019 Kim et al.
2019/0179607 A1 6/2019 Thangarathnam et al.
2019/0179890 A1 6/2019 Evermann
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0197053 A1 6/2019 Graham et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0236130 A1 8/2019 Li et al.
2019/0236459 A1 8/2019 Cheyer et al.
2019/0244618 A1 8/2019 Newendorp et al.
2019/0251339 A1 8/2019 Hawker
2019/0251960 A1 8/2019 Maker et al.
2019/0259386 A1 8/2019 Kudurshian et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0287522 A1 9/2019 Lambourne et al.
2019/0295544 A1 9/2019 Garcia et al.
2019/0303442 A1 10/2019 Peitz et al.
2019/0310765 A1 10/2019 Napolitano et al.
2019/0318739 A1 10/2019 Garg et al.
2019/0339784 A1 11/2019 Lemay et al.
2019/0341027 A1 11/2019 Vescovi et al.
2019/0341056 A1 11/2019 Paulik et al.
2019/0347063 A1 11/2019 Liu et al.
2019/0348022 A1 11/2019 Park et al.
2019/0354548 A1 11/2019 Orr et al.
2019/0355346 A1 11/2019 Bellegarda
2019/0361729 A1 11/2019 Gruber et al.
2019/0369748 A1 12/2019 Hindi et al.
2019/0369842 A1 12/2019 Dolbakian et al.
2019/0370292 A1 12/2019 Irani et al.
2019/0370323 A1 12/2019 Davidson et al.
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2020/0019609 A1 1/2020 Yu et al.
2020/0042334 A1 2/2020 Radebaugh et al.
2020/0043482 A1 2/2020 Gruber et al.
2020/0043489 A1 2/2020 Bradley et al.
2020/0044485 A1 2/2020 Smith et al.
2020/0053218 A1 2/2020 Gray
2020/0058299 A1 2/2020 Lee et al.
2020/0075018 A1 3/2020 Chen
2020/0091958 A1 3/2020 Curtis et al.
2020/0092625 A1 3/2020 Raffle
2020/0098362 A1 3/2020 Piernot et al.
2020/0098368 A1 3/2020 Lemay et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0118568 A1 4/2020 Kudurshian et al.
2020/0125820 A1 4/2020 Kim et al.
2020/0127988 A1 4/2020 Bradley et al.
2020/0135209 A1 4/2020 Delfarah et al.
2020/0137230 A1 4/2020 Spohrer
2020/0143812 A1 5/2020 Walker, II et al.
2020/0159579 A1 5/2020 Shear et al.
2020/0160179 A1 5/2020 Chien et al.
2020/0169637 A1 5/2020 Sanghavi et al.
2020/0175566 A1 6/2020 Bender et al.
2020/0184964 A1 6/2020 Myers et al.
2020/0193997 A1 6/2020 Piernot et al.
2020/0221155 A1 7/2020 Hansen et al.
2020/0227034 A1 7/2020 Summa et al.
2020/0227044 A1 7/2020 Lindahl
2020/0249985 A1 8/2020 Zeitlin
2020/0252508 A1 8/2020 Gray
2020/0267222 A1 8/2020 Phipps et al.
2020/0272485 A1 8/2020 Karashchuk et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0302356 A1 9/2020 Gruber et al.
2020/0302919 A1 9/2020 Greborio et al.
2020/0302925 A1 9/2020 Shah et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0312317 A1 10/2020 Kothari et al.
2020/0314191 A1 10/2020 Madhavan et al.
2020/0327895 A1 10/2020 Gruber et al.
2020/0356243 A1 11/2020 Meyer et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0365155 A1 11/2020 Milden
2020/0372904 A1 11/2020 Vescovi et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.

(56) References Cited

U.S. PATENT DOCUMENTS

| | | | |
|---|---|---|---|
| 2020/0379727 | A1 | 12/2020 | Blatz et al. |
| 2020/0379728 | A1 | 12/2020 | Gada et al. |
| 2020/0380389 | A1 | 12/2020 | Eldeeb et al. |
| 2020/0380956 | A1 | 12/2020 | Rossi et al. |
| 2020/0380963 | A1 | 12/2020 | Chappidi et al. |
| 2020/0380966 | A1 | 12/2020 | Acero et al. |
| 2020/0380973 | A1 | 12/2020 | Novitchenko et al. |
| 2020/0380980 | A1 | 12/2020 | Shum et al. |
| 2020/0380985 | A1 | 12/2020 | Gada et al. |
| 2020/0382616 | A1 | 12/2020 | Vaishampayan et al. |
| 2020/0382635 | A1 | 12/2020 | Vora et al. |

FOREIGN PATENT DOCUMENTS

| | | | |
|---|---|---|---|
| AU | 2015101171 | A4 | 10/2015 |
| AU | 2018100187 | A4 | 3/2018 |
| AU | 2017222436 | A1 | 10/2018 |
| CA | 2670562 | A1 | 1/2010 |
| CA | 2694314 | A1 | 8/2010 |
| CA | 2792412 | A1 | 7/2011 |
| CA | 2666438 | C | 6/2013 |
| CN | 101632316 | A | 1/2010 |
| CN | 101636736 | A | 1/2010 |
| CN | 101667424 | A | 3/2010 |
| CN | 101673544 | A | 3/2010 |
| CN | 101751387 | A | 6/2010 |
| CN | 101833286 | A | 9/2010 |
| CN | 101847405 | A | 9/2010 |
| CN | 101855521 | A | 10/2010 |
| CN | 101894547 | A | 11/2010 |
| CN | 101910960 | A | 12/2010 |
| CN | 101923853 | A | 12/2010 |
| CN | 101930789 | A | 12/2010 |
| CN | 101939740 | A | 1/2011 |
| CN | 101951553 | A | 1/2011 |
| CN | 101958958 | A | 1/2011 |
| CN | 101971250 | A | 2/2011 |
| CN | 101992779 | A | 3/2011 |
| CN | 102056026 | A | 5/2011 |
| CN | 102122506 | A | 7/2011 |
| CN | 102124515 | A | 7/2011 |
| CN | 102137085 | A | 7/2011 |
| CN | 102137193 | A | 7/2011 |
| CN | 102160043 | A | 8/2011 |
| CN | 102201235 | A | 9/2011 |
| CN | 102214187 | A | 10/2011 |
| CN | 102237088 | A | 11/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102340590 | A | 2/2012 |
| CN | 102346557 | A | 2/2012 |
| CN | 102368256 | A | 3/2012 |
| CN | 102402985 | A | 4/2012 |
| CN | 102405463 | A | 4/2012 |
| CN | 102498457 | A | 6/2012 |
| CN | 102510426 | A | 6/2012 |
| CN | 102629246 | A | 8/2012 |
| CN | 102651217 | A | 8/2012 |
| CN | 102681896 | A | 9/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102694909 | A | 9/2012 |
| CN | 202453859 | U | 9/2012 |
| CN | 102722478 | A | 10/2012 |
| CN | 102737104 | A | 10/2012 |
| CN | 102750087 | A | 10/2012 |
| CN | 102792320 | A | 11/2012 |
| CN | 102801853 | A | 11/2012 |
| CN | 102820033 | A | 12/2012 |
| CN | 102844738 | A | 12/2012 |
| CN | 102866828 | A | 1/2013 |
| CN | 102870065 | A | 1/2013 |
| CN | 102882752 | A | 1/2013 |
| CN | 102917004 | A | 2/2013 |
| CN | 102917271 | A | 2/2013 |
| CN | 102918493 | A | 2/2013 |
| CN | 102955652 | A | 3/2013 |
| CN | 103035240 | A | 4/2013 |
| CN | 103035251 | A | 4/2013 |
| CN | 103038728 | A | 4/2013 |
| CN | 103093334 | A | 5/2013 |
| CN | 103135916 | A | 6/2013 |
| CN | 103198831 | A | 7/2013 |
| CN | 103209369 | A | 7/2013 |
| CN | 103226949 | A | 7/2013 |
| CN | 103236260 | A | 8/2013 |
| CN | 103246638 | A | 8/2013 |
| CN | 103268315 | A | 8/2013 |
| CN | 103280218 | A | 9/2013 |
| CN | 103292437 | A | 9/2013 |
| CN | 103327063 | A | 9/2013 |
| CN | 103365279 | A | 10/2013 |
| CN | 103366741 | A | 10/2013 |
| CN | 203249629 | U | 10/2013 |
| CN | 103390016 | A | 11/2013 |
| CN | 103412789 | A | 11/2013 |
| CN | 103426428 | A | 12/2013 |
| CN | 103455234 | A | 12/2013 |
| CN | 103456306 | A | 12/2013 |
| CN | 103533143 | A | 1/2014 |
| CN | 103533154 | A | 1/2014 |
| CN | 103543902 | A | 1/2014 |
| CN | 103562863 | A | 2/2014 |
| CN | 103608859 | A | 2/2014 |
| CN | 103645876 | A | 3/2014 |
| CN | 103716454 | A | 4/2014 |
| CN | 103727948 | A | 4/2014 |
| CN | 103744761 | A | 4/2014 |
| CN | 103760984 | A | 4/2014 |
| CN | 103765385 | A | 4/2014 |
| CN | 103792985 | A | 5/2014 |
| CN | 103794212 | A | 5/2014 |
| CN | 103795850 | A | 5/2014 |
| CN | 103841268 | A | 6/2014 |
| CN | 103902373 | A | 7/2014 |
| CN | 103930945 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104038621 | A | 9/2014 |
| CN | 104090652 | A | 10/2014 |
| CN | 104113471 | A | 10/2014 |
| CN | 104125322 | A | 10/2014 |
| CN | 104144377 | A | 11/2014 |
| CN | 104169837 | A | 11/2014 |
| CN | 104180815 | A | 12/2014 |
| CN | 104243699 | A | 12/2014 |
| CN | 104281259 | A | 1/2015 |
| CN | 104284257 | A | 1/2015 |
| CN | 104335207 | A | 2/2015 |
| CN | 104335234 | A | 2/2015 |
| CN | 104374399 | A | 2/2015 |
| CN | 104423625 | A | 3/2015 |
| CN | 104427104 | A | 3/2015 |
| CN | 104463552 | A | 3/2015 |
| CN | 104487929 | A | 4/2015 |
| CN | 104516522 | A | 4/2015 |
| CN | 104573472 | A | 4/2015 |
| CN | 104575501 | A | 4/2015 |
| CN | 104584010 | A | 4/2015 |
| CN | 104604274 | A | 5/2015 |
| CN | 104679472 | A | 6/2015 |
| CN | 104769584 | A | 7/2015 |
| CN | 104854583 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |

(56) References Cited

FOREIGN PATENT DOCUMENTS

| | | | |
|---|---|---|---|
| CN | 105025051 | A | 11/2015 |
| CN | 105027197 | A | 11/2015 |
| CN | 105093526 | A | 11/2015 |
| CN | 105100356 | A | 11/2015 |
| CN | 105190607 | A | 12/2015 |
| CN | 105247511 | A | 1/2016 |
| CN | 105264524 | A | 1/2016 |
| CN | 105278681 | A | 1/2016 |
| CN | 105320251 | A | 2/2016 |
| CN | 105320726 | A | 2/2016 |
| CN | 105379234 | A | 3/2016 |
| CN | 105430186 | A | 3/2016 |
| CN | 105471705 | A | 4/2016 |
| CN | 105472587 | A | 4/2016 |
| CN | 105556592 | A | 5/2016 |
| CN | 105808200 | A | 7/2016 |
| CN | 105830048 | A | 8/2016 |
| CN | 105869641 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106463114 | A | 2/2017 |
| CN | 106465074 | A | 2/2017 |
| CN | 106534469 | A | 3/2017 |
| CN | 106776581 | A | 5/2017 |
| CN | 107450800 | A | 12/2017 |
| CN | 107480161 | A | 12/2017 |
| CN | 107491468 | A | 12/2017 |
| CN | 107545262 | A | 1/2018 |
| CN | 107608998 | A | 1/2018 |
| CN | 107615378 | A | 1/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110531860 | A | 12/2019 |
| CN | 110598671 | A | 12/2019 |
| CN | 110647274 | A | 1/2020 |
| CN | 110825469 | A | 2/2020 |
| DE | 202016008226 | U1 | 5/2017 |
| EP | 2144226 | A1 | 1/2010 |
| EP | 2168399 | A1 | 3/2010 |
| EP | 1720375 | B1 | 7/2010 |
| EP | 2205010 | A1 | 7/2010 |
| EP | 2250640 | A1 | 11/2010 |
| EP | 2309491 | A1 | 4/2011 |
| EP | 2329348 | A1 | 6/2011 |
| EP | 2339576 | A2 | 6/2011 |
| EP | 2355093 | A2 | 8/2011 |
| EP | 2393056 | A1 | 12/2011 |
| EP | 2400373 | A1 | 12/2011 |
| EP | 2431842 | A2 | 3/2012 |
| EP | 2523109 | A1 | 11/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2639792 | A1 | 9/2013 |
| EP | 2669889 | A2 | 12/2013 |
| EP | 2672229 | A2 | 12/2013 |
| EP | 2672231 | A2 | 12/2013 |
| EP | 2675147 | A1 | 12/2013 |
| EP | 2680257 | A1 | 1/2014 |
| EP | 2683147 | A1 | 1/2014 |
| EP | 2683175 | A1 | 1/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2743846 | A2 | 6/2014 |
| EP | 2760015 | A1 | 7/2014 |
| EP | 2781883 | A2 | 9/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2891049 | A1 | 7/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2985984 | A2 | 2/2016 |
| EP | 2891049 | A4 | 3/2016 |
| EP | 3032532 | A1 | 6/2016 |
| EP | 3035329 | A1 | 6/2016 |
| EP | 3038333 | A1 | 6/2016 |
| EP | 3115905 | A1 | 1/2017 |
| EP | 3125097 | A2 | 2/2017 |
| EP | 3224708 | A1 | 10/2017 |
| EP | 3246916 | A1 | 11/2017 |
| EP | 3300074 | A1 | 3/2018 |
| EP | 2983065 | B1 | 8/2018 |
| EP | 3392876 | A1 | 10/2018 |
| EP | 3401773 | A1 | 11/2018 |
| EP | 3506151 | A1 | 7/2019 |
| GB | 2470585 | A1 | 12/2010 |
| JP | 2002-182690 | A1 | 6/2002 |
| JP | 2010-66519 | A | 3/2010 |
| JP | 2010-78602 | A | 4/2010 |
| JP | 2010-78979 | A | 4/2010 |
| JP | 2010-108378 | A | 5/2010 |
| JP | 2010-109789 | A | 5/2010 |
| JP | 2010-518475 | A | 5/2010 |
| JP | 2010-518526 | A | 5/2010 |
| JP | 2010-122928 | A | 6/2010 |
| JP | 2010-135976 | A | 6/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 2010-236858 | A | 10/2010 |
| JP | 4563106 | B2 | 10/2010 |
| JP | 2010-256392 | A | 11/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-237621 | A | 11/2011 |
| JP | 2011-238022 | A | 11/2011 |
| JP | 2011-250027 | A | 12/2011 |
| JP | 2012-14394 | A | 1/2012 |
| JP | 2012-502377 | A | 1/2012 |
| JP | 2012-22478 | A | 2/2012 |
| JP | 2012-33997 | A | 2/2012 |
| JP | 2012-37619 | A | 2/2012 |
| JP | 2012-63536 | A | 3/2012 |
| JP | 2012-508530 | A | 4/2012 |
| JP | 2012-89020 | A | 5/2012 |
| JP | 2012-116442 | A | 6/2012 |
| JP | 2012-142744 | A | 7/2012 |
| JP | 2012-147063 | A | 8/2012 |
| JP | 2012-150804 | A | 8/2012 |
| JP | 2012-518847 | A | 8/2012 |
| JP | 2012-211932 | A | 11/2012 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |

(56) References Cited

FOREIGN PATENT DOCUMENTS

| | | | |
|---|---|---|---|
| JP | 2013-73240 | A | 4/2013 |
| JP | 2013-513315 | A | 4/2013 |
| JP | 2013-80476 | A | 5/2013 |
| JP | 2013-517566 | A | 5/2013 |
| JP | 2013-134430 | A | 7/2013 |
| JP | 2013-134729 | A | 7/2013 |
| JP | 2013-140520 | A | 7/2013 |
| JP | 2013-527947 | A | 7/2013 |
| JP | 2013-528012 | A | 7/2013 |
| JP | 2013-148419 | A | 8/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2013-258600 | A | 12/2013 |
| JP | 2014-2586 | A | 1/2014 |
| JP | 2014-10688 | A | 1/2014 |
| JP | 20145-2445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-519648 | A | 8/2014 |
| JP | 2014-191272 | A | 10/2014 |
| JP | 2014-219614 | A | 11/2014 |
| JP | 2014-222514 | A | 11/2014 |
| JP | 2015-4928 | A | 1/2015 |
| JP | 2015-8001 | A | 1/2015 |
| JP | 2015-12301 | A | 1/2015 |
| JP | 2015-18365 | A | 1/2015 |
| JP | 2015-501022 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-94848 | A | 5/2015 |
| JP | 2015-514254 | A | 5/2015 |
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-536648 | A | 11/2016 |
| JP | 2017-19331 | A | 1/2017 |
| JP | 2017-516153 | A | 6/2017 |
| JP | 2017-537361 | A | 12/2017 |
| JP | 6291147 | B1 | 2/2018 |
| JP | 2018-525950 | A | 9/2018 |
| KR | 10-2002-0000563 | A | 1/2002 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0005937 | A | 1/2011 |
| KR | 10-2011-0013625 | A | 2/2011 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-2012-0066523 | A | 6/2012 |
| KR | 10-2012-0082371 | A | 7/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0024271 | A | 2/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0055204 | A | 5/2014 |
| KR | 10-2014-0068752 | A | 6/2014 |
| KR | 10-2014-0088449 | A | 7/2014 |
| KR | 10-2014-0106715 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0140694 | A | 12/2016 |
| KR | 10-2017-0036805 | A | 4/2017 |
| KR | 10-2017-0107058 | A | 9/2017 |
| KR | 10-2018-0032632 | A | 3/2018 |
| KR | 10-2018-0034637 | A | 4/2018 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201142823 | A1 | 12/2011 |
| TW | 201227715 | A1 | 7/2012 |
| TW | 201245989 | A1 | 11/2012 |
| TW | 201312548 | A | 3/2013 |
| WO | 2000/63879 | A1 | 10/2000 |
| WO | 2010/013369 | A1 | 2/2010 |
| WO | 2010/054373 | A2 | 5/2010 |
| WO | 2010/075623 | A1 | 7/2010 |
| WO | 2010/100937 | A1 | 9/2010 |
| WO | 2010/141802 | A2 | 12/2010 |
| WO | 2010/144651 | A2 | 12/2010 |
| WO | 2011/028842 | A2 | 3/2011 |
| WO | 2011/057346 | A1 | 5/2011 |
| WO | 2011/060106 | A1 | 5/2011 |

(56) References Cited

FOREIGN PATENT DOCUMENTS

| | | | |
|---|---|---|---|
| WO | 2011/082521 | A1 | 7/2011 |
| WO | 2011/088053 | A2 | 7/2011 |
| WO | 2011/093025 | A1 | 8/2011 |
| WO | 2011/100142 | A2 | 8/2011 |
| WO | 2011/116309 | A1 | 9/2011 |
| WO | 2011/123122 | A1 | 10/2011 |
| WO | 2011/133543 | A1 | 10/2011 |
| WO | 2011/133573 | A2 | 10/2011 |
| WO | 2011/097309 | A3 | 12/2011 |
| WO | 2011/150730 | A1 | 12/2011 |
| WO | 2011/163350 | A1 | 12/2011 |
| WO | 2011/088053 | A3 | 1/2012 |
| WO | 2012/008434 | A1 | 1/2012 |
| WO | 2012/019020 | A1 | 2/2012 |
| WO | 2012/019637 | A1 | 2/2012 |
| WO | 2012/063260 | A2 | 5/2012 |
| WO | 2012/092562 | A1 | 7/2012 |
| WO | 2012/112331 | A2 | 8/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/154748 | A1 | 11/2012 |
| WO | 2012/155079 | A2 | 11/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/122310 | A1 | 8/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/047047 | A1 | 3/2014 |
| WO | 2014/066352 | A1 | 5/2014 |
| WO | 2014/070872 | A2 | 5/2014 |
| WO | 2014/078965 | A1 | 5/2014 |
| WO | 2014/093339 | A1 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/204659 | A2 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/116151 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/213682 | A1 | 12/2017 |
| WO | 2018/009397 | A1 | 1/2018 |
| WO | 2018/213401 | A1 | 11/2018 |
| WO | 2018/213415 | A1 | 11/2018 |
| WO | 2019/067930 | A1 | 4/2019 |
| WO | 2019/078576 | A1 | 4/2019 |
| WO | 2019/079017 | A1 | 4/2019 |
| WO | 2019/147429 | A1 | 8/2019 |
| WO | 2019/236217 | A1 | 12/2019 |
| WO | 2020/010530 | A1 | 1/2020 |

OTHER PUBLICATIONS

Adium, "AboutAdium—Adium X—Trac", available at <http://web.archive.org/web/20070819113247/http://trac.adiumx.com/wiki/AboutAdium>, retrieved on Nov. 25, 2011, 2 pages.

Advisory Action received for U.S. Appl. No. 15/147,726, dated Apr. 12, 2019, 4 pages.

Alfred App, "Alfred", available at <http://www.alfredapp.com/>, retrieved on Feb. 8, 2012, 5 pages.

API.AI, "Android App Review—Speaktoit Assistant", Available at <https://www.youtube.com/watch?v=myE498nyfGw>, Mar. 30, 2011, 3 pages.

(56) References Cited

OTHER PUBLICATIONS

Apple, "VoiceOver", available at <http://www.apple.com/accessibility/voiceover/>, May 19, 2014, 3 pages.
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Castleos, "Whole House Voice Control Demonstration", available online at: https://www.youtube.com/watch?v=9SRCoxrZ_W4, Jun. 2, 2012, 26 pages.
Chen, Yi, "Multimedia Siri Finds and Plays Whatever You Ask For", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Decision to Grant received for European Patent Application No. 16186308.9, dated Apr. 2, 2020, 2 pages.
Evi, "Meet Evi: The One Mobile Application that Provides Solutions for your Everyday Problems", Feb. 2012, 3 pages.
Examiner's Pre-Review Report received for Japanese Patent Application No. 2016-161377, dated Jul. 19, 2018, 4 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Extended European Search Report received for European Patent Application No. 16186308.9, dated Jan. 16, 2017, 9 pages.
Final Office Action received for U.S. Appl. No. 15/147,726, dated Dec. 21, 2018, 20 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Gannes, Liz, "Alfred App Gives Personalized Restaurant Recommendations", AllThingsD, Jul. 18, 2011, pp. 1-3.
Gruber, Tom, "Big Think Small Screen: How Semantic Computing in the Cloud Will Revolutionize the Consumer Experience on the Phone", Keynote Presentation at Web 3.0 Conference, Jan. 2010, 41 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardawar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full APP Download for Android, Blackberry, iPhone, Jan. 27, 2014, 11 pages.
Hear voice from Google translate, Available on URL: https://www.youtube.com/watch?v=18AvMhFgD28, Jan. 28, 2011, 1 page.
id3.org, "id3v2.4.0-Frames", available at <http://id3.org/id3v2.4.0-frames?action=print>, retrieved on Jan. 22, 2015, 41 pages.
Intention to Grant received for European Patent Application No. 16186308.9, dated Dec. 3, 2019, 8 pages.
Interactive Voice, available at <http://www.helloivee.com/company/>, retrieved on Feb. 10, 2014, 2 pages.
International Preliminary Report on Patentability received for PCT Patent Application No. PCT/US2016/031550, dated Mar. 22, 2018, 9 pages.
International Search Report and Written Opinion received for PCT Patent Application No. PCT/US2016/031550, dated Aug. 4, 2016, 13 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jouvet et al., "Evaluating Grapheme-to-phoneme Converters in Automatic Speech Recognition Context", IEEE, 2012, pp. 4821-4824.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Lewis, Cameron, "Task Ave for iPhone Review", Mac Life, Available at <http://www.maclife.com/article/reviews/task_ave_iphone_review>, Mar. 3, 2011, 5 pages.
Meet Ivee, Your Wi-Fi Voice Activated Assistant, available at <http://www.helloivee.com/>, retrieved on Feb. 10, 2014, 8 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
My Cool Aids, "What's New", available at <http://www.mycoolaids.com/>, 2012, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 15/147,726, dated Apr. 23, 2018, 17 pages.
Non-Final Office Action received for U.S. Appl. No. 15/147,726, dated Sep. 3, 2019, 29 pages.
Notice of Allowance received for Japanese Patent Application No. 2016-161377, dated Nov. 25, 2019, 3 pages.
Notice of Allowance received for U.S. Appl. No. 15/147,726, dated Apr. 3, 2020, 7 pages.
Nozawa et al., "iPhone 4S Perfect Manual", vol. 1, First Edition, Nov. 11, 2011, 4 pages.
Office Action received for Australian Patent Application No. 2016320585, dated Jun. 11, 2019, 4 pages.
Office Action received for Australian Patent Application No. 2016320585, dated Nov. 14, 2019, 4 pages.
Office Action received for Australian Patent Application No. 2016320585, dated Nov. 23, 2018, 4 pages.
Office Action received for Chinese Patent Application No. 201680049880.9, dated May 27, 2020, 19 pages.
Office Action received for European Patent Application No. 16186308.9, dated Nov. 30, 2018, 7 pages.
Office Action received for German Patent Application No. 102016214955.5, dated Mar. 23, 2020, 10 pages.
Office Action received for Japanese Patent Application No. 2016-161377, dated Aug. 18, 2017, 7 pages.
Office Action received for Japanese Patent Application No. 2016-161377, dated Jul. 26, 2019, 4 pages.

(56) References Cited

OTHER PUBLICATIONS

Office Action received for Japanese Patent Application No. 2016-161377, dated Mar. 2, 2018, 5 pages.
Office Action received for Japanese Patent Application No. 2018-126316, dated May 18, 2020, 9 pages.
Office Action received for Japanese Patent Application No. 2018-126316, dated May 31, 2019, 10 pages.
Office Action received for Korean Patent Application No. 10-2018-7005374, dated Aug. 14, 2019, 12 pages.
Office Action received for Korean Patent Application No. 10-2018-7005374, dated Feb. 13, 2020, 11 pages.
OSXDAILY, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjguery.com/2010/05/now-you-see-me-showhide-performance, May 4, 2010, 3 pages.
Rios, Mafe, "New bar search for Facebook", You Tube, available at "https://www.youtube.com/watch?v=vwgN1WbvCas", Jul. 19, 2013, 2 pages.
Sarawagi, Sunita, "CRF Package Page", available at <http://crf.sourceforge.net/>, retrieved on Apr. 6, 2011, 2 pages.
Simonite, Tom, "One Easy Way to Make Siri Smarter", Technology Review, Oct. 18, 2011, 2 pages.
Speaker Recognition, Wikipedia, The Free Encyclopedia, Nov. 2, 2010, 4 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Vlingo Incar, "Distracted Driving Solution with Vlingo InCar", YouTube Video, Available online at <http://www.youtube.com/watch?v=Vqs8XfXxgz4>, Oct. 2010, 2 pages.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Office Action received for Australian Patent Application No. 2019268195, dated Nov. 17, 2020, 3 pages.
Notice of Acceptance received for Australian Patent Application No. 2019268195, dated Feb. 2, 2021, 3 pages.
Notice of Allowance received for Chinese Patent Application No. 201680049880.9, dated Apr. 6, 2021, 4 pages (1 page of English Translation and 3 pages of Official Copy).
Office Action received for Chinese Patent Application No. 201680049880.9, dated Dec. 24, 2020, 8 pages (4 pages of English Translation and 4 pages of Official Copy).
AAAAPLAY, "Sony Media Remote for iOS and Android", Online available at: <https://www.youtube.com/watch?v=W8QoeQhlGok>, Feb. 4, 2012, 3 pages.
"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Asakura et al., "What LG thinks; How the TV should be in the Living Room", HiVi, vol. 31, No. 7, Stereo Sound Publishing, Inc., Jun. 17, 2013, pp. 68-71 (Official Copy Only). {See communication under 37 CFR § 1.98(a) (3)}.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Ashbrook, Daniel L., "Enabling Mobile Microinteractions", May 2010, 186 pages.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https:/ /www.youtube.com/watch?v=TXDaJFm5UH4>, Mar. 4, 2015, 3 pages.
Burgess, Brian, "Amazon Echo Tip: Enable the Wake Up Sound", Online available at:—<https://www.groovypost.com/howto/amazon-echo-tip-enable-wake-upsound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen, Yi, "Multimedia Siri Finds and Plays Whatever You Ask for", PSFK Report, Feb. 9, 2012, pp. 1-9.

(56) References Cited

OTHER PUBLICATIONS

Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Concepts and Design (Fifth Edition)", Addison-Wesley, 2012, 391 pages.
Czech Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Detroitborg, "Apple Remote App (iPhone & iPod Touch): Tutorial and Demo", Online Available at:—<https://www.youtube.com/watch?v=M_jzeEevKql>, Oct. 13, 2010, 4 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as- triggers-to-macr-t4845.html>, May 9, 2018, 5 pages.
"DIRECTV™ Voice", Now Part of the DIRECTTV Mobile App for Phones, Sep. 18, 2013, 5 pages.
Earthling1984, "Samsung Galaxy Smart Stay Feature Explained", Online available—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Filipowicz, Luke, "How to use the QuickType keyboard in iOS 8", Online available at:—<https://www.imore.com/comment/568232>, Oct. 11, 2014, pp. 1-17.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at :—<https://www.youtube.com/watch?v=n6e1WKUS2ww>, Jun. 9, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Google Developers,"Voice search in your app", Online available at:—<https://www.youtube.com/watch?v=PS1FbB5qWEI>, Nov. 12, 2014, 1 page.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How to Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.
INEWS and Tech,"How to Use the QuickType Keyboard in IOS 8", Online available at:—<http://www.inewsandtech.com/how-to-use-the-quicktype-keyboard-in-ios-8/>, Sep. 17, 2014, 6 pages.
Internet Services and Social Net, "How to Search for Similar Websites", Online availabe at:—<https://www.youtube.com/watch?v=nLf2uirpt5s>, see from 0:17 to 1:06, Jul. 4, 2013, 1 page.
"IPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Jonsson et al., "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 22-24, 2013, pp. 442-451.
"Link Your Voice to Your Devices with Voice Match, Google Assistant Help", Online available at:—<https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Majerus Wesley, "Cell Phone Accessibility for Your Blind Child", Online available at:—<https://web.archive.org/web/20100210001100/https://nfb.org/images/nfb/publications/fr/fr28/3/fr280314.htm>, 2010, pp. 1-5.
Malcangi Mario, "Text-driven Avatars Based on Artificial Neural Networks and Fuzzy Logic", International Journal of Computers, vol. 4, No. 2, Dec. 31, 2010, pp. 61-69.
Marketing Land,"Amazon Echo: Play music", Online Available at:—<https://www.youtube.com/watch?v=A7V5NPbsXi4>, Apr. 27, 2015, 3 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Modern Techies,"Braina-Artificial Personal Assistant for PC(like Cortana,Siri)!!!!", Online available at: <https://www.youtube.com/watch?v=_Coo2P8ilqQ>, Feb. 24, 2017, 3 pages.
Morrison Jonathan, "iPhone 5 Siri Demo", Online Available at:—<https://www.youtube.com/watch?v=_wHWwG5lhWc>, Sep. 21, 2012, 3 pages.
Nakamura et al., "Realization of a Browser to Filter Spoilers Dynamically", vol. No. 67, 2010, 8 pages (Official Copy Only). {See communication under 37 CFR § 1.98(a) (3)}.

(56) References Cited

OTHER PUBLICATIONS

Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsg.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Nakamura Satoshi, "Antispoiler : An Web Browser to Filter Spoiler", vol. 2010-HCL-139 No. 17, Online available at:—<https://ipsj.ixsq.nii.ac.jp/ej/index.php?active_action=repository_view_main_item_detail&page_id=13&block_id=8&item_id=70067&item_no=1>, Jul. 31, 2010, 8 pages (Official Copy Only). {See communication under 37 CFR § 1.98(a) (3)}.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages (Official Copy Only). {See communication under 37 CFR § 1.98(a) (3)}.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>,, Feb. 13, 2013, 16 pages.
Patra et al., "A Kernel-Based Approach for Biomedical Named Entity Recognition", Scientific World Journal, vol. 2013, 2013, pp. 1-7.
PC Mag, "How to Voice Train Your Google Home Smart Speaker", Online available at: <https://in.pcmag.com/google-home/126520/how-to-voice-train-your-google-homesmart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
"*Phoenix Solutions, Inc.* v. *West Interactive Corp*.", Document 40, Declaration of Christopher Schmandt Regarding the MIT Galaxy System, Jul. 2, 2010, 162 pages.
pocketables.com,"AutoRemote example profile", Online available at: https://www.youtube.com/watch?v=kC_zhUnNZj8, Jun. 25, 2013, 1 page.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CldLR4fhVU>, Jun. 3, 2014, 3 pages.
Rasch, Katharina, "Smart Assistants for Smart Homes", Doctoral Thesis in Electronic and Computer Systems, 2013, 150 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:—<https://productforums.google.com/forum/#!topic/websearch/Ip3qlGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Spivack, Nova, "Sneak Preview of Siri—Part Two—Technical Foundations—Interview with Tom Gruber, CTO of Siri I Twine", Online Available at:—<https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy Only) {See communication under 37 CFR § 1.98(a) (3)}.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.

(56) References Cited

OTHER PUBLICATIONS

Wikipedia, “Virtual Assistant”, Wikipedia, Online Available at:—<https://en.wikipedia.org/w/index.php?title=Virtual_assistant&oldid=679330666>, Sep. 3, 2015, 4 pages.
X.AI, “How it Works”, Online available at:—<https://web.archive.org/web/20160531201426/https://x.ai/how-it-works/>, May 31, 2016, 6 pages.
Xu et al., “Policy Optimization of Dialogue Management in Spoken Dialogue System for Out-of-Domain Utterances”, 2016 International Conference on Asian Language Processing (IALP), IEEE, Nov. 21, 2016, pp. 10-13.
Yan et al., “A Scalable Approach to Using DNN-derived Features in GMM-HMM Based Acoustic Modeling for LVCSR”, 14th Annual Conference of the International Speech Communication Association, InterSpeech 2013, Aug. 2013, pp. 104-108.
Yang Astor, “Control Android TV via Mobile Phone APP RKRemoteControl”, Online Available at : <https://www.youtube.com/watch?v=zpmUeOX_xro>, Mar. 31, 2015, 4 pages.
Yates Michaelc., “How Can I Exit Google Assistant After I'm Finished with it”, Online available at:—<https://productforums.google.com/forum/#!msg/phone-by-google/faECnR2RJwA/gKNtOkQgAQAJ>, Jan. 11, 2016, 2 pages.
Ye et al., “iPhone 4S Native Secret”, Jun. 30, 2012, 1 page (Official Copy Only). {See communication under 37 CFR § 1.98(a) (3)}.
Yeh Jui-Feng, “Speech Act Identification Using Semantic Dependency Graphs With Probabilistic Context-free Grammars”, ACM Transactions on Asian and Low Resource Language Information Processing, vol. 15, No. 1, Dec. 2015, pp. 5.1-5.28.
Young et al., “The Hidden Information State Model: A Practical Framework for POMDP-Based Spoken Dialogue Management”, Computer Speech & Language, vol. 24, Issue 2, Apr. 2010, pp. 150-174.
Yousef, Zulfikara., “Brains (A.I) Artificial Intelligence Virtual Personal Assistant”, Online available at:—<https://www.youtube.com/watch?v=2h6xpB8bPSA>, Feb. 7, 2017, 3 pages.
Yu et al., “Permutation Invariant Training of Deep Models for Speaker-Independent Multi-talker Speech Separation”, Proc. ICASSP, 2017, 5 pages.
Yu et al., “Recognizing Multi-talker Speech with Permutation Invariant Training”, Interspeech 2017, Aug. 20-24, 2017, pp. 2456-2460.
Zangerle et al., “Recommending #-Tags in Twitter”, proceedings of the Workshop on Semantic Adaptive Socail Web, 2011, pp. 1-12.
Zhan et al., “Play with Android Phones”, Feb. 29, 2012, 1 page (Official Copy Only). {See communication under 37 CFR § 1.98(a) (3)}.
Zmolikova et al., “Speaker-Aware Neural Network Based Beamformer for Speaks Extraction in Speech Mixtures”, Interspeech 2017, Aug. 20-24, 2017, pp. 2655-2659.

* cited by examiner

ZERO LATENCY DIGITAL ASSISTANT

CROSS-REFERENCE TO RELATED APPLICATIONS

This application is a continuation of U.S. patent application Ser. No. 15/147,726, "ZERO LATENCY DIGITAL ASSISTANT," filed on May 5, 2016, which claims priority to U.S. Provisional Patent Application Ser. No. 62/215,608, "ZERO LATENCY DIGITAL ASSISTANT," filed on Sep. 8, 2015. The content of these applications are hereby incorporated by reference for all purposes.

FIELD

The present disclosure relates generally to digital assistants, and more specifically to reducing digital assistant latency.

BACKGROUND

Intelligent automated assistants (or digital assistants) provide a beneficial interface between human users and electronic devices. Such assistants allow users to interact with devices or systems using natural language in spoken and/or text forms. For example, a user can access the services of an electronic device by providing a spoken user request to a digital assistant associated with the electronic device. The digital assistant can interpret the user's intent from the spoken user request and operationalize the user's intent into tasks. The identified tasks can then be performed by executing one or more services of the electronic device and a relevant output can be returned to the user.

BRIEF SUMMARY

Some techniques for implementing a digital assistant on an electronic device incur latencies between the time at which the user requests a digital assistant session and the time at which the device can receive a spoken input to the digital assistant, which can be inefficient and counterintuitive for the user. Existing techniques require more time than necessary, wasting user time and device energy. This latter consideration is particularly important in battery-operated devices.

Accordingly, there is a need for electronic devices with faster, more efficient methods and interfaces for reducing or eliminating the latencies experienced by a user who invokes a digital assistant session. Such methods and interfaces optionally complement or replace other methods for increasing the efficiency and accuracy of a digital assistant. Such methods and interfaces reduce the cognitive burden on a user and produce a more efficient human-machine interface. For battery-operated computing devices, such methods and interfaces conserve power and increase the time between battery charges by reducing the occurrence of improperly timed speech inputs and corresponding errors in identifying a requested task.

In some embodiments, a method for implementing a digital assistant includes: at an electronic device including a microphone, a first processor, and a second processor: capturing audio input from the microphone; writing, using the first processor, data representing the captured audio input to a memory buffer; detecting a user input while capturing audio input using the microphone; determining, using the first processor, whether the user input has met predetermined criteria; in accordance with a determination that the user input has met the criteria, identifying, using the second processor, a computing task based on at least a portion of the contents of the memory buffer; and in accordance with a determination that the user input has not met the criteria, forgoing identifying the task.

In some embodiments, a non-transitory computer-readable storage medium stores one or more programs, the one or more programs including instructions, which when executed by a first processor and a second processor of an electronic device with a microphone cause the device to: capture audio input from the microphone; write, using the first processor, data representing the captured audio input to a memory buffer; detect a user input while capturing audio input using the microphone; determine, using the first processor, whether the user input has met predetermined criteria; in accordance with a determination that the user input has met the criteria, identify, using the second processor, a computing task based on at least a portion of the contents of the memory buffer; and in accordance with a determination that the user input has not met the criteria, forgo identifying the task.

In some embodiments, a transitory computer-readable storage medium stores one or more programs, the one or more programs including instructions, which when executed by a first processor and a second processor of an electronic device with a microphone cause the device to: capture audio input from the microphone; write, using the first processor, data representing the captured audio input to a memory buffer; detect a user input while capturing audio input using the microphone; determine, using the first processor, whether the user input has met a predetermined criteria; in accordance with a determination that the user input has met the criteria, identify, using the second processor, a computing task based on at least a portion of the contents of the memory buffer; and in accordance with a determination that the user input has not met the criteria, forgo identifying the task.

In some embodiments, an electronic device includes: a microphone; two or more processors; a memory; and one or more programs, wherein the one or more programs are stored in the memory and configured to be executed by the two or more processors, the one or more programs including instructions for: capturing audio input from the microphone; writing, using a first processor, data representing the captured audio input to a memory buffer in the memory; detecting a user input while capturing audio input using the microphone; determining, using the first processor, whether the user input has met predetermined criteria; in accordance with a determination that the user input has met the criteria, identifying, using a second processor, a computing task based on at least a portion of the contents of the memory buffer; and in accordance with a determination that the user input has not met the criteria, forgoing identifying the task.

In some embodiments, a method for implementing a digital assistant includes: at an electronic device including a microphone, a first processor, and a second processor: while the second processor is in a low-power mode: capturing audio input from the microphone, writing, using the first processor, data representing the captured audio input to a memory buffer, wherein the audio input is continuously captured and written to the buffer, and determining, using the first processor, whether at least a first portion of the memory buffer meets a predetermined criteria; in accordance with a determination that the at least a first portion of the buffer meets the predetermined criteria: causing the second processor to exit the low-power mode, identifying, using the second processor, a computing task based on at least a second portion of the contents of the memory buffer, and executing, using the second processor, the identified task; and in accordance with a determination that the at least a first portion of the buffer does not meet the criteria, forgoing causing the second processor to exit the low-power mode.

In some embodiments, a non-transitory computer-readable storage medium stores one or more programs, the one or more programs including instructions, which when executed by a first processor and a second processor of an electronic device with a microphone cause the device to: while the second processor is in a low-power mode: capture audio input from the microphone, write, using the first processor, data representing the captured audio input to a memory buffer, wherein the audio input is continuously captured and written to the buffer, and determine, using the first processor, whether at least a first portion of the memory buffer meets a predetermined criteria; in accordance with a determination that the at least a first portion of the buffer meets the predetermined criteria: cause the second processor to exit the low-power mode, identify, using the second processor, a computing task based on at least a second portion of the contents of the memory buffer, and execute, using the second processor, the identified task; and in accordance with a determination that the at least a first portion of the buffer does not meet the criteria, forgo causing the second processor to exit the low-power mode.

In some embodiments, a transitory computer-readable storage medium stores one or more programs, the one or more programs including instructions, which when executed by a first processor and a second processor of an electronic device with a microphone cause the device to: while the second processor is in a low-power mode: capture audio input from the microphone, write, using the first processor, data representing the captured audio input to a memory buffer, wherein the audio input is continuously captured and written to the buffer, and determine, using the first processor, whether at least a first portion of the memory buffer meets a predetermined criteria; in accordance with a determination that the at least a first portion of the buffer meets the predetermined criteria: cause the second processor to exit the low-power mode, identify, using the second processor, a computing task based on at least a second portion of the contents of the memory buffer, and execute, using the second processor, the identified task; and in accordance with a determination that the at least a first portion of the buffer does not meet the criteria, forgo causing the second processor to exit the low-power mode.

In some embodiments, an electronic device includes: a microphone; two or more processors; a memory; and one or more programs, wherein the one or more programs are stored in the memory and configured to be executed by the two or more processors, the one or more programs including instructions for: while the second processor is in a low-power mode: capturing audio input from the microphone, writing, using the first processor, data representing the captured audio input to a memory buffer, wherein the audio input is continuously captured and written to the buffer, and determining, using the first processor, whether at least a first portion of the memory buffer meets a predetermined criteria; in accordance with a determination that the at least a first portion of the buffer meets the predetermined criteria: causing the second processor to exit the low-power mode, identifying, using the second processor, a computing task based on at least a second portion of the contents of the memory buffer, and executing, using the second processor, the identified task; and in accordance with a determination that the at least a first portion of the buffer does not meet the criteria, forgoing causing the second processor to exit the low-power mode.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by two or more processors.

Thus, devices are provided with faster, more efficient methods and interfaces for implementing a digital assistant, thereby increasing the effectiveness, efficiency, and user satisfaction with such devices. Such methods and interfaces may complement or replace other methods for implementing a digital assistant.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for identifying and executing tasks based on a nonspecific, unstructured natural language request. A zero-latency digital assistant that allows a user to invoke a digital assistant session and immediately provide a spoken request can reduce the cognitive burden on a user, thereby enhancing productivity. Further, such techniques can reduce processor and battery power otherwise wasted on redundant user inputs or delays.

Figure 7A:
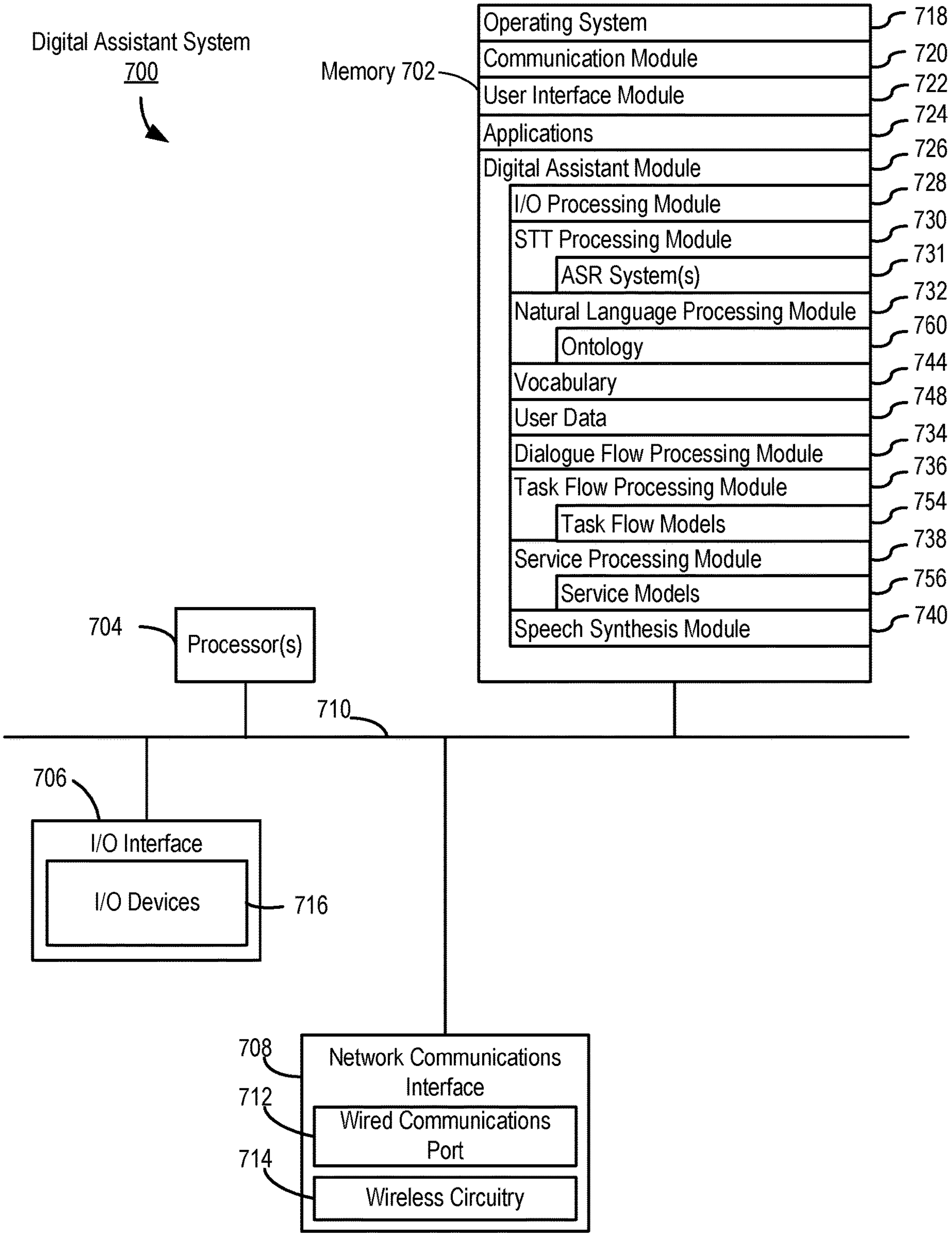
FIG. 7A is a block diagram illustrating a digital assistant system or a server portion thereof, according to various examples.
Figure 7B:
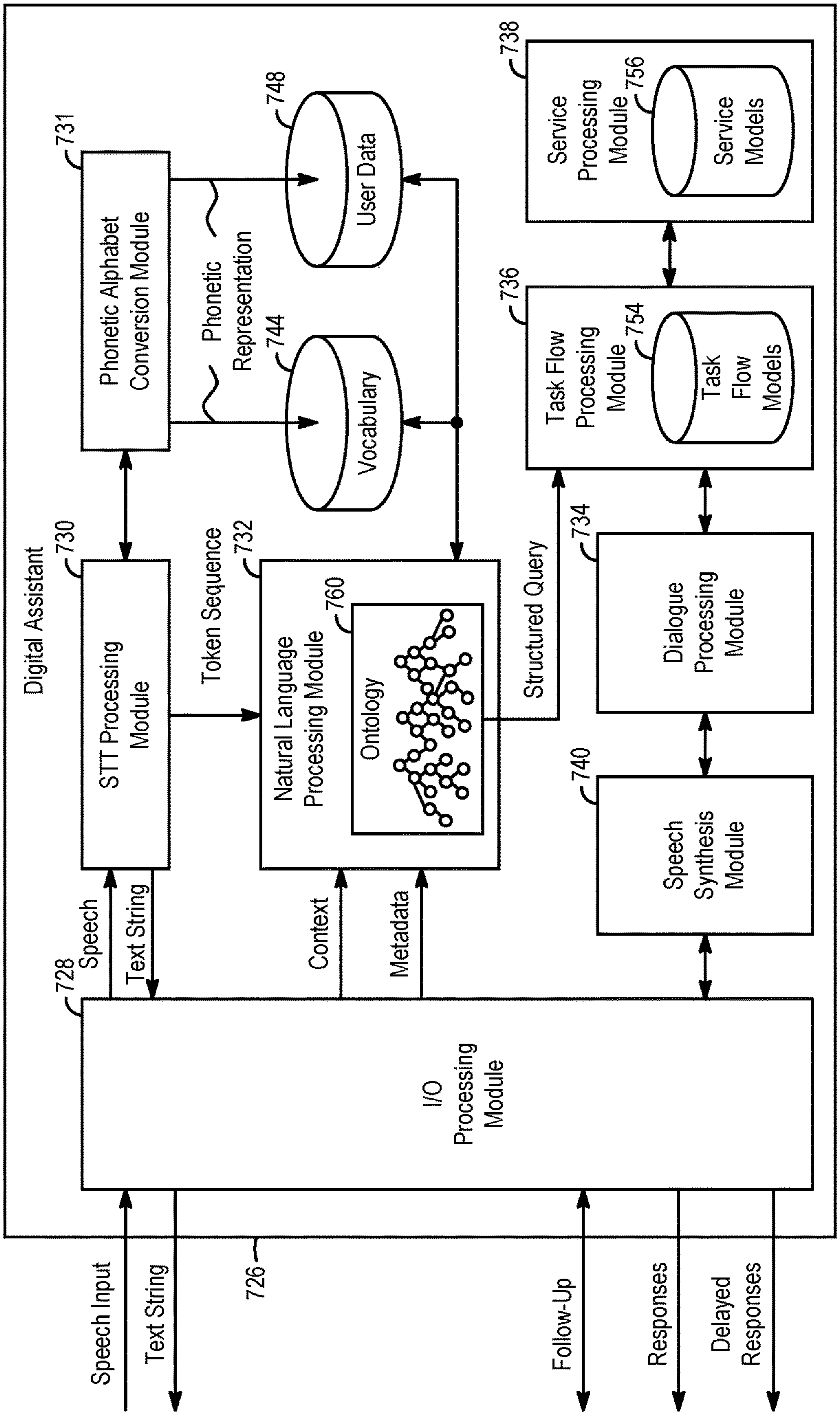
FIG. 7B illustrates the functions of the digital assistant shown in FIG. 7A, according to various examples.
Figure 7C:
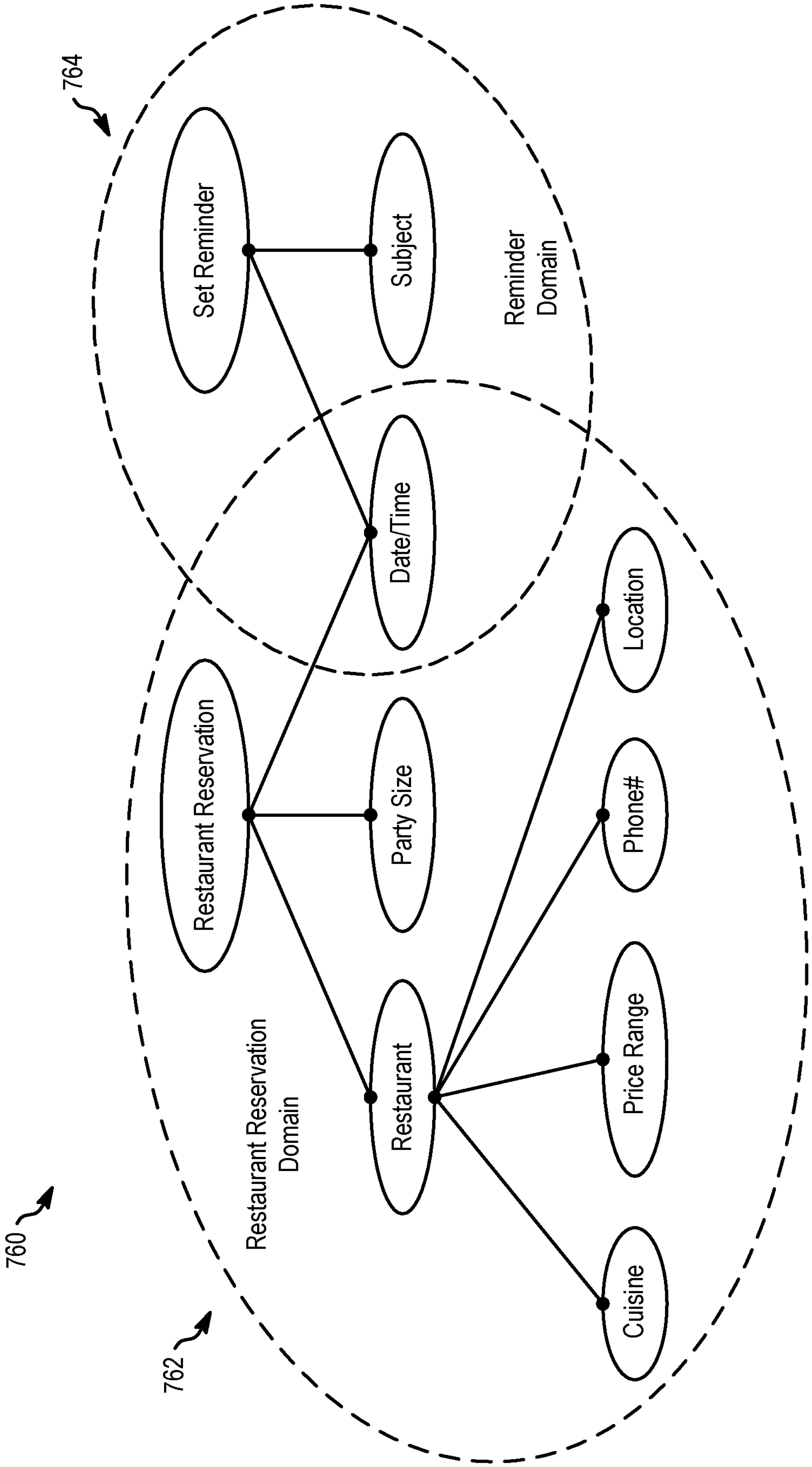
FIG. 7C illustrates a portion of an ontology, according to various examples.
Figure 8A:
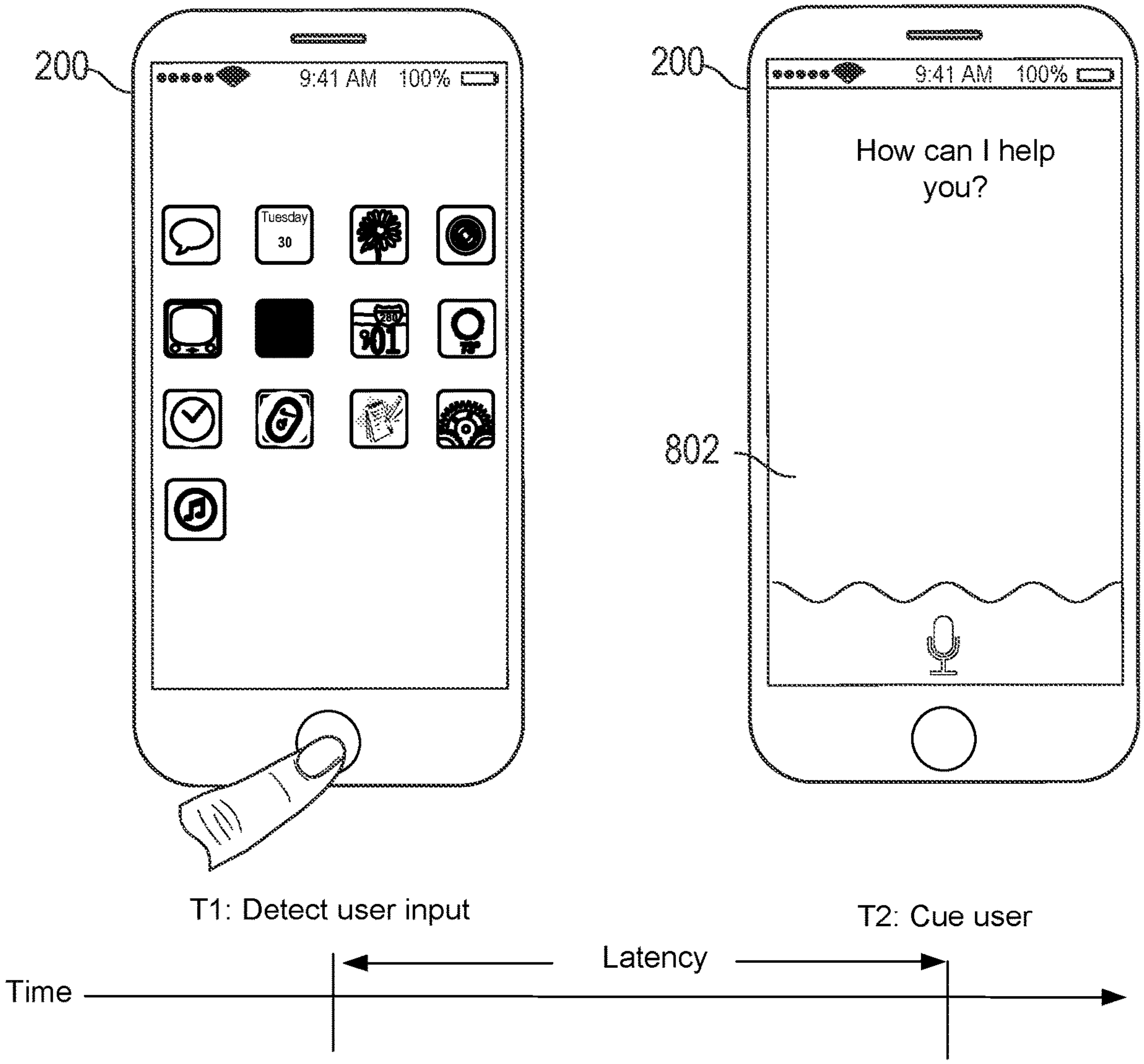
FIG. 8A provides a conceptual illustration of a prior-art digital assistant with latencies.
Figure 9:
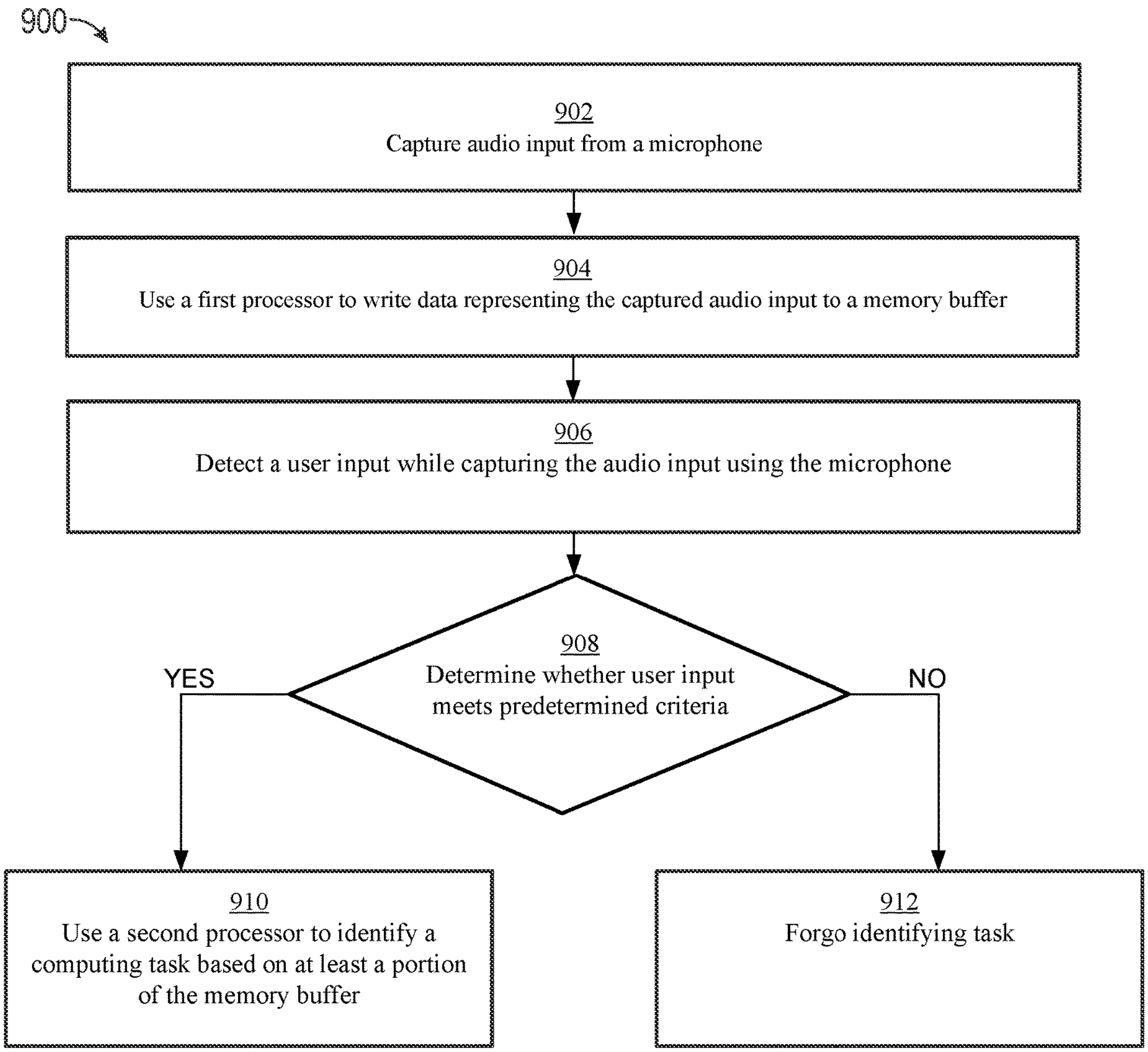
FIG. 9 illustrates a method for implementing a zero-latency digital assistant, according to various examples.
Figure 10:
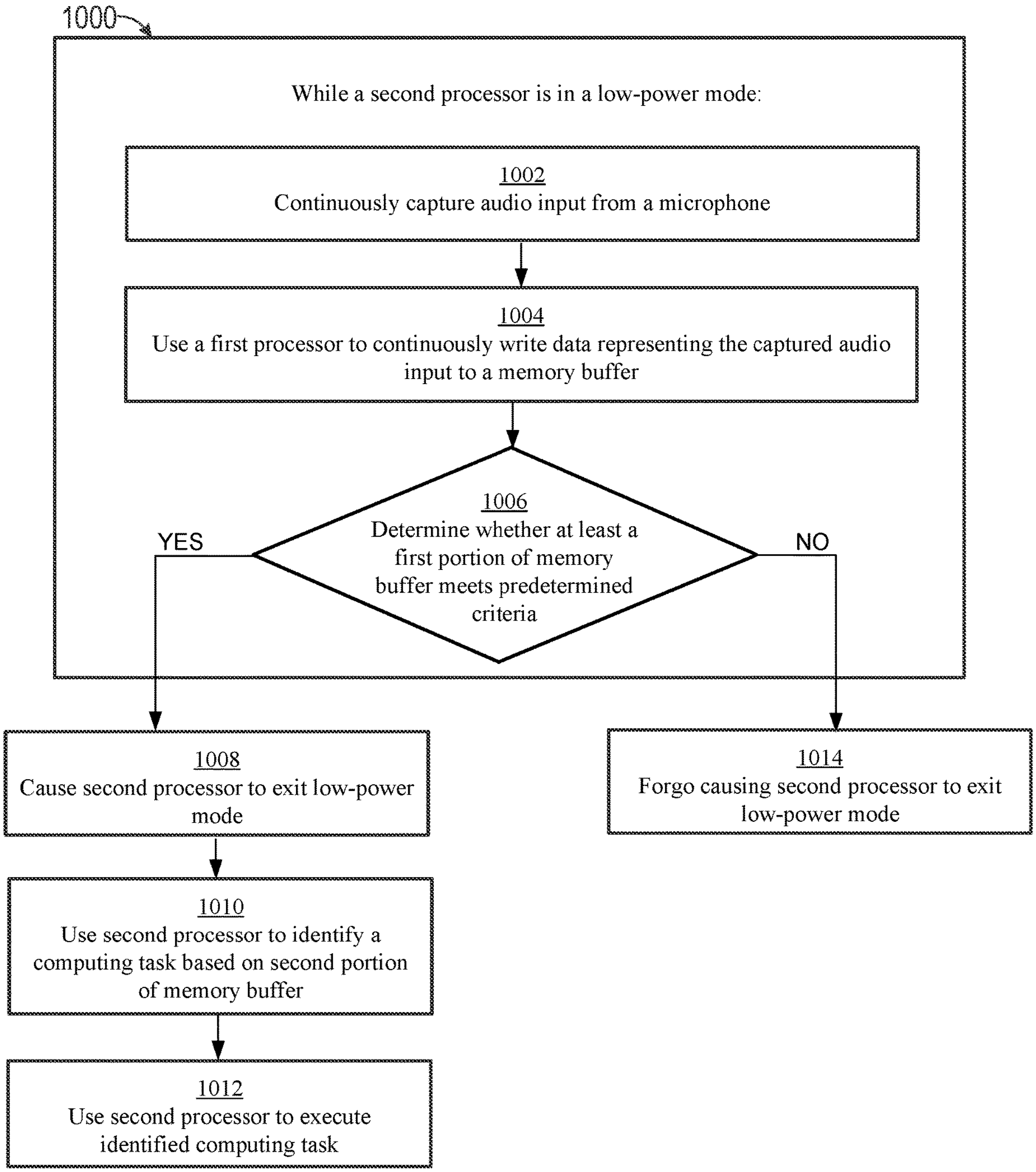
FIG. 10 illustrates a method for implementing a zero-latency digital assistant, according to various examples.

Below, FIGS. 1, 2A-2B, 3, 4, 5A-5B, 6A-6C, 8B, 11, and 12 provide a description of exemplary devices for performing the techniques for implementing a zero-latency digital assistant. FIGS. 7A-7C are block diagrams illustrating a digital assistant system or a server portion thereof, and a portion of an ontology associated with the digital assistant system. FIG. 8A provides a conceptual illustration of digital assistant with latencies. FIGS. 8C-8E provide conceptual illustrations of a zero-latency digital assistant in accordance with some embodiments. FIGS. 9-10 are flow diagrams illustrating methods of implementing a zero-latency digital assistant in accordance with some embodiments.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops, tablet computers, or smart watches with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1:
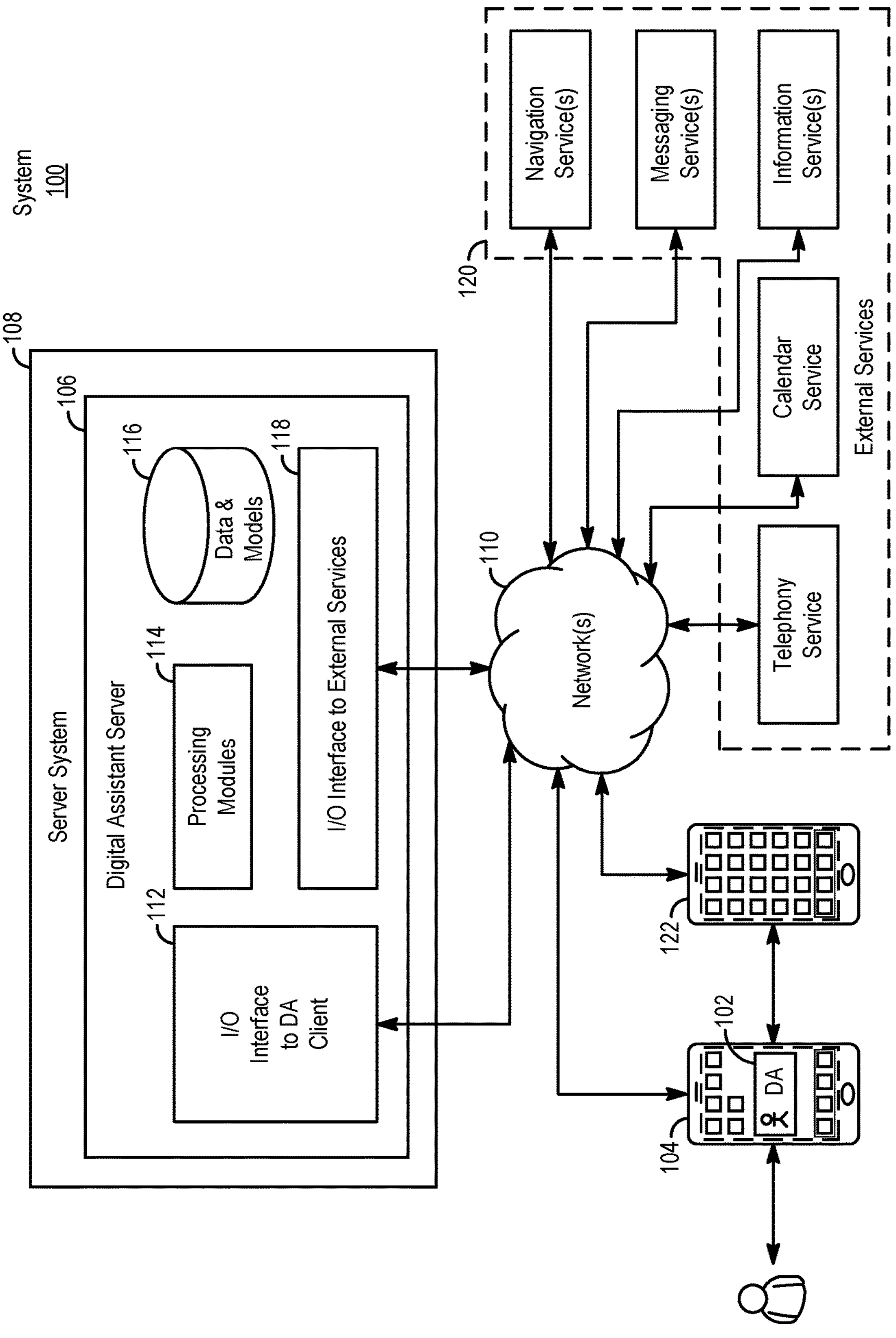
FIG. 1 is a block diagram illustrating a system and environment for implementing a digital assistant, according to various examples.

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

1. Electronic Devices

Figure 2A:
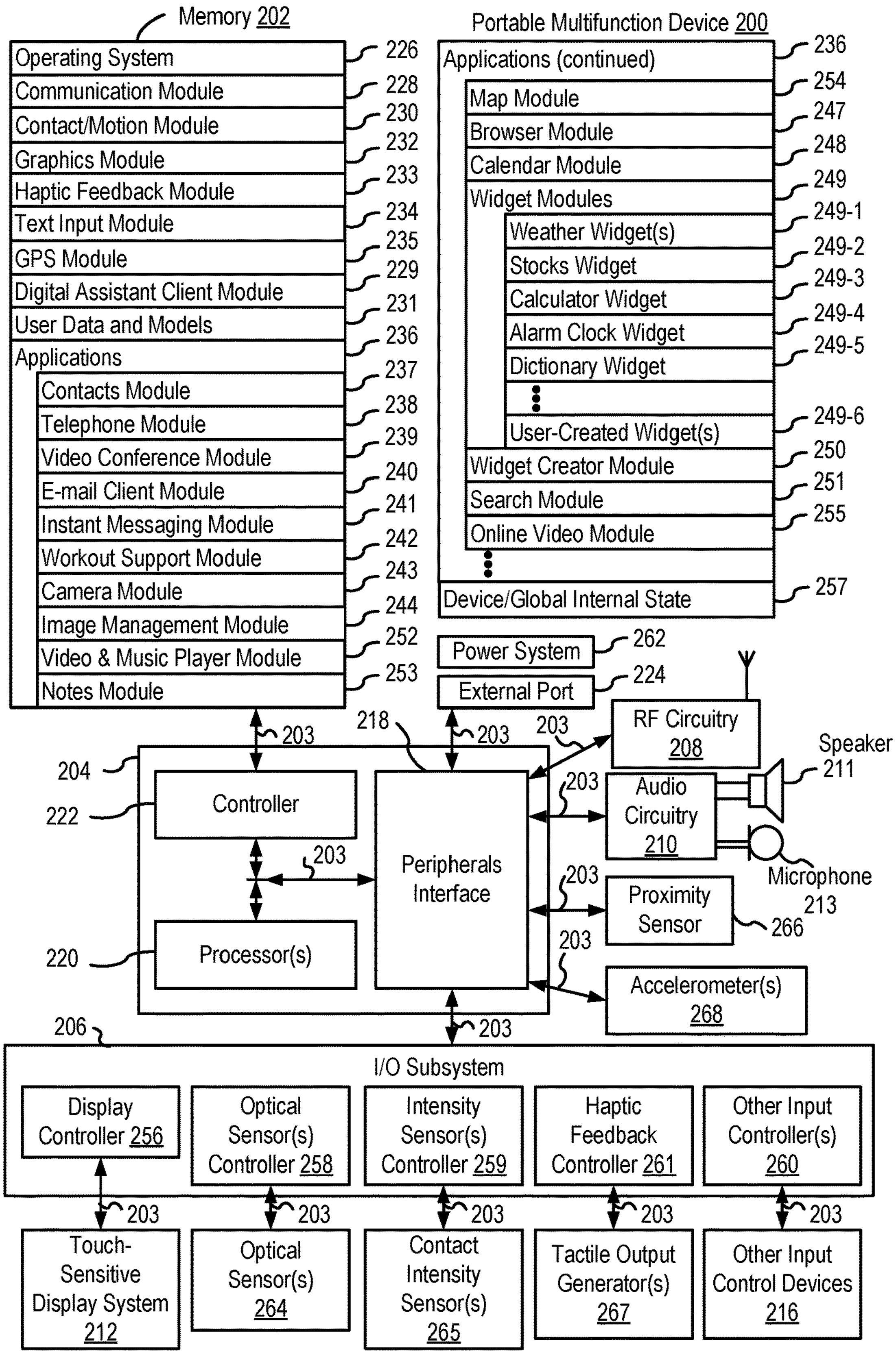
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of method 900, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of method 900, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
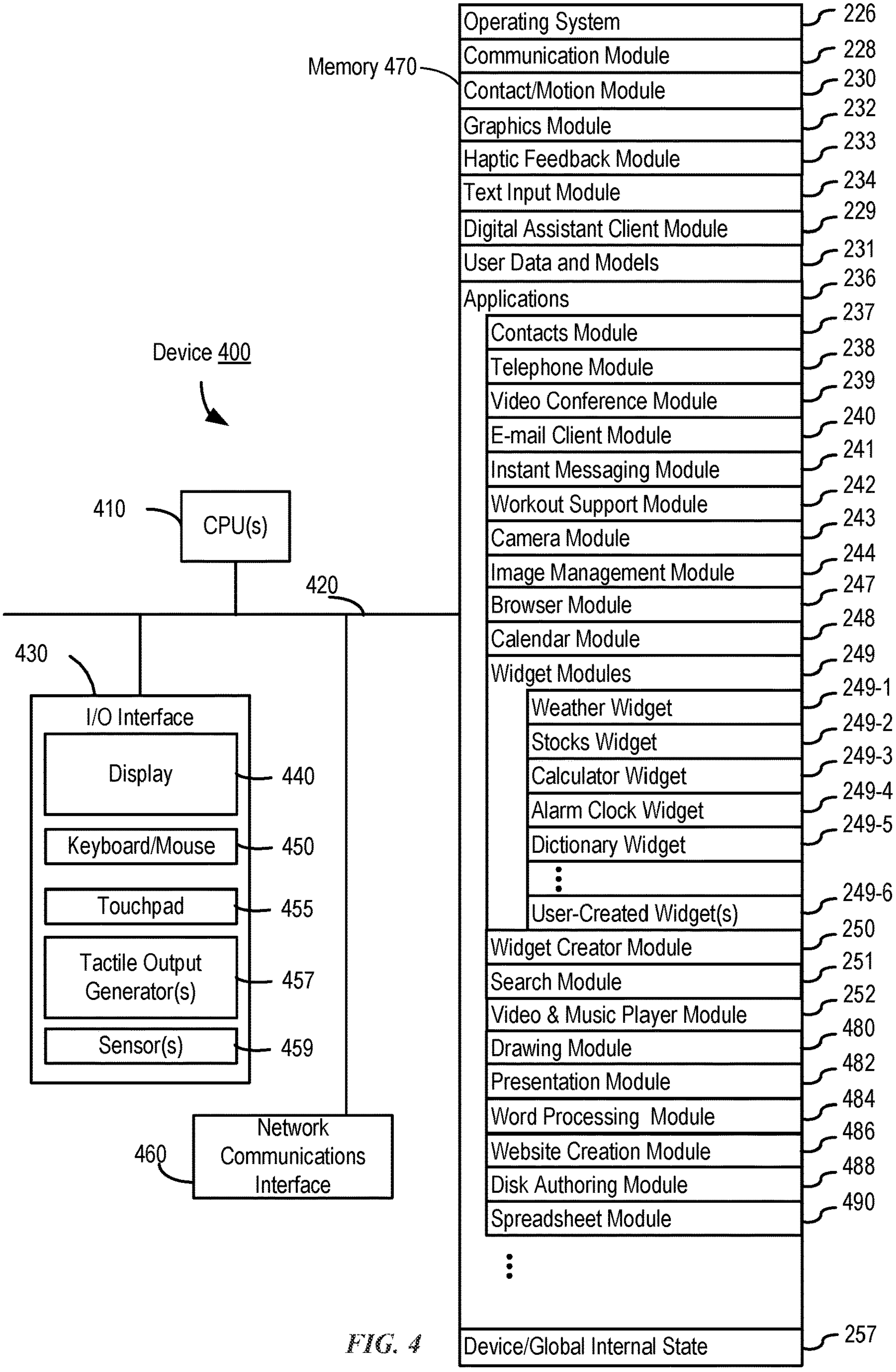
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);

Telephone module 238;

Video conference module 239;

E-mail client module 240;

Instant messaging (IM) module 241;

Workout support module 242;

Camera module 243 for still and/or video images;

Image management module 244;

Video player module;

Music player module;

Browser module 247;

Calendar module 248;

Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;

Widget creator module 250 for making user-created widgets 249-6;

Search module 251;

Video and music player module 252, which merges video player module and music player module;

Notes module 253;

Map module 254; and/or

Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module

247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
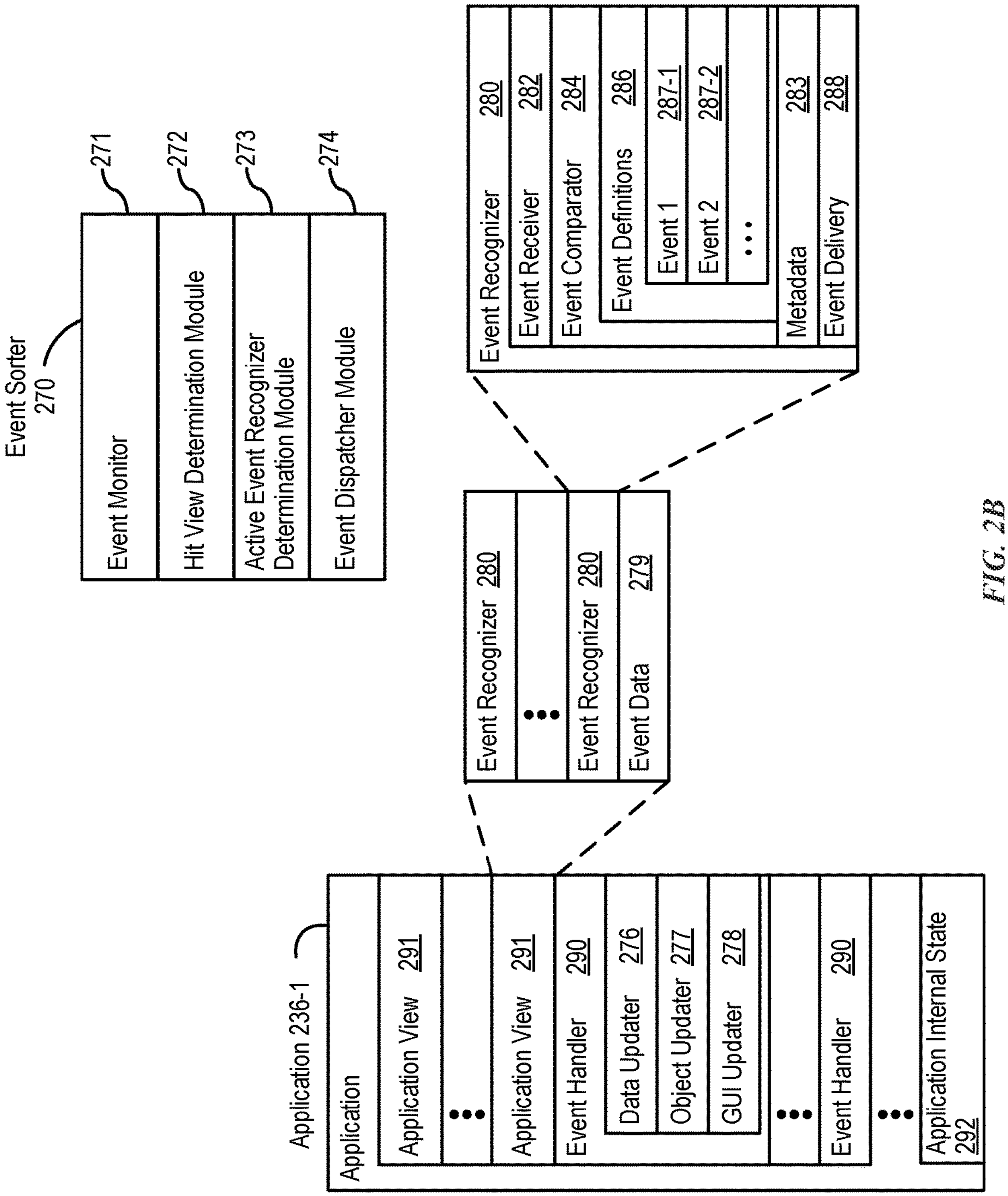
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
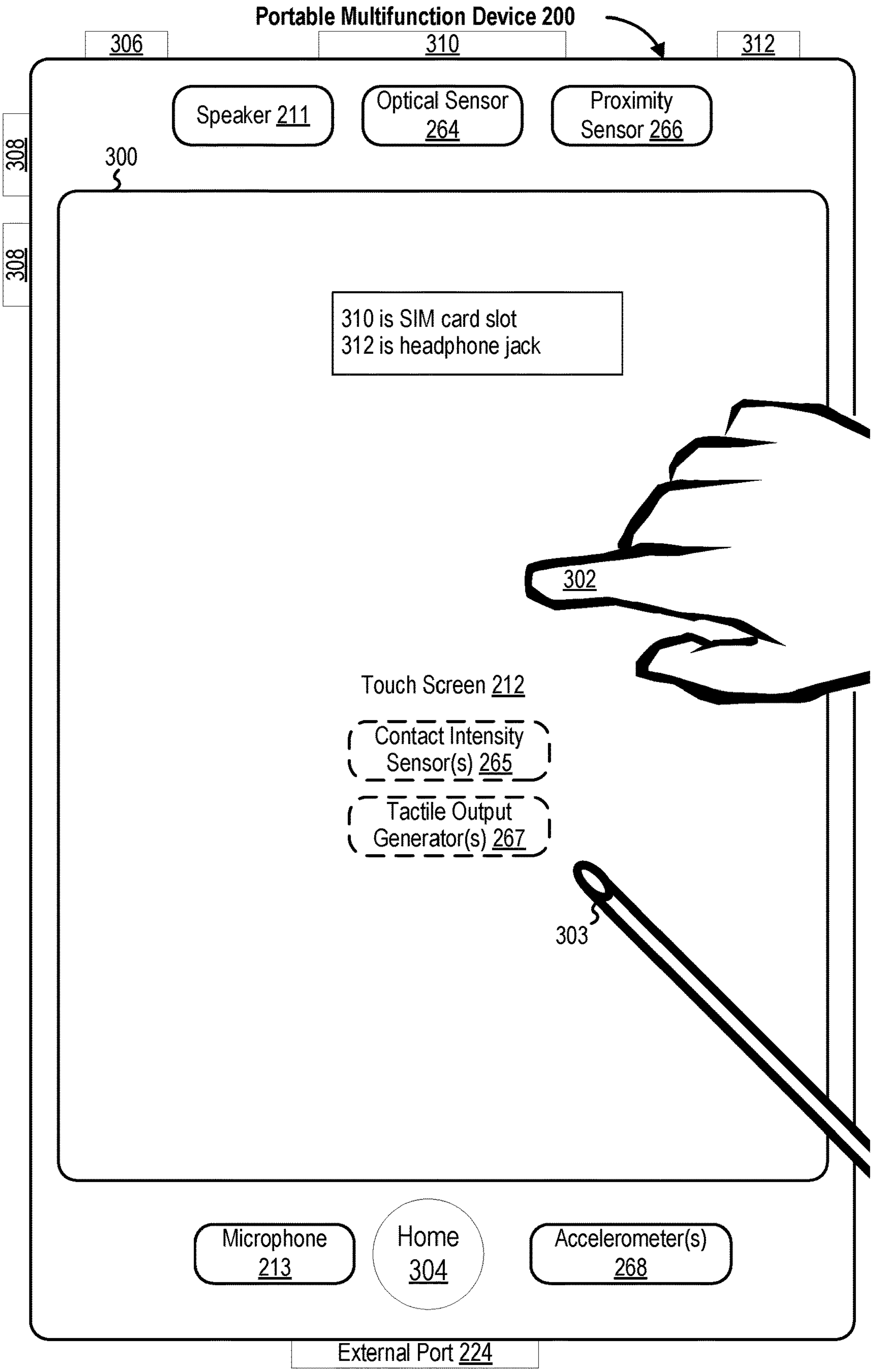
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
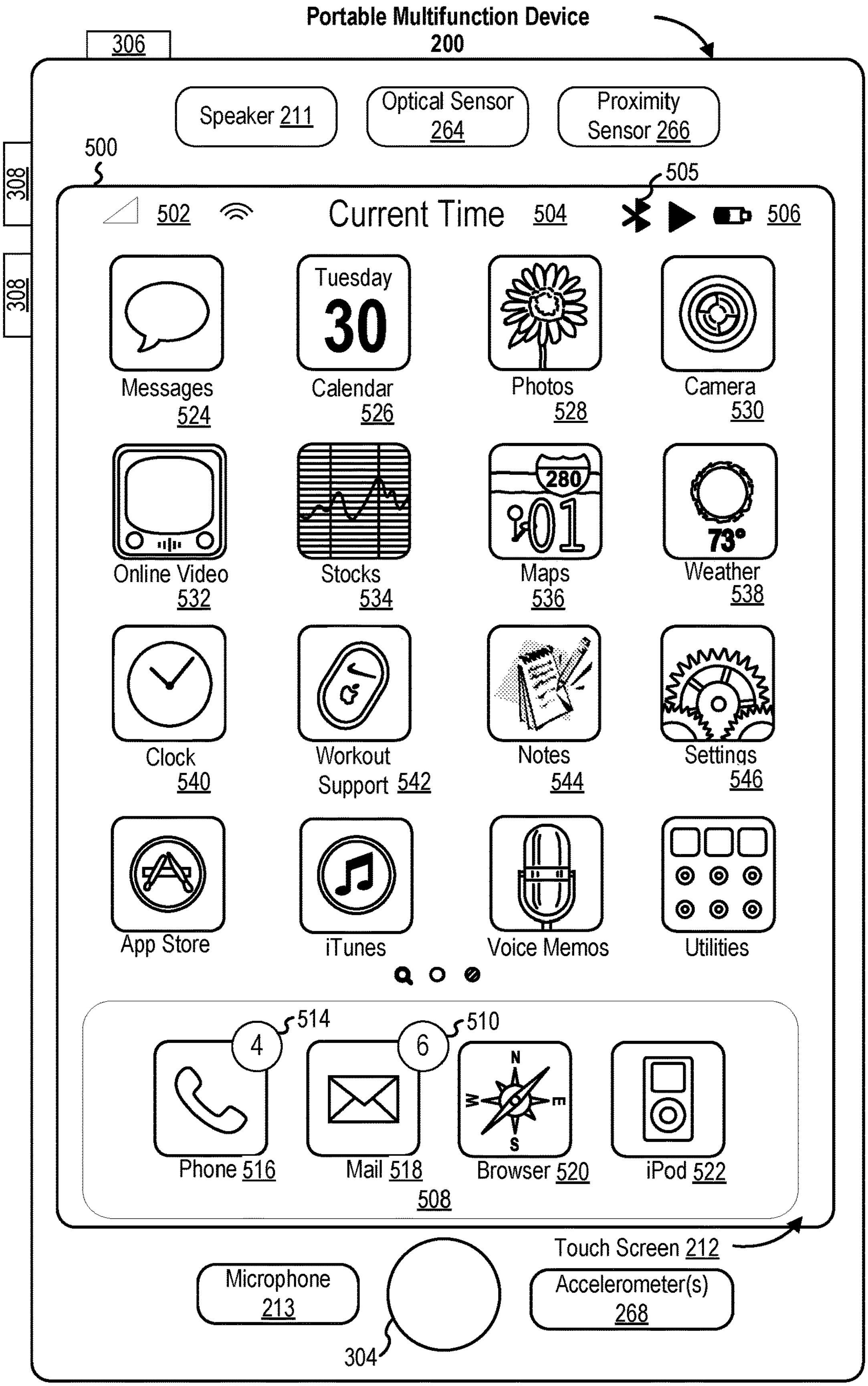
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
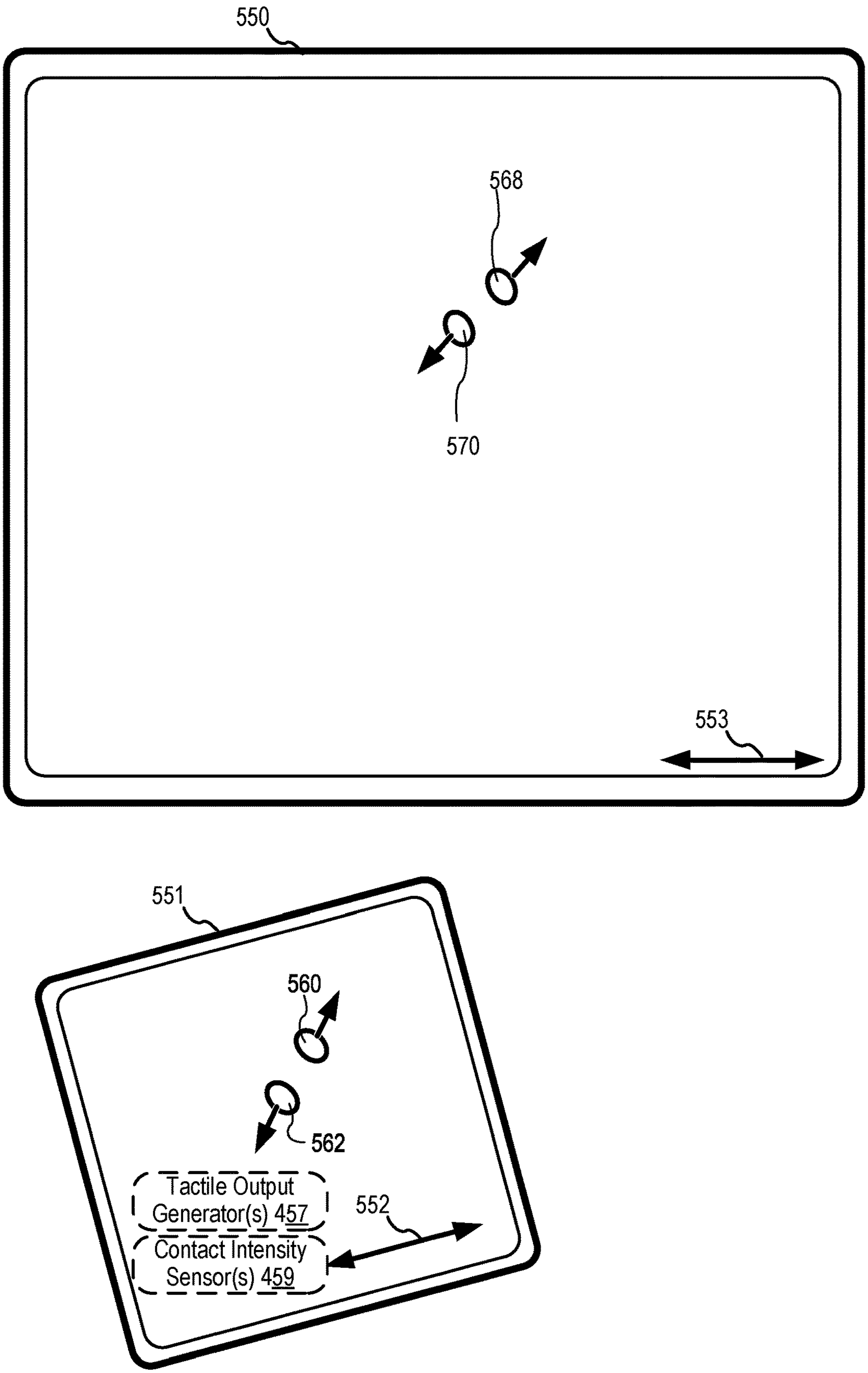
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
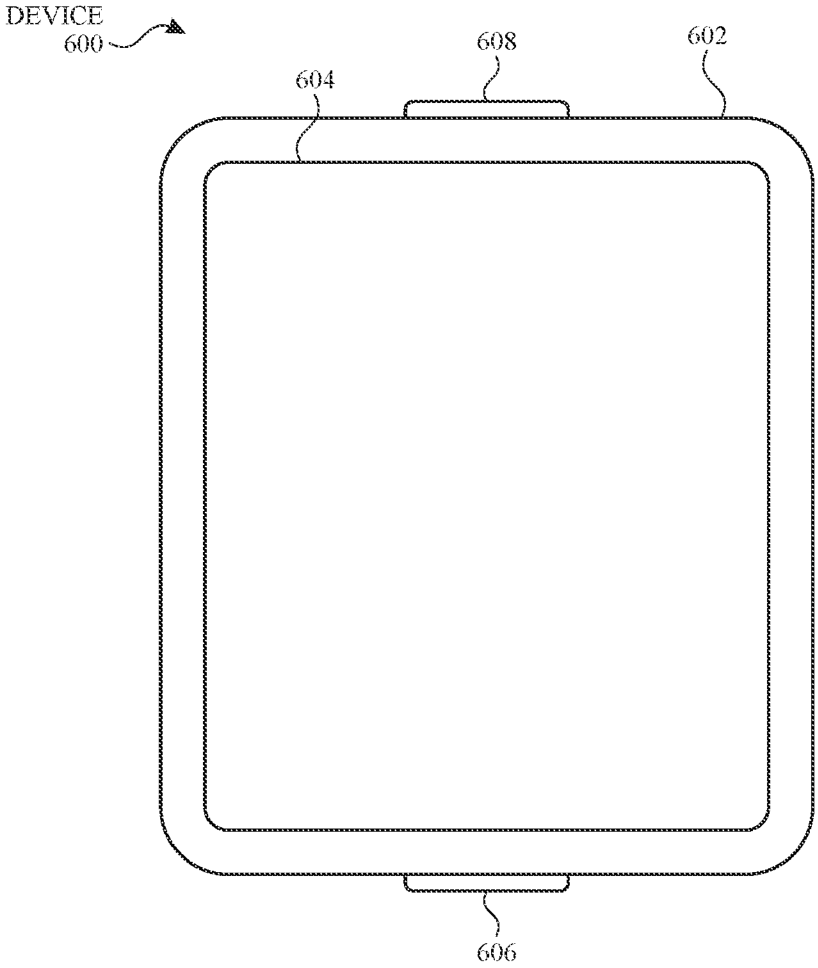
FIG. 6A illustrates a personal electronic device, according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
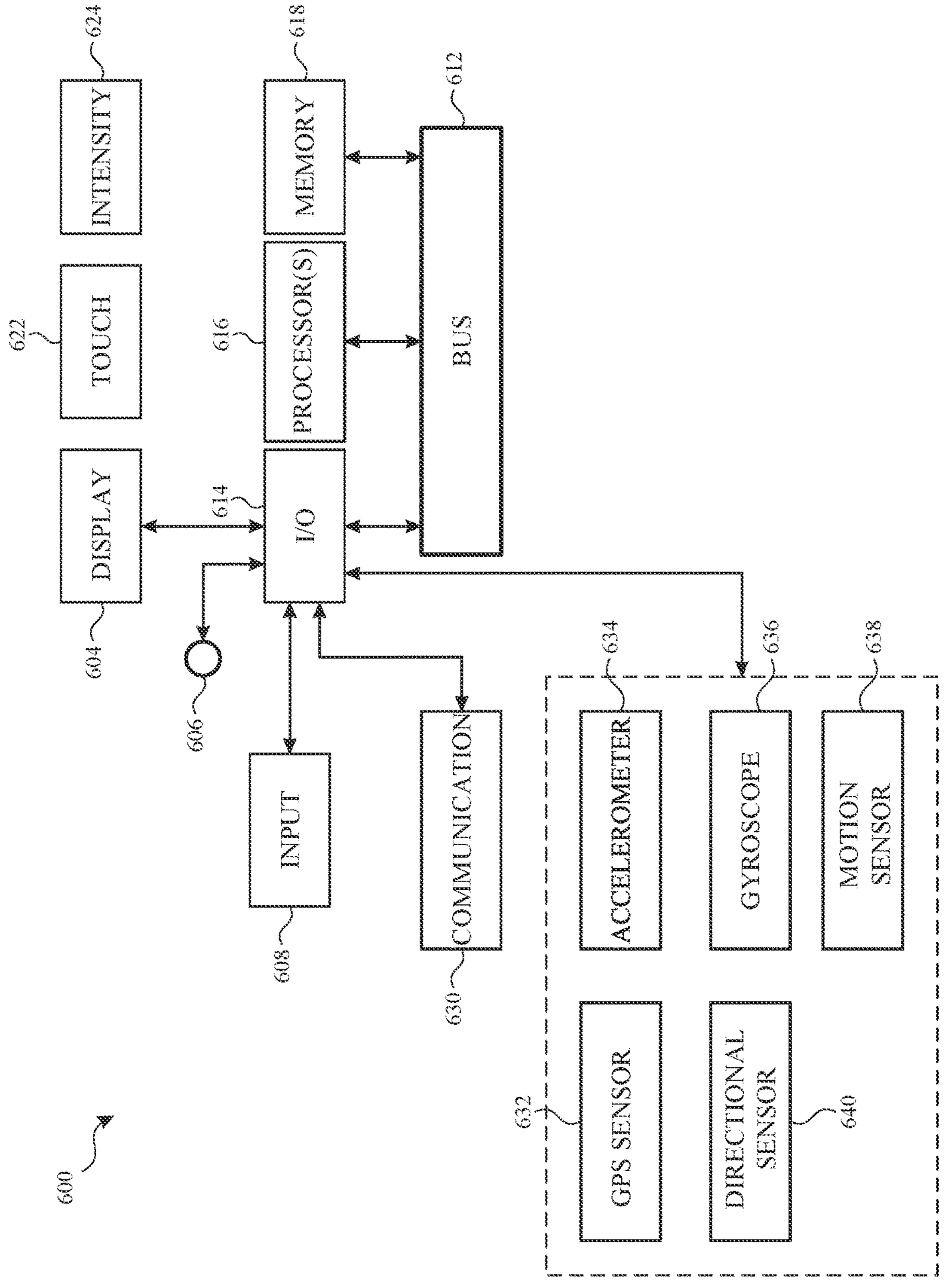
FIG. 6B is a block diagram illustrating a personal electronic device, according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques described below, including method 900 (FIGS. 8A-D). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

2. Digital Assistant System

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing method 900, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /t tə'meɪroʊ/ and /t tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /t tə'meɪroʊ/ can be ranked higher than /t tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /t tə'meɪroʊ/, can be associated with the United States, whereas the candidate pronunciation /t tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /t tə'meɪroʊ/ (associated with the United States) can be ranked higher than the candidate pronunciation /t tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /t tə'meɪroʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /t tə'meɪroʊ/ corresponds to the word "tomato," even if that particular sequence of phonemes is not one of the candidate sequence of phonemes for that word.

In some examples, natural language processing module 732 can be configured to receive metadata associated with the speech input. The metadata can indicate whether to perform natural language processing on the speech input (or the sequence of words or tokens corresponding to the speech input). If the metadata indicates that natural language processing is to be performed, then the natural language processing module can receive the sequence of words or tokens from the STT processing module to perform natural language processing. However, if the metadata indicates that natural language process is not to be performed, then the natural language processing module can be disabled and the sequence of words or tokens (e.g., text string) from the STT processing module can be outputted from the digital assistant. In some examples, the metadata can further identify one or more domains corresponding to the user request. Based on the one or more domains, the natural language processor can disable domains in ontology 760 other than the one or more domains. In this way, natural language processing is constrained to the one or more domains in ontology 760. In particular, the structure query (described below) can be generated using the one or more domains and not the other domains in the ontology.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, titled "Intelligent Automated Assistant," filed Jan. 10, 2011, and U.S. Utility application Ser. No. 13/251,088, titled "Generating and Processing Task Items That Represent Tasks to Perform," filed Sep. 30, 2011, the entire disclosures of which are incorporated herein by reference.

Attention is now directed to embodiments of a zero-latency digital assistant.

3. Zero-Latency Digital Assistants

As previously discussed, there is typically some latency between the time when the user requests a digital assistant session by providing (or beginning to provide) an appropriate input to the device, and the time at which the user can begin to provide a speech input to the digital assistant. Such latency may range from 100 to 900 milliseconds (or even longer), and can be long enough to be perceived by the user as a noticeable delay. If the user begins speaking too soon, the device ignores (or misses) the portion of the spoken input that was provided before the latency elapsed. Such device behavior reduces the efficiency of the digital assistant, and may be annoying or confusing to the user.

The above-described latency may include hardware latencies, such as the time required to activate the circuitry used to launch the digital assistant session or the time required to activate audio components or circuitry required by the digital assistant such as microphones or speakers, for example.

This latency may also include software-controlled latencies. For example, some devices do not begin to launch the digital assistant session until they have determined with sufficient confidence that the user has requested to launch the digital assistant by providing the appropriate input. For example, if the user input corresponding to a request to launch the digital assistant session is a long button press, the device may wait until the entire required button-press duration has elapsed before beginning to launch the digital assistant software. In some embodiments, the device may not transfer control of the microphone (or other audio components) to the digital assistant until it is ready to launch the digital assistant. This approach can avoid prematurely revoking control of the microphone or speakers from another application, such as a phone call or a dictation application.

One drawback associated with the above-described hardware and software latencies is that the user typically has to wait until the latency has elapsed before providing a request, such as a speech input, to the digital assistant. However, the user may not know how long to wait before providing the request. As a consequence, the device may need to provide a visible or audible cue to the user that the digital assistant is ready to receive a request, as depicted in FIG. 8A.

In the example of FIG. 8A, the device detects a user input (or the beginning of a user input) requesting a digital assistant at time T1, and then cues the user at time T2 to provide a spoken input to the digital assistant after the latency has elapsed.

It is desirable for the device to allow the user to begin providing a spoken input immediately upon requesting the digital assistant, without waiting for the latency to elapse. For example, it may be desirable to allow the user to provide a spoken input to the digital assistant as soon as the user begins providing the input to request the digital assistant, before the software or hardware latencies associated with (1) determining whether the user input corresponds to a request to launch the digital assistant and (2) actually launching the digital assistant have fully elapsed.

In some embodiments, the device can achieve this objective by using a low-power processor to continuously capture and record audio inputs from a microphone to a memory buffer on the device. The device can then provide some or all of the contents of the buffer—including speech inputs that were captured before or during the user input requesting to launch a digital assistant session—to the digital assistant once it has been launched. In this manner, the device can achieve what the user may perceive as a "zero latency" digital assistant without unduly reducing battery life, as described in more detail below.

Figure 8B:
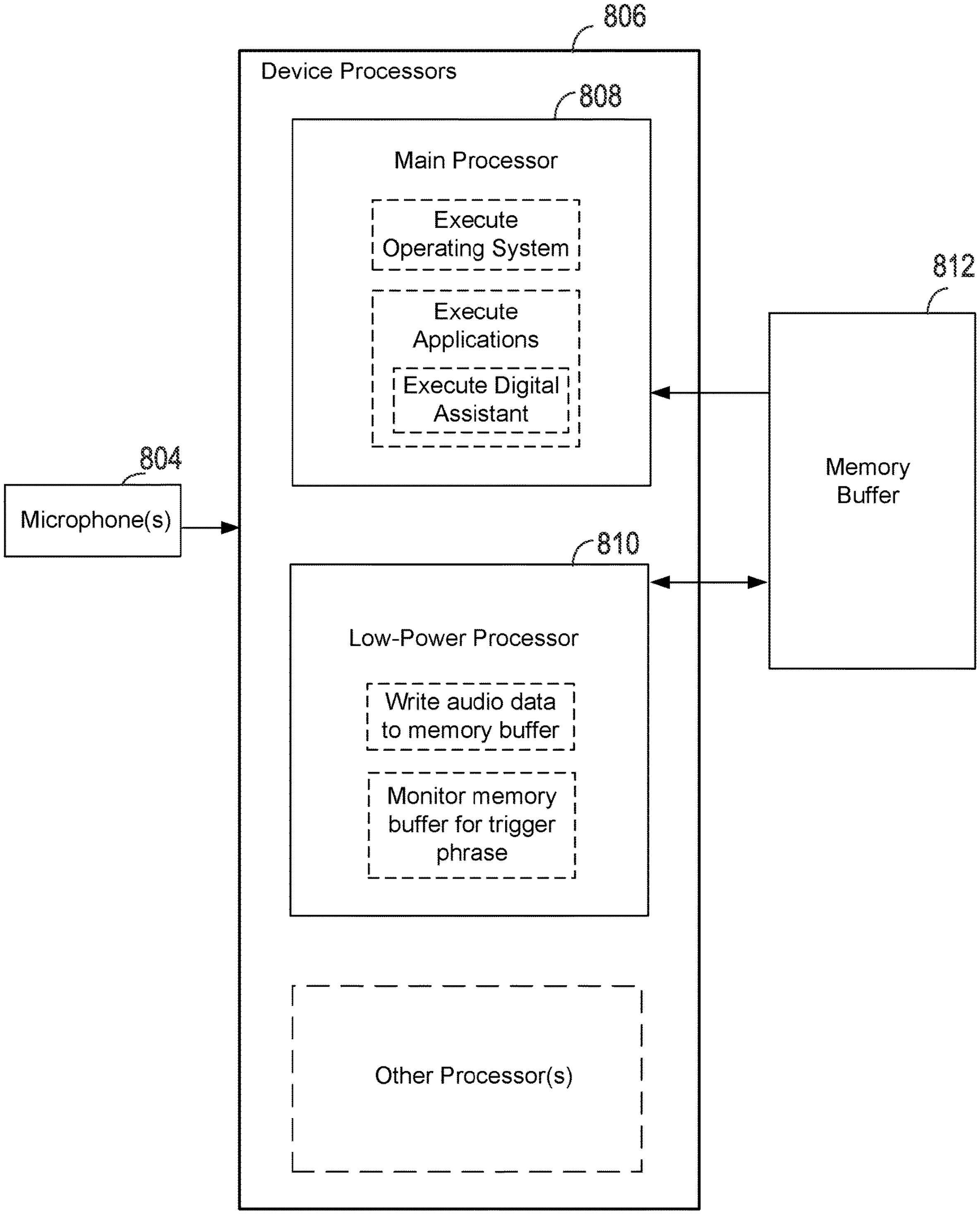
FIG. 8B illustrates a block diagram of processors used to implement a digital assistant on an electronic device, according to various examples.
Figure 8C:
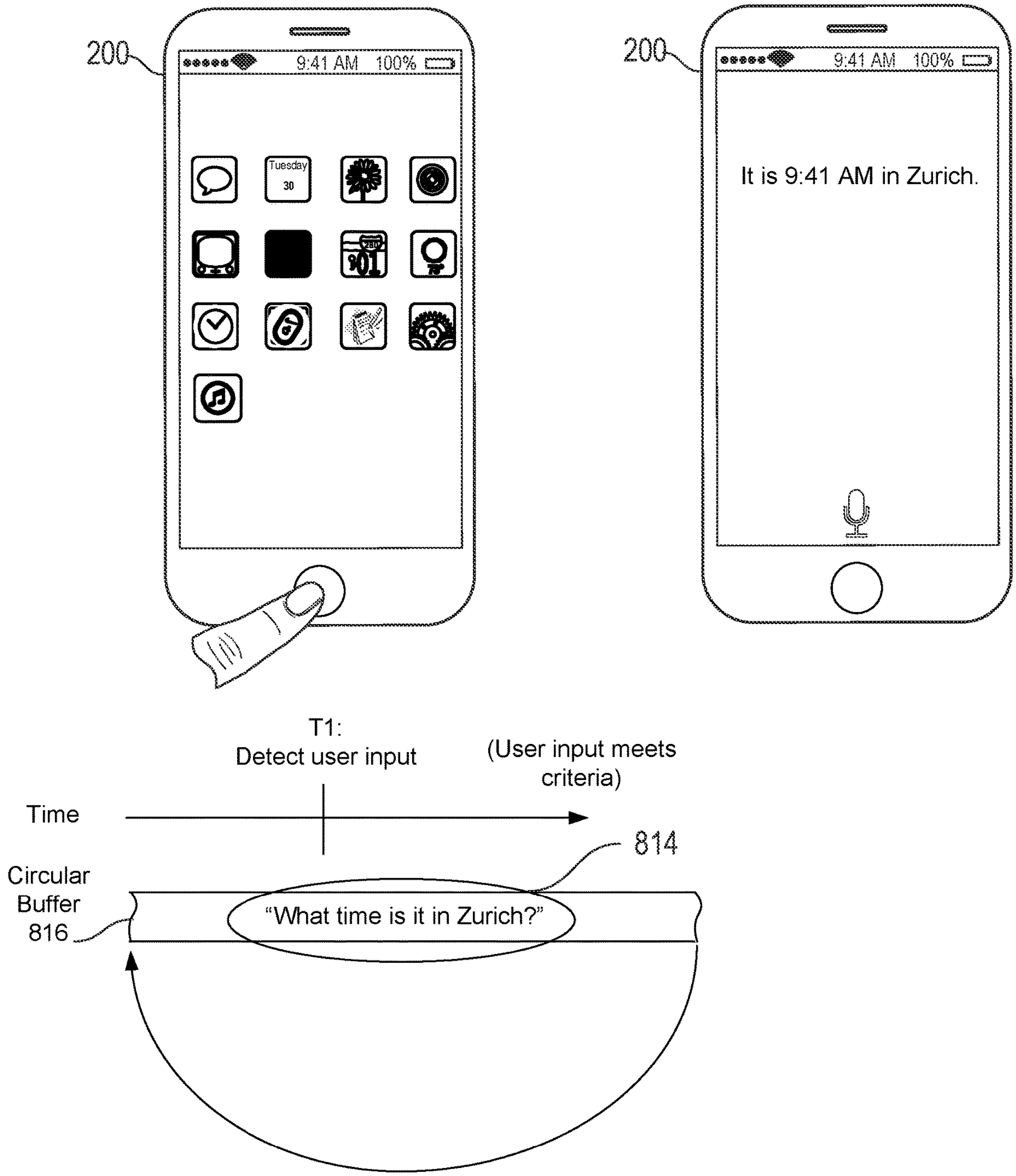
FIG. 8C provides a conceptual illustration of a zero-latency digital assistant, according to various examples.
Figure 8D:
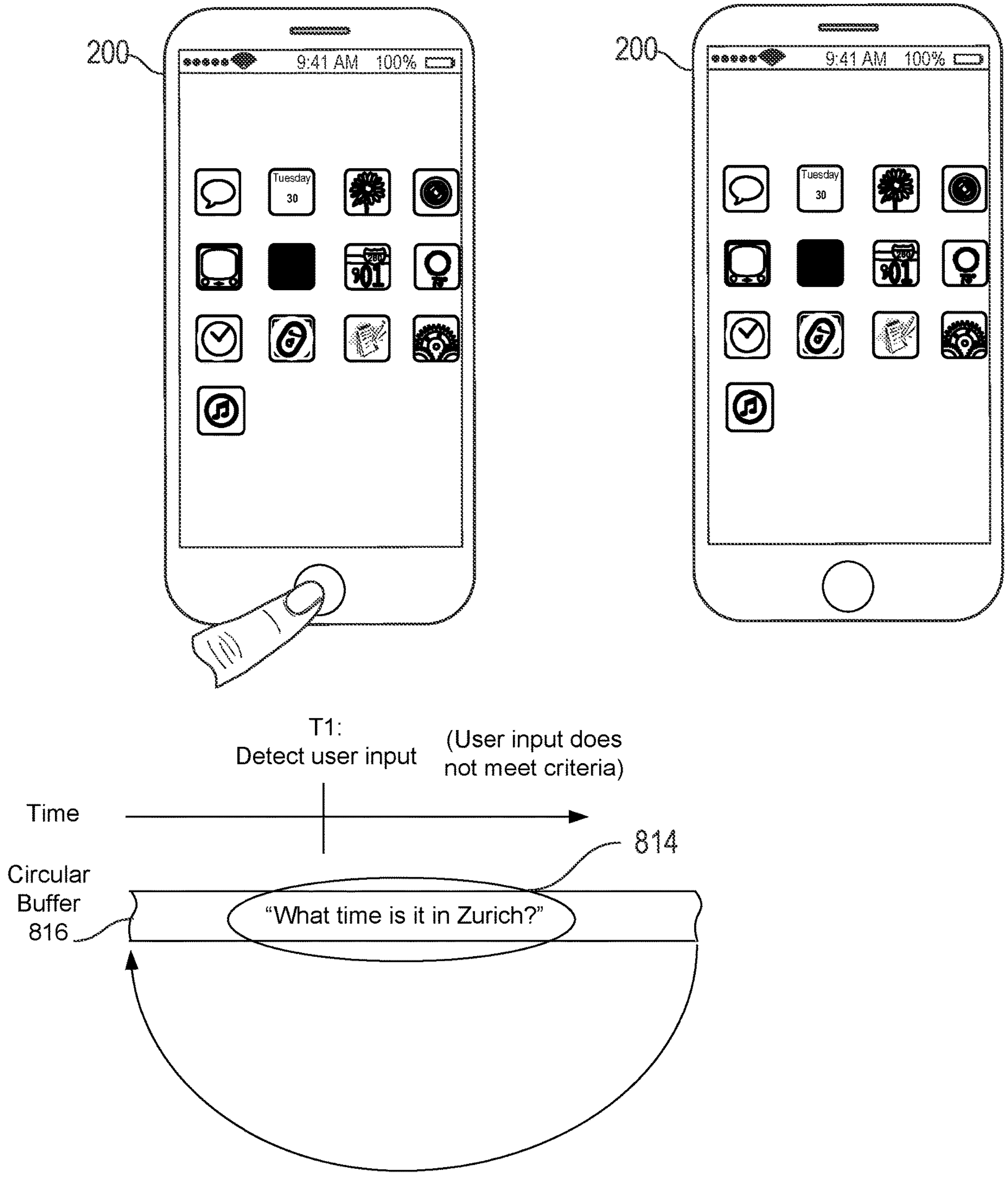
FIG. 8D provides a conceptual illustration of a zero-latency digital assistant, according to various examples.
Figure 8E:
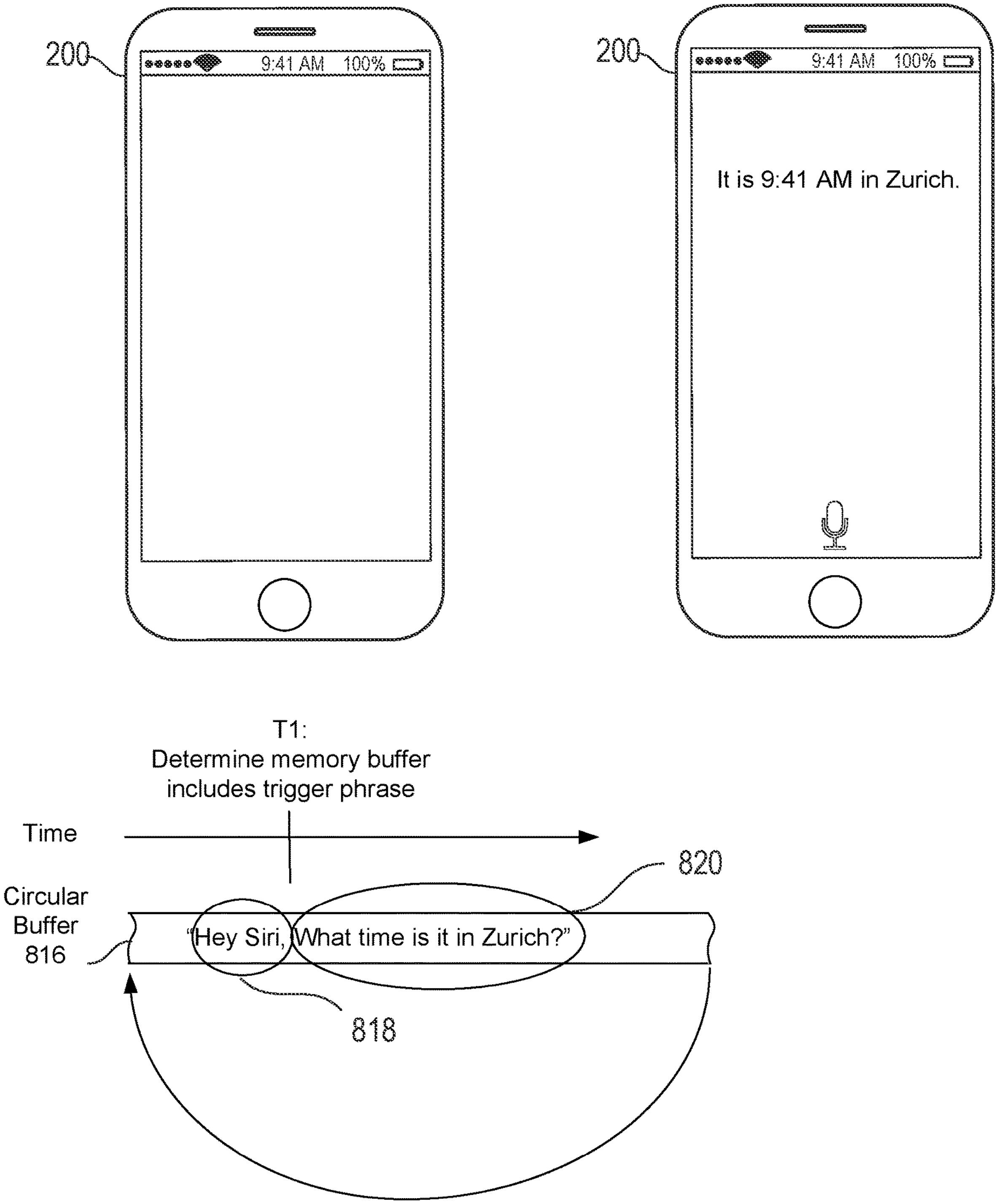
FIG. 8E provides a conceptual illustration of a zero-latency digital assistant, according to various examples.

As depicted in FIG. 8B, in some embodiments, the device includes a low-power processor 810 that is separate from the main processor 808 on the device. The low-power processor can be used to write audio data to a memory buffer 812, thereby maintaining a history of user speech inputs. In some embodiments, the low-power processor consumes less power than the main processor, executes different computer-executable instructions than the main processor, and/or is physically smaller than the main processor. Thus, the low-power processor may be able to continuously write audio data to the memory buffer without compromising battery life.

In some embodiments, the main processor 808 is an application processor that executes, for example, the operating system and applications, including the digital assistant.

In some embodiments, the low-power processor 810 is active and operating in a normal mode even when the main processor 808 is operating in a low-power mode. In some examples, the main processor is in a low-power mode if it is constrained in the number or type of operations it can perform while operating in the low-power mode. In some examples, the main processor is in a low-power mode if it is operating with some of the processor circuitry disabled. In some examples, the main processor is in a low-power mode if it is operating at a reduced clock speed, reduced voltage, or reduced current relative to values when the main processor is operating in a normal mode. In some examples, the main processor must exit the low-power mode to provide certain functionality, such as launching or executing applications.

In some embodiments, the device continuously captures audio input from the microphone 804 on the device and uses the low-power processor 810 to write audio data representing the audio inputs received from the microphone 804 to a memory buffer 812 on the device. In some embodiments, the device captures the audio input and writes the audio data to the memory buffer 812 continuously or at a predetermined sampling frequency, regardless of whether the device has detected any audio input. In other embodiments, the device uses the low-power processor to write audio data to the buffer only when the device detects audio input; e.g., when the device detects that a user is speaking into the microphone. Thus, in some embodiments, the device uses the low-power processor to monitor the microphone for audio inputs, and if such audio inputs are detected, the device uses the low-power processor to write audio data representing the audio inputs to the memory buffer.

In some embodiments, the memory buffer is a circular buffer. A circular buffer is a fixed-length memory buffer that, when filled with data, is overwritten with new data starting from the beginning of the buffer. In some embodiments, the memory buffer is large enough to store a predetermined duration of audio input captured by the microphone. For example, the memory buffer may be large enough to store 1, 2, or 3 seconds of audio input.

In some embodiments, if the device detects a user input while capturing the audio input using the microphone, the device uses the low-power processor to determine whether the user input corresponds to a request to launch a digital assistant session. The user input may be, for example, a button press or a contact on a touch-sensitive display, for example.

In some embodiments, if the device determines that the user input has met the predetermined criteria and therefore corresponds to a request to launch the digital assistant, the device immediately begins to identify and execute a computing task based on at least some of the contents of the memory buffer. The requested computing task may be, for example, a request to find information, or a request for the device to perform a function such as make a phone call, send a text, make a reservation, launch an application, and so on, as previously discussed with respect to digital assistant systems.

In some embodiments, the device identifies and executes the task by launching a digital assistant session on the main processor and providing at least some of the contents of the memory buffer to the digital assistant. Because the memory buffer can contain audio data that was captured and written before, during, and after the device detected user input, the buffer provides an audio history that can be used to reduce or eliminate the delay between the time when the user requests (via a user input) to launch a digital assistant session and when the user can provide a spoken input to the digital assistant.

In some embodiments, the device determines whether the user input corresponds to a request to launch the digital assistant by determining whether the user input meets certain predetermined criteria. In some embodiments, the criteria include a criterion that is met when a button press meets a minimum duration; that is, a button press input must exceed a threshold duration in order to be identified as a request to launch a digital assistant session. The threshold button-press duration may be 100, 200, 300, 400, 500, 600, 700, 800, or 900 milliseconds, for example.

In some embodiments, the criteria for determining whether a user input corresponds to a request to launch a digital assistant session includes a criterion that is met when a contact on the touch-sensitive display is detected at a particular location on the display, when the contact is a particular type of contact (e.g., a swipe or double-tap), and/or when the device detects that a particular icon has been selected.

In some embodiments, the device uses the low-power processor to analyze the audio data in the memory buffer to determine whether the audio data includes a "trigger phrase" corresponding to a request to launch a digital assistant session. Such a trigger phrase may be, for example, the phrase "Hey Siri" or "wake up" or another phrase, word, or sound.

In some embodiments, the user input corresponding to a request to launch a digital assistant is a speech input containing the trigger phrase. When the device determines, using the low-power processor, that the memory buffer includes the trigger phrase, the device launches the digital assistant on the main processor. Thus, in some embodiments, the criteria include a criterion that is met when at least a portion of the memory buffer includes the trigger phrase.

In some embodiments, the criteria include a criterion that is met when the device determines that the trigger phrase was spoken by an authorized user. The device may determine whether the trigger phrase was spoken by an authorized user by comparing the voice or speech characteristics of the audio data in the memory buffer with a set of known characteristics for an authorized user. Such characteristics may include characteristic spectral patterns, speech patterns, intonations, etc.

In some embodiments, if the main processor is operating in a low-power mode when the device determines (using the low-power processor) that the user input has met the predetermined criteria, the device causes the main processor to exit the low-power mode and launch the digital assistant session. In some embodiments, the device activates audio circuitry on the device in preparation for receiving and responding to a subsequent speech input to the digital assistant. Such audio circuitry may include, for example, an additional microphone(s) or audio output hardware (such as speakers) that may be used by the digital assistant to receive audio input from the user or provide audio output to the user. In some embodiments, launching a digital assistant session includes transferring control of such audio circuitry to the digital assistant session.

In some embodiments, launching the digital assistant session includes displaying a user interface associated with the digital assistant session on a display on the device, such as on touchscreen 104. The user interface may include, for example, one or more affordances, waveforms, or textual output associated with the digital assistant session. FIG. 8A depicts an exemplary user interface 802 associated with a digital assistant session.

In some embodiments, the user interface associated with the digital assistant is displayed in a full-screen view, as depicted in FIG. 8A. In some embodiments, when the device launches the digital assistant session on the main processor, the device replaces display of another application view with display of the user interface associated with the digital assistant.

FIG. 8C depicts a conceptual example of a zero-latency digital assistant implemented in accordance with some embodiments. In this example, the user does not have to wait after invoking the digital assistant to provide a spoken input to the digital assistant; in fact, in this example, the user begins providing the spoken input before invoking the digital assistant; that is, the user presses a button corresponding to a request to launch the digital assistant while already speaking a request. The device then uses the spoken input to identify and execute the requested task, as described below.

As depicted in FIG. 8C, at time T1, while the device 200 is capturing and writing audio inputs to a memory buffer (in this case, circular buffer 816), the device detects a user input (in this case, a button press). Note that at time T1, when the device detects the button press, the user has already begun providing the speech input "What time is it in Zurich?" and a portion of this phrase has already been written to circular buffer 816. The device 200 determines that the user input meets the predetermined criteria corresponding to a request to launch a digital assistant (e.g., the button press meets a threshold duration), and the device then uses the main processor to identify and execute a task based on a portion 814 of the contents of the circular buffer 816. The portion 814 of the buffer includes the query "What time is it in Zurich?" and the device identifies and executes the task of determining what time it is in Zurich. The device provides the results of the task to the user on the display by displaying the text "It is 9:41 AM in Zurich." In some embodiments, the device may also provide an audio output to present the results of the task to the user.

In the example depicted in FIG. 8C, the device does not require any additional inputs from the user to identify and execute the task, and the device does not cue the user for inputs as depicted earlier in FIG. 8A.

FIG. 8D depicts a conceptual example of a zero-latency digital assistant implemented in accordance with some embodiments. This example is similar to the example depicted in FIG. 8C, but in this case, the user input does not meet the predetermined criteria and therefore is not interpreted as a request to launch the digital assistant; e.g., the button is not pressed long enough to meet the threshold duration. In this case, although the device has captured and written a spoken request to the memory buffer, the device does not proceed to identify and execute a task based on the contents of the memory buffer, and the device does not launch a digital assistant session. The contents of the buffer will subsequently be overwritten with new audio data.

FIG. 8E depicts a conceptual example of a zero-latency digital assistant implemented in accordance with some embodiments. In this example, the device determines that the memory buffer includes a predetermined trigger phrase, and in response, the device immediately identifies and executes a task based on contents in the memory buffer.

In the example depicted in FIG. 8E, at time T1, while the main processor is in a low-power mode and device 200 is capturing and writing audio inputs to circular buffer 816 using the low-power processor, the device determines (using the low-power processor) that a first portion 818 of the memory buffer includes a trigger phrase associated with a request to launch the digital assistant. In response to this determination, the device causes the main processor to exit the low-power mode and to identify and execute a task based on a second portion 820 of the contents of the circular buffer 816. Thus, in this example, the user speaks the trigger phrase associated with the digital assistant and immediately begins speaking a request to the digital assistant. The device then identifies and executes a task based on a portion of the contents of the memory buffer and provides the results of the task to the user. In this example, the device does not require any additional inputs from the user to identify and execute the task, and does not cue the user for inputs as depicted earlier in FIG. 8A.

As discussed with respect to FIG. 1, a digital assistant system may include a remote server system 108 that can be used for, e.g., remotely performing natural language processing and identifying tasks. In some embodiments, the device provides some or all of the contents of the memory buffer to a remote server(s) associated with the digital assistant. The device can provide the contents of the memory buffer to the server via a wired or wireless network connection, for example.

In some embodiments, the device may include multiple microphones. In this case, the device may use one microphone for capturing and writing audio input to the memory buffer using the low-power processor, and the device may use a second microphone for capturing audio used by applications or functions that are executed on the main processor, such as a phone call or digital assistant. Thus, in some embodiments, the device can simultaneously capture and write audio input to the memory buffer using the first microphone while executing another audio-based application, such as a phone call, using the second microphone.

In some embodiments, when the device determines that the user input has met the predetermined criteria and thus the user has requested a digital assistant session, the device provides some or all of the contents of the memory buffer to the digital assistant, transfers control of the second microphone to the digital assistant (if it is assigned to another application), and begins to stream (e.g., continuously provide) subsequent audio detected by the second microphone to the digital assistant.

FIG. 9 illustrates a method 900 for implementing a zero-latency digital assistant according to various examples. Method 900 can be performed using one or more electronic devices implementing a digital assistant. Some operations in method 900 may be combined, the order of some operations may be changed, and some operations may be omitted. In some examples, method 900 can be performed using a client-server system (e.g., system 100) implementing a digital assistant. The individual blocks of the method 900 may be distributed in any appropriate manner among one or more computers, systems, or electronic devices. For instance, in some examples, method 900 can be performed entirely on an electronic device (e.g., devices 104, 200, 400, or 600). References in this document to any one particular electronic device (104, 200, 400, or 600) shall be understood to encompass all of the electronic devices (104, 200, 400, or 600) unless one or more of those electronic devices (104, 200, 400, or 600) is excluded by the plain meaning of the text. For example, the electronic device (104, 200, 400, or 600) utilized in several examples is a smartphone. However, the method 900 is not limited to use with a smartphone; the method 900 may be implemented on any other suitable electronic device, such as a tablet, a desktop computer, a laptop, or a smart watch. Electronic devices with greater computing power and greater battery life may perform more of the blocks of the method 900. The distribution of blocks of the method 900 need not be fixed, and may vary depending upon network connection bandwidth, network connection quality, server load, availability of computer power and battery power at the electronic device (e.g., 104, 200, 400, 600), and/or other factors. Further, while the following discussion describes method 900 as being performed by a digital assistant system (e.g., system 100 and/or digital assistant system 700), it should be recognized that the method or any particular part of the method is not limited to performance by any particular device, combination of devices, or implementation. The description of the method is further illustrated and exemplified by FIGS. 8B-8D, and the description above related to those figures.

As described below, method 900 provides a way to implement an intuitive "zero-latency" digital assistant. The method reduces the cognitive burden on a user for invoking and providing requests to a digital assistant, thereby creating a more efficient human-machine interface. For battery-operated computing devices, enabling a user to immediately begin providing a speech input to a digital assistant reduces latencies and reduces errors (due to improperly timed speech inputs), thereby conserving power and increasing the time between battery charges.

At block 902 of method 900, the electronic device (e.g., 104, 200, 400, 600) captures audio input from a microphone (e.g., microphone 213). The audio input can include user speech, such as a spoken user request.

At block 904, the device uses a first processor (e.g., low-power processor 810) to write data representing the captured audio input to a memory buffer (e.g., memory buffer 812). The memory buffer may be a circular buffer, for example, as depicted in FIG. 8C.

At block 906, the device detects a user input while the device is capturing the audio input using the microphone. The user input may be a button press as depicted in FIG. 8C, for example, or a contact on a touch screen (e.g., on touch screen 212) or a spoken input captured by the microphone.

At block 908, the device determines whether the user input detected at block 906 meets a predetermined criteria. The predetermined criteria may include a minimum duration for a button press, for example, or a type of contact (e.g., a tap or swipe) for a contact on a touch screen, or the presence of a specific trigger phrase in the memory buffer.

At block 910, in accordance with a determination that the user input meets the predetermined criteria, the device uses a second processor (e.g., main processor 808 depicted in FIG. 8B) to identify and execute a computing task based on at least a portion of the memory buffer. In some embodiments, the device can use the second processor to identify and execute a task based on a portion of the buffer that was written before, during, and/or after the device detected the user input at block 906.

At block 912, in accordance with a determination that the user input does not meet the predetermined criteria, the device forgoes identifying the task, as depicted in FIG. 8D.

FIG. 10 illustrates a method 1000 for implementing a zero-latency digital assistant according to various examples. Method 1000 can be performed using one or more electronic devices implementing a digital assistant. Some operations in method 1000 may be combined, the order of some operations may be changed, and some operations may be omitted. In some examples, method 1000 can be performed using a client-server system (e.g., system 100) implementing a digital assistant. The individual blocks of the method 1000 may be distributed in any appropriate manner among one or more computers, systems, or electronic devices. For instance, in some examples, method 1000 can be performed entirely on an electronic device (e.g., devices 104, 200, 400, or 600). References in this document to any one particular electronic device (104, 200, 400, or 600) shall be understood to encompass all of the electronic devices (104, 200, 400, or 600) unless one or more of those electronic devices (104, 200, 400, or 600) is excluded by the plain meaning of the text. For example, the electronic device (104, 200, 400, or 600) utilized in several examples is a smartphone. However, the method 1000 is not limited to use with a smartphone; the method 1000 may be implemented on any other suitable electronic device, such as a tablet, a desktop computer, a laptop, or a smart watch. Electronic devices with greater computing power and greater battery life may perform more of the blocks of method 1000. The distribution of blocks of the method 1000 need not be fixed, and may vary depending upon network connection bandwidth, network connection quality, server load, availability of computer power and battery power at the electronic device (e.g., 104, 200, 400, 600), and/or other factors. Further, while the following discussion describes method 1000 as being performed by a digital assistant system (e.g., system 100 and/or digital assistant system 700), it should be recognized that the method or any particular part of the method is not limited to performance by any particular device, combination of devices, or implementation. The description of method 1000 is further illustrated and exemplified by FIGS. 8B and 8E, and the description above related to those figures.

As described below, method 1000 provides an intuitive way for implementing a zero-latency digital assistant. The method reduces the cognitive burden on a user for invoking and providing a spoken request to a digital assistant, thereby creating a more efficient human-machine interface. For battery-operated computing devices, enabling a user to immediately begin providing a speech input to a digital assistant reduces latencies and reduces errors (due to improperly timed speech inputs), thereby conserving power and increasing the time between battery charges.

In method 1000, while a second processor (e.g., main processor 808) on the electronic device (e.g., device 104, 200, 400, 600) is in a low-power mode, the device performs blocks 1002, 1004, and 1006.

At block 1002, the electronic device continuously captures audio input from a microphone (e.g., microphone 213). The audio input can include user speech, such as a spoken user request. At block 1004, the device uses a first processor (e.g., low-power processor 810) to continuously write data representing the captured audio input to a memory buffer (e.g., memory buffer 812). The memory buffer may be a circular buffer, for example, as depicted in FIG. 8E. At block 1006, the device uses the first processor to determine whether at least a first portion of the contents of the memory buffer meet a predetermined criteria. The criteria may include a criterion that is met when at least the first portion of the contents of the memory buffer include a predetermined trigger phrase, for example, as depicted in FIG. 8E.

At block 1008, in accordance with a determination that at least the first portion of the buffer meets the predetermined criteria, the device causes the second processor to exit the low-power mode.

After causing the second processor to exit the low-power mode at block 1008, at block 1010, the device uses the second processor to identify a computing task based on at least a second portion of the memory buffer. In some embodiments, the second portion may be a portion of the memory buffer that was written after the first portion (e.g., a verbal request that was spoken after the trigger phrase). In some embodiments, the second portion may be a portion that includes the first portion, or that was written before the first portion. In some embodiments, the second portion is the entire memory buffer.

At block 1012, the device uses the second processor to execute the computing task identified at block 1010. The second processor may execute the computing task as described with respect to FIG. 1.

At block 1014, in accordance with a determination that at least the first portion of the buffer does not meet the predetermined criteria, the device forgoes causing the second processor to exit the low-power mode.

Figure 11:
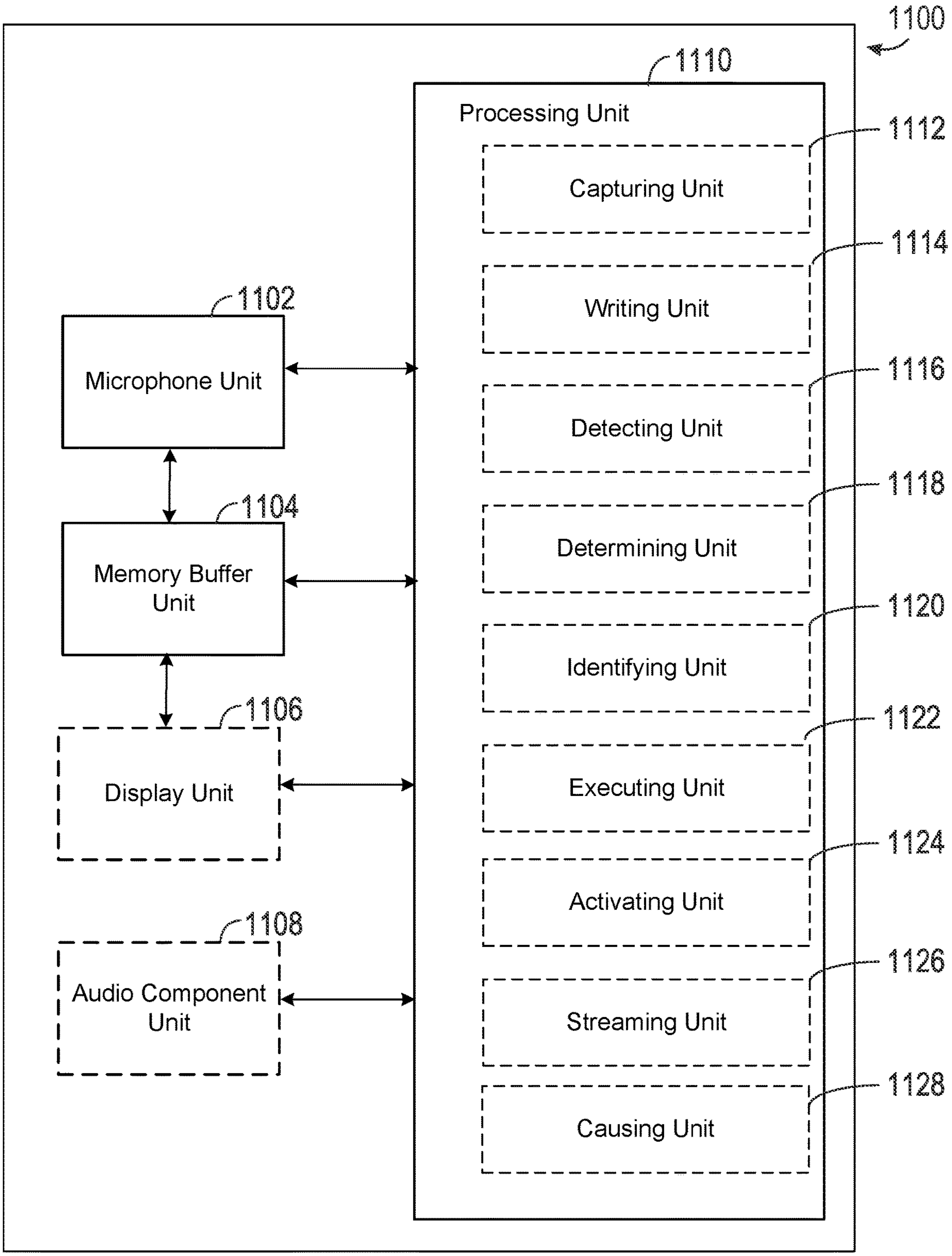
FIG. 11 illustrates a functional block diagram of an electronic device, according to various examples.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a microphone unit 1102 configured to capture audio inputs; a memory buffer unit 1104 configured to be written with audio data representing the audio inputs captured by the microphone unit; and, optionally, a display unit 1106 configured to display user interfaces and an audio component unit 1108 configured to receive or output audio content. Device 1100 includes processing unit 1110 coupled to microphone unit 1102, memory buffer unit 1104, and, optionally, display unit 1106. Processing unit 1110 includes at least two processors (e.g., low-power processor 810 and main processor 808).

The processing unit is configured to capture (e.g., with capturing unit 1112) audio input from microphone unit 1102; write (e.g., with writing unit 1114), using the first processor, data representing the captured audio input to the memory buffer unit 1104; detect (e.g., using detecting unit 1116) a user input while capturing audio input using the microphone unit; and determine (e.g., with determining unit 1118), using the first processor, whether the user input has met a predetermined criteria. The processing unit is further configured to, in accordance with a determination that the user input has met the criteria, identify (e.g., with identifying unit 1120), using the second processor, a computing task based on at least a portion of the contents of the memory buffer, and in accordance with a determination that the user input has not met the criteria, forgo identifying the computing task.

In some embodiments, the at least a portion of the contents of the memory buffer includes data written to the buffer before the user input is detected.

In some embodiments, the at least a portion of the contents of the memory buffer includes data written to the buffer during the detection of the user input.

In some embodiments, the processing unit is further configured to, in accordance with a determination that user input has met the criteria, execute (e.g., with executing unit 1122) the identified computing task In some embodiments, identifying the computing task includes launching a digital assistant session on the second processor.

In some embodiments, the digital assistant identifies and executes the computing task.

In some embodiments, launching the digital assistant session includes displaying, on the display unit 1106, a user interface associated with the digital assistant session.

In some embodiments, the user interface associated with the digital assistant is displayed in a full-screen view.

In some embodiments, launching the digital assistant includes activating (e.g., with activating unit 1124) one or more audio components on the device (e.g., in audio component unit 1108).

In some embodiments, the at least a portion of the memory buffer is provided to a remote server associated with the digital assistant.

In some embodiments, the processing unit is further configured to, in accordance with a determination that the user input has met the criteria: activate (e.g., with activating unit 1124) a second microphone on the device (e.g., in microphone unit 1102), and stream (e.g., with streaming unit 1126) audio detected by the second microphone to the digital assistant.

In some embodiments, the user input is a button press.

In some embodiments, the criteria includes a criterion that is met when the button press exceeds a predetermined threshold duration.

In some embodiments, the user input is audio data captured by the microphone and written to the buffer.

In some embodiments, the criteria include a criterion that is met when the device determines that at least a second portion of the buffer includes audio data representing a predetermined trigger.

In some embodiments, the criteria include a criterion that is met when the device determines that the audio data corresponds to an authorized user.

In some embodiments, the audio input is captured while the second processor is in a low-power mode, and the processing unit is further configured to: further in accordance with the determination that the user input has met the criteria, cause (e.g., with causing unit 1128) the second processor to exit the low-power mode.

The operations described above with reference to FIG. 9 are, optionally, implemented by components depicted in FIGS. 2A-2B or FIG. 11. For example, capturing operation 902, writing operation 904, detecting operation 906, and determining operation 908 are, optionally, implemented by peripherals interface 218, memory 202, event sorter 270, event recognizer 280, and event handler 290. Peripherals interface 218 can capture audio input to write to a memory buffer in memory 202. Event monitor 271 in event sorter 270 detects a user input, and event dispatcher module 274 delivers the event information to application 236-1. A respective event recognizer 280 of application 236-1 compares the event information to respective event definitions 286, and determines whether the user input meets a predetermined criteria corresponding to a predefined event or sub-event, such as a request to launch a digital assistant. When a respective predefined event or sub-event is detected, event recognizer 280 activates an event handler 290 associated with the detection of the event or sub-event. Event handler 290 optionally utilizes or calls data updater 276 or object updater 277 to update the application internal state 292. In some embodiments, event handler 290 accesses a respective GUI updater 278 to update what is displayed by the application. Similarly, it would be clear to a person having ordinary skill in the art how other processes can be implemented based on the components depicted in FIGS. 2A-2B.

Figure 12:
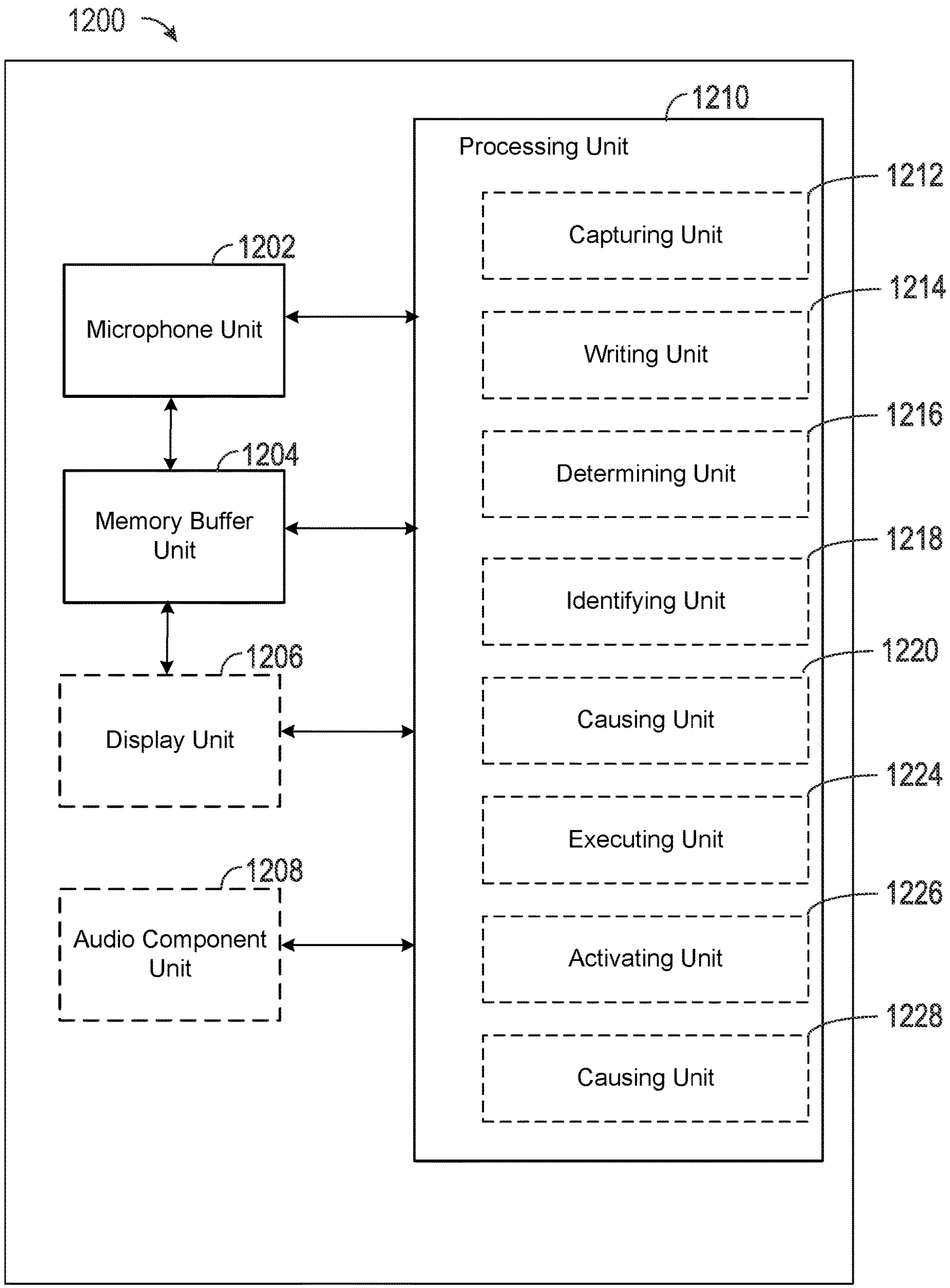
FIG. 12 illustrates a functional block diagram of an electronic device, according to various examples.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a microphone unit 1202 configured to capture audio inputs; a memory buffer unit 1204 configured to be written with audio data representing the audio inputs captured by the microphone unit; and, optionally, a display unit 1206 configured to display user interfaces and an audio component unit 1208 configured to receive or output audio content. Device 1200 includes processing unit 1210 coupled to microphone unit 1202, memory buffer unit 1204, and, optionally, display unit 1206 and audio component unit 1208. Processing unit 1210 includes at least two processors (e.g., low-power processor 810 and main processor 808).

The processing unit is configured to, while the second processor is in a low-power mode: capture (e.g., with capturing unit 1212) audio input from microphone unit 1202, write (e.g., with writing unit 1214), using the first processor, data representing the captured audio input to the memory buffer unit 1204, wherein the audio input is continuously captured and written to the memory buffer unit; determine (e.g., using determining unit 1216) whether at least a first portion of the memory buffer unit meets a predetermined criteria; in accordance with a determination that the at least a first portion of the memory buffer unit meets the predetermined criteria: cause (e.g., with causing unit 1228) the second processor to exit the low-power mode, identify (e.g., with identifying unit 1218), using the second processor, a computing task based on at least a second portion of the contents of the memory buffer unit, and execute (e.g., using executing unit 1224), using the second processor, the identified task. The processing unit is further configured to, in accordance with a determination that the at least a first portion of the memory buffer unit does not meet the criteria, forgo causing the second processor to exit the low-power mode.

In some embodiments, the second processor executes the identified task immediately, without requiring a further input from the user In some embodiments, the criteria includes a criterion that is met when the device determines that the at least a first portion of the memory buffer includes audio data representing a predetermined trigger.

In some embodiments, identifying the computing task includes launching a digital assistant session on the second processor.

In some embodiments, the digital assistant identifies and executes the task.

In some embodiments, launching the digital assistant session includes displaying a user interface associated with the digital assistant session.

In some embodiments, the user interface associated with the digital assistant is displayed in a full-screen view.

In some embodiments, launching the digital assistant includes activating one or more audio components on the device In some embodiments, the at least a portion of the buffer is provided to a remote server associated with the digital assistant.

In some embodiments, the processing unit is further configured to: further in accordance with a determination that the user input has met the criteria: activate (e.g., with activating unit 1226) a second microphone in the microphone unit (1202) on the device, and stream audio detected by the second microphone to the digital assistant.

In some embodiments, the criteria include a criterion that is met when the device determines that the audio data corresponds to an authorized user.

The operations described above with reference to FIG. 10 are, optionally, implemented by components depicted in FIGS. 2A-2B or FIG. 12. For example, capturing operation 1002, writing operation 1004, and determining operation 1006 are, optionally, implemented by peripherals interface 218, memory 202, event sorter 270, event recognizer 280, and event handler 290. Peripherals interface 218 can capture audio input to write to a memory buffer in memory 202. A respective event recognizer 280 of application 236-1 compares event information, such as contents in a memory buffer, to respective event definitions 286, and determines whether a portion of a memory buffer meets a predetermined criteria that corresponds to a predefined event or sub event, such as a request to launch a digital assistant. When a respective predefined event or sub-event is detected, event recognizer 280 activates an event handler 290 associated with the detection of the event or sub-event. Event handler 290 optionally utilizes or calls data updater 276 or object updater 277 to update the application internal state 292. In some embodiments, event handler 290 accesses a respective GUI updater 178 to update what is displayed by the application. Similarly, it would be clear to a person having ordinary skill in the art how other processes can be implemented based on the components depicted in FIGS. 2A-2B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by a first processor and a second processor of an electronic device with a microphone, cause the device to:

capture first audio input from the microphone, wherein the audio input includes speech from a user of the electronic device;

write, using the first processor, data representing the first audio input to a memory buffer, wherein the data includes at least a first portion of data representing at least a portion of the speech from a user of the electronic device;

while capturing audio input using the microphone and after writing the first portion of data to the memory buffer, receive a user input, wherein the user input is distinct from the first portion of audio data;

determine, using the first processor, whether the user input meets predetermined criteria;

in accordance with a determination that the user input meets the criteria, identify, using the second processor, a computing task based on at least the first portion of data wherein identifying the computing task includes identifying, based on at least the first portion of data, a user intent corresponding to the computing task; and in accordance with a determination that the user input has not met the criteria, forgo identifying the task.

2. The non-transitory computer-readable storage medium according to claim 1, wherein identifying the computing task is further based on a second portion of data written to the buffer during detection of the user input.

3. The non-transitory computer-readable storage medium according to claim 1, further comprising instructions to cause the device to:

further in accordance with the determination that the user input meets the criteria, execute the identified computing task.

4. The non-transitory computer-readable storage medium according to claim 1, wherein identifying the computing task includes launching a digital assistant session on the second processor.

5. The non-transitory computer-readable storage medium according to claim 4, wherein the digital assistant session identifies and executes the computing task.

6. The non-transitory computer-readable storage medium according to claim 4, wherein launching the digital assistant session includes displaying a user interface associated with the digital assistant session.

7. The non-transitory computer-readable storage medium according to claim 6, wherein the user interface associated with the digital assistant session is displayed in a full-screen view.

8. The non-transitory computer-readable storage medium according to claim 4, wherein launching the digital assistant session includes activating one or more audio components on the device.

9. The non-transitory computer-readable storage medium according to claim 4, wherein the portion of the contents of the memory buffer is provided to a remote server associated with the digital assistant session.

10. The non-transitory computer-readable storage medium according to claim 4, further comprising instructions to cause the device to:

further in accordance with the determination that the user input meets the criteria:

activate a second microphone on the device, and stream audio detected by the second microphone to the digital assistant session.

11. The non-transitory computer-readable storage medium according to claim 4, wherein the user input is a user input invoking the digital assistant session.

12. The non-transitory computer-readable storage medium according to claim 1, wherein the user input is a button press.

13. The non-transitory computer-readable storage medium according to claim 12, wherein the criteria includes a criterion that is met when the button press exceeds a predetermined threshold duration.

14. The non-transitory computer-readable storage medium according to claim 1, wherein the user input is audio data captured by the microphone and written to the buffer.

15. The non-transitory computer-readable storage medium according to claim 14, wherein the criteria includes a criterion that is met when the device determines that at least a second portion of the memory buffer includes audio data representing a predetermined trigger.

16. The non-transitory computer-readable storage medium according to claim 14, wherein the criteria includes a criterion that is met when the device determines that the audio data corresponds to an authorized user.

17. The non-transitory computer-readable storage medium according to claim 1, wherein the audio input is captured while the second processor is in a low-power mode, further comprising instructions to cause the device to:

further in accordance with the determination that the user input meets the criteria, cause the second processor to exit the low-power mode.

18. The non-transitory computer-readable storage medium according to claim 1, wherein the first processor is a processor of a first type and the second processor is a processor of a second type.

19. The non-transitory computer-readable storage medium according to claim 1, wherein identifying the computing task further includes identifying one or more parameters corresponding to the user intent.

20. A method, comprising:

at an electronic device including a microphone, a first processor, and a second processor:

capturing first audio input from the microphone, wherein the audio input includes speech from a user of the electronic device;

writing, using the first processor, data representing the first audio input to a memory buffer, wherein the data includes at least a first portion of data representing at least a portion of the speech from a user of the electronic device;

while capturing the audio input using the microphone and after writing the first portion of data to the memory buffer, receive a user input, wherein the user input is distinct from the first portion of audio data;

determining, using the first processor, whether the user input meets predetermined criteria;

in accordance with a determination that the user input meets the criteria, identifying, using the second processor, a computing task based on at least the first portion of data, wherein identifying the computing task includes identifying, based on at least the first portion of data, a user intent corresponding to the computing task; and in accordance with a determination that the user input has not met the criteria, forgoing identifying the task.

21. The method of claim 20, wherein identifying the computing task is further based on a second portion of data written to the buffer during detection of the user input.

22. The method of claim 20, further comprising:
further in accordance with the determination that the user input meets the criteria, executing the identified computing task.

23. The method of claim 20, wherein identifying the computing task includes launching a digital assistant session on the second processor.

24. The method of claim 23, wherein the digital assistant session identifies and executes the computing task.

25. The method of claim 23, wherein launching the digital assistant session includes displaying a user interface associated with the digital assistant session.

26. The method of claim 25, wherein the user interface associated with the digital assistant session is displayed in a full-screen view.

27. The method of claim 23, wherein launching the digital assistant session includes activating one or more audio components on the device.

28. The method of claim 23, wherein the portion of the contents of the memory buffer is provided to a remote server associated with the digital assistant session.

29. The method of claim 23, further comprising:
further in accordance with the determination that the user input meets the criteria:
activating a second microphone on the device, and
streaming audio detected by the second microphone to the digital assistant session.

30. The method of claim 23, wherein the user input is a user input invoking the digital assistant session.

31. The method of claim 20, wherein the user input is a button press.

32. The method of claim 31, wherein the criteria includes a criterion that is met when the button press exceeds a predetermined threshold duration.

33. The method of claim 20, wherein the user input is audio data captured by the microphone and written to the buffer.

34. The method of claim 33, wherein the criteria includes a criterion that is met when the device determines that at least a second portion of the memory buffer includes audio data representing a predetermined trigger.

35. The method of claim 33, wherein the criteria includes a criterion that is met when the device determines that the audio data corresponds to an authorized user.

36. The method of claim 20, wherein the audio input is captured while the second processor is in a low-power mode, and further comprising:
further in accordance with the determination that the user input meets the criteria, causing the second processor to exit the low-power mode.

37. The method of claim 20, wherein the first processor is a processor of a first type and the second processor is a processor of a second type.

38. The method of claim 20, wherein identifying the computing task further includes identifying one or more parameters corresponding to the user intent.

39. An electronic device, comprising:
a microphone;
two or more processors;
a memory; and
one or more programs, wherein the one or more programs are stored in the memory and configured to be executed by the two or more processors, the one or more programs including instructions for:
capturing first audio input from the microphone, wherein the audio input includes speech from a user of the electronic device;
writing, using a first processor, data representing the first audio input to a memory buffer in the memory, wherein the data includes at least a first portion of data representing at least a portion of the speech from a user of the electronic device;
while capturing audio input using the microphone and after writing the first portion of data to the memory buffer, receive a user input, wherein the user input is distinct from the first portion of audio data;
determining, using the first processor, whether the user input meets predetermined criteria;
in accordance with a determination that the user input meets the criteria, identifying, using a second processor, a computing task based on at least the first portion of data, wherein identifying the computing task includes identifying, based on at least the first portion of data, a user intent corresponding to the computing task; and
in accordance with a determination that the user input has not met the criteria, forgoing identifying the task.

40. The electronic device of claim 39, wherein identifying the computing task is further based on a second portion of data written to the buffer during detection of the user input.

41. The electronic device of claim 39, the one or more programs further including instructions for:
further in accordance with the determination that the user input meets the criteria, executing the identified computing task.

42. The electronic device of claim 39, wherein identifying the computing task includes launching a digital assistant session on the second processor.

43. The electronic device of claim 42, wherein the digital assistant session identifies and executes the computing task.

44. The electronic device of claim 42, wherein launching the digital assistant session includes displaying a user interface associated with the digital assistant session.

45. The electronic device of claim 44, wherein the user interface associated with the digital assistant session is displayed in a full-screen view.

46. The electronic device of claim 42, wherein launching the digital assistant session includes activating one or more audio components on the device.

47. The electronic device of claim 42, wherein the portion of the contents of the memory buffer is provided to a remote server associated with the digital assistant session.

48. The electronic device of claim 42, the one or more programs further including instructions for:
further in accordance with the determination that the user input meets the criteria:
activating a second microphone on the device, and
streaming audio detected by the second microphone to the digital assistant session.

49. The electronic device of claim 42, wherein the user input is a user input invoking the digital assistant session.

50. The electronic device of claim 39, wherein the user input is a button press.

51. The electronic device of claim 50, wherein the criteria includes a criterion that is met when the button press exceeds a predetermined threshold duration.

52. The electronic device of claim 39, wherein the user input is audio data captured by the microphone and written to the buffer.

53. The electronic device of claim 52, wherein the criteria includes a criterion that is met when the device determines that at least a second portion of the memory buffer includes audio data representing a predetermined trigger.

54. The electronic device of claim 52, wherein the criteria includes a criterion that is met when the device determines that the audio data corresponds to an authorized user.

55. The electronic device of claim 39, wherein the audio input is captured while the second processor is in a low-power mode, the one or more programs further including instructions for:

further in accordance with the determination that the user input meets the criteria, causing the second processor to exit the low-power mode.

56. The electronic device of claim 39, wherein the first processor is a processor of a first type and the second processor is a processor of a second type.

57. The electronic device of claim 39, wherein identifying the computing task further includes identifying one or more parameters corresponding to the user intent.

* * * * *